(12) United States Patent
Evans et al.

(10) Patent No.: US 12,401,077 B2
(45) Date of Patent: *Aug. 26, 2025

(54) BATTERY THERMAL MANAGEMENT MEMBER

(71) Applicant: ASPEN AEROGELS INC., Northborough, MA (US)

(72) Inventors: Owen Evans, Chelmsford, MA (US); George Gould, Mendon, MA (US); Kathryn Dekrafft, Marlborough, MA (US); David Mihalcik, Northborough, MA (US); David Baur, Ashland, MA (US)

(73) Assignee: Aspen Aerogels Inc., Northborough, MA (US)

( * ) Notice: Subject to any disclaimer, the term of this patent is extended or adjusted under 35 U.S.C. 154(b) by 182 days.

This patent is subject to a terminal disclaimer.

(21) Appl. No.: 17/791,519

(22) PCT Filed: Jan. 7, 2021

(86) PCT No.: PCT/US2021/012559
§ 371 (c)(1),
(2) Date: Jul. 7, 2022

(87) PCT Pub. No.: WO2021/142169
PCT Pub. Date: Jul. 15, 2021

(65) Prior Publication Data
US 2023/0032529 A1 Feb. 2, 2023

Related U.S. Application Data

(63) Continuation of application No. 17/106,763, filed on Nov. 30, 2020, and a continuation of application No.
(Continued)

(51) Int. Cl.
*H01M 10/658* (2014.01)
*B32B 5/18* (2006.01)
(Continued)

(52) U.S. Cl.
CPC ............. *H01M 10/658* (2015.04); *B32B 5/18* (2013.01); *C04B 38/0048* (2013.01);
(Continued)

(58) Field of Classification Search
CPC ............ B32B 2250/02; B32B 2250/03; B32B 2260/021; B32B 2260/044;
(Continued)

(56) References Cited

U.S. PATENT DOCUMENTS

| | | | |
|---|---|---|---|
| 4,454,248 A | 6/1984 | Pollock et al. | |
| 4,532,316 A | 7/1985 | Henn | |

(Continued)

FOREIGN PATENT DOCUMENTS

| | | |
|---|---|---|
| AU | 2020396088 A1 | 7/2022 |
| AU | 2021205263 A1 | 8/2022 |

(Continued)

OTHER PUBLICATIONS

"U.S. Appl. No. 17/106,763, Examiner Interview Summary mailed Sep. 18, 2023", 3 pgs.
(Continued)

*Primary Examiner* — Hai Vo
(74) *Attorney, Agent, or Firm* — Dierker & Kavanaugh, P.C.

(57) ABSTRACT

Battery thermal management materials, compositions and systems are provided. Exemplary embodiments include a battery thermal management member. The battery thermal management member can include a heat protection layer and a resilient layer. Also provided are methods of preparing or manufacturing such battery thermal management members.
(Continued)

In certain embodiments, the heat protection layer can include mica, microporous silica, ceramic fiber, mineral wool, aerogel or combinations thereof.

10 Claims, 8 Drawing Sheets

Related U.S. Application Data

17/106,940, filed on Nov. 30, 2020, now Pat. No. 11,702,346.

(60) Provisional application No. 63/056,527, filed on Jul. 24, 2020, provisional application No. 62/958,135, filed on Jan. 7, 2020.

(51) Int. Cl.
  *C04B 38/00*    (2006.01)
  *H01M 10/625*    (2014.01)
  *H01M 50/204*    (2021.01)
  *H01M 50/249*    (2021.01)

(52) U.S. Cl.
  CPC ....... *H01M 10/625* (2015.04); *H01M 50/204* (2021.01); *H01M 50/249* (2021.01); *B32B 2250/03* (2013.01); *H01M 2220/20* (2013.01)

(58) Field of Classification Search
  CPC ........ B32B 2264/101; B32B 2266/126; B32B 2307/304; B32B 2307/306; B32B 2307/3065; B32B 2457/04; B32B 2457/10; B32B 27/065; B32B 27/18; B32B 27/283; B32B 27/302; B32B 27/32; B32B 27/40; B32B 27/42; B32B 5/022; B32B 5/18; C04B 38/0048; H01M 10/613; H01M 10/625; H01M 10/658; H01M 2220/20; H01M 50/204; H01M 50/249; Y02E 60/10
  See application file for complete search history.

(56) References Cited

U.S. PATENT DOCUMENTS

| | | | |
|---|---|---|---|
| 4,610,863 A | 9/1986 | Tewari et al. | |
| 4,666,948 A | 5/1987 | Woerner et al. | |
| 5,229,429 A | 7/1993 | Hahn et al. | |
| 5,275,796 A | 1/1994 | Tillotson et al. | |
| 5,395,805 A | 3/1995 | Droege et al. | |
| 5,399,422 A | 3/1995 | Dijkema et al. | |
| 5,420,168 A | 5/1995 | Mayer et al. | |
| 5,565,142 A | 10/1996 | Deshpande et al. | |
| 5,889,071 A | 3/1999 | Biesmans et al. | |
| 5,962,539 A | 10/1999 | Perrut et al. | |
| 6,083,619 A | 7/2000 | Frank et al. | |
| 6,143,400 A | 11/2000 | Schwertfeger et al. | |
| 6,147,134 A | 11/2000 | Eling | |
| 6,187,831 B1 | 2/2001 | Miller et al. | |
| 6,315,971 B1 | 11/2001 | Wallace et al. | |
| 6,670,402 B1 | 12/2003 | Lee et al. | |
| 7,118,801 B2 | 10/2006 | Ristic-Lehmann et al. | |
| 7,635,411 B2 | 12/2009 | Rouanet et al. | |
| 8,021,583 B2 | 9/2011 | Rouanet et al. | |
| 8,546,457 B2 | 10/2013 | Alteheld et al. | |
| 9,181,486 B2 | 11/2015 | Evans et al. | |
| 9,399,864 B2 | 7/2016 | Samanta et al. | |
| 9,581,282 B1 | 2/2017 | Ward et al. | |
| 10,608,224 B2 | 3/2020 | Kaye et al. | |
| 11,702,346 B2 * | 7/2023 | Evans ..................... B32B 5/18 |
| | | | 429/62 |
| 2002/0025427 A1† | 2/2002 | Schwertfeger | |
| 2002/0094426 A1 | 7/2002 | Stepanian et al. | |
| 2005/0192367 A1 | 9/2005 | Ou et al. | |
| 2007/0173157 A1 | 7/2007 | Trifu et al. | |
| 2007/0213417 A1 | 9/2007 | Stork et al. | |
| 2007/0222116 A1 * | 9/2007 | Gould ................. B29C 44/5627 |
| | | | 264/293 |
| 2007/0238008 A1† | 10/2007 | Hogan | |
| 2008/0229704 A1† | 9/2008 | Augustyniak | |
| 2009/0029147 A1 | 1/2009 | Tang et al. | |
| 2012/0142802 A1 | 6/2012 | Steinke et al. | |
| 2013/0196137 A1 | 8/2013 | Evans et al. | |
| 2014/0255642 A1† | 9/2014 | White | |
| 2014/0287641 A1† | 9/2014 | Steiner, III | |
| 2015/0308018 A1 | 10/2015 | Zhang et al. | |
| 2016/0096949 A1 | 4/2016 | Evans et al. | |
| 2016/0251515 A1 * | 9/2016 | Tsai ..................... C08K 5/3445 |
| | | | 524/588 |
| 2017/0104249 A1 | 4/2017 | Heeg et al. | |
| 2017/0210108 A1† | 7/2017 | Mihalcik | |
| 2019/0140237 A1 | 5/2019 | Kaye et al. | |
| 2019/0148696 A1 | 5/2019 | Kaye et al. | |
| 2019/0161909 A1 | 5/2019 | Oikawa et al. | |
| 2019/0178434 A1 | 6/2019 | Sakatani et al. | |
| 2019/0264381 A1 | 8/2019 | Joung et al. | |
| 2019/0288247 A1 | 9/2019 | Jennrich et al. | |
| 2020/0061970 A1 * | 2/2020 | Chen ........................ F41H 5/04 |
| 2020/0215791 A1† | 7/2020 | Oh | |
| 2020/0411818 A1 | 12/2020 | Takeda | |
| 2021/0047548 A1 | 2/2021 | Jacobmeier et al. | |
| 2021/0163303 A1 | 6/2021 | Evans et al. | |
| 2021/0167438 A1 | 6/2021 | Evans et al. | |
| 2022/0131208 A1 | 4/2022 | Zhang et al. | |
| 2022/0166106 A1† | 5/2022 | Zhang | |
| 2023/0348286 A1 | 11/2023 | Evans et al. | |

FOREIGN PATENT DOCUMENTS

| | | |
|---|---|---|
| BR | 112022010852 A2 | 8/2022 |
| BR | 112022013504 A2 | 9/2022 |
| CA | 3160225 A1 | 6/2021 |
| CA | 3160322 A1 | 6/2021 |
| CA | 3161363 A1 | 7/2021 |
| CN | 1592651 A | 3/2005 |
| CN | 1875060 A | 12/2006 |
| CN | 106410326 A | 2/2017 |
| CN | 107181018 A | 9/2017 |
| CN | 107827116 A | 3/2018 |
| CN | 107848242 A | 3/2018 |
| CN | 108475748 A | 8/2018 |
| CN | 208111504 U | 11/2018 |
| CN | 109265131 A | 1/2019 |
| CN | 110165091 A | 8/2019 |
| CN | 209822690 U | 12/2019 |
| CN | 107848242 B | 5/2022 |
| CN | 115023342 A | 9/2022 |
| CN | 115038580 A | 9/2022 |
| CN | 115279583 A | 11/2022 |
| CN | 107181018 B | 5/2023 |
| DE | 202020005871 U1 | 12/2022 |
| EP | 4069508 A1 | 10/2022 |
| EP | 4087734 A1 | 11/2022 |
| HK | 40071833 A | 11/2022 |
| HK | 40075465 A | 1/2023 |
| IL | 293573 A | 8/2022 |
| IN | 202217031030 A | 9/2022 |
| JP | 2011040387 A | 2/2011 |
| JP | 2011108617 A | 6/2011 |
| JP | 2018116805 A | 7/2018 |
| JP | 2018140554 A | 9/2018 |
| JP | 2018206605 A | 12/2018 |
| JP | 2019063150 A | 5/2019 |
| JP | 2019099984 A | 6/2019 |
| KR | 20220109454 A | 8/2022 |
| KR | 20220110803 A | 8/2022 |
| KR | 20220124703 A | 9/2022 |
| SG | 10202260106 A | 12/2022 |
| SG | 10202300034 | 2/2023 |
| SG | 11202205565 | 2/2023 |
| TW | 201623592 A | 7/2016 |
| TW | 202128594 A | 8/2021 |
| WO | WO-0104434 A1 | 1/2001 |

(56) References Cited

FOREIGN PATENT DOCUMENTS

| | | |
|---|---|---|
| WO | 01/094436 A2 | 12/2001 |
| WO | 02052086 A2 † | 7/2002 |
| WO | 2005047381 A1 † | 5/2005 |
| WO | 2017106524 A1 | 6/2017 |
| WO | WO-2017132413 A1 | 8/2017 |
| WO | 2018200803 A1 | 11/2018 |
| WO | 2019107561 A1 | 6/2019 |
| WO | 2019154677 A1 | 8/2019 |
| WO | 2019167612 A1 | 9/2019 |
| WO | WO-2019178434 A1 | 9/2019 |
| WO | WO-2020186495 A1 | 9/2020 |
| WO | WO-2021113188 A1 | 6/2021 |
| WO | WO-2021113189 A1 | 6/2021 |
| WO | WO-2021142169 A1 | 7/2021 |

OTHER PUBLICATIONS

"U.S. Appl. No. 17/106,763, Final Office Action mailed May 14, 2024", 17 pgs.
"U.S. Appl. No. 17/106,763, Non Final Office Action mailed Dec. 8, 2023", 14 pgs.
"U.S. Appl. No. 17/106,763, Response filed Mar. 8, 2024 to Non Final Office Action mailed Dec. 8, 2023", 10 pgs.
"U.S. Appl. No. 17/106,763, Response filed Aug. 14, 2024 to Final Office Action mailed May 14, 2024", 11 pgs.
"Brazil Application Serial No. BR1120220135041, Office Action mailed Aug. 21, 2024", 4 pgs.
"Brazilian Application Serial No. BR112022010804-4, Office Action mailed Jun. 3, 2024", with machine translation, 5 pgs.
"Brazilian Application Serial No. BR112022010804-4, Office Action mailed Jun. 24, 2024", with machine translation, 8 pgs.
"Brazilian Application Serial No. BR112022010852-4, Office Action mailed Jun. 3, 2024", with machine translation, 5 pgs.
"Brazilian Application Serial No. BR112022010852-4, Office Action mailed Jun. 26, 2024", with machine translation, 8 pgs.
"Canadian Application Serial No. 3,160,225, Office Action mailed Nov. 29, 2023", 4 pgs.
"Canadian Application Serial No. 3,160,225, Response filed Mar. 27, 2024 to Office Action mailed Nov. 29, 2023", 12 pgs.
"Canadian Application Serial No. 3,160,322, Office Action mailed Aug. 6, 2024", 3 pgs.
"Canadian Application Serial No. 3,160,322, Office Action mailed Nov. 17, 2023", 3 pgs.
"Canadian Application Serial No. 3,160,322, Response filed Mar. 15, 2024 to Office Action mailed Nov. 17, 2023", 13 pgs.
"Canadian Application Serial No. 3,161,363, Examiners Rule 86(2) Report mailed Nov. 15, 2023", 4 pgs.
"Canadian Application Serial No. 3,161,363, Office Action mailed Aug. 6, 2024", 3 pgs.
"Canadian Application Serial No. 3,161,363, Response filed Mar. 14, 2024 to Examiners Rule 86(2) Report mailed Nov. 15, 2023", 13 pgs.
"Chinese Application Serial No. 202080095188.6, Office Action mailed May 31, 2024", W/English Translation, 23 pgs.
"Chinese Application Serial No. 202080095188.6, Office Action mailed Oct. 28, 2023", with English translation, 33 pgs.
"Chinese Application Serial No. 202080095188.6, Response filed Mar. 12, 2024 to Office Action mailed Oct. 28, 2023", w/ English claims, 28 pgs.
"Chinese Application Serial No. 202080095188.6, Response filed May 28, 2024 to Examiner Telephone Interview", with English claims, 23 pgs.
"Chinese Application Serial No. 202080095188.6, Response filed Jul. 16, 2024 to Office Action mailed May 31, 2024", w/ English claims, 24 pgs.
"Chinese Application Serial No. 202080095189.0, Office Action mailed Aug. 6, 2024", w/ English translation, 16 pgs.
"Chinese Application Serial No. 202080095189.0, Office Action mailed Nov. 29, 2023", w/ English Translation, 17 pgs.
"Chinese Application Serial No. 202080095189.0, Response Filed Apr. 15, 2024 to Office Action mailed Nov. 29, 2023", w/ English Claims, 215 pgs.
"Chinese Application Serial No. 202180019442.9, Office Action mailed Mar. 29, 2024", with English translation, 19 pgs.
"European Application Serial No. 20828804.3, Communication Pursuant to Article 94(3) EPC mailed Jul. 17, 2024", 9 pgs.
"European Application Serial No. 20828805.0, Communication Pursuant to Article 94(3) EPC mailed Jul. 17, 2024", 7 pgs.
"Taiwanese Application Serial No. 109142393, Office Action mailed Jul. 22, 2024", with machine translation, 24 pgs.
"Taiwanese Application Serial No. 109142397, Office Action mailed Jun. 3, 2024", W/English Translation, 20 pgs.
U.S. Appl. No. 17/106,940 U.S. Pat. No. 11,702,346, filed Nov. 30, 2020, Aerogel-Based Components and Systems for Electric Vehicle Thermal Management.
U.S. Appl. No. 18/195,367, filed May 9, 2023, Aerogel-Based Components and Systems for Electric Vehicle Thermal Managment.
U.S. Appl. No. 17/106,763, filed Nov. 30, 2020, Components and Systems to Manage Thermal Runaway Issues in Electric Vehicle Batteries.
Kistler, S. S., "Coherent Expanded-Aerogels", The Journal of Physical Chemistry, vol. 36, No. 1, Jan. 1, 1932, pp. 52-64.
International Search Report issued in connection with application No. PCT/US2021/012559, dated Apr. 7, 2021.
"U.S. Appl. No. 17/106,763, Concise Description of Relevance mailed Mar. 17, 2023", 12 pgs.
"U.S. Appl. No. 17/106,763, Concise Description of Relevance mailed Dec. 15, 2021", 46 pgs.
"U.S. Appl. No. 17/106,763, Non Final Office Action mailed Jun. 15, 2023", 11 pgs.
"U.S. Appl. No. 17/106,763, Preliminary Amendment filed Nov. 30, 2020", 10 pgs.
"U.S. Appl. No. 17/106,763, Preliminary Amendment filed Dec. 5, 2022", 10 pgs.
"U.S. Appl. No. 17/106,763, Response filed May 22, 2023 to Restriction Requirement mailed Mar. 22, 2023", 8 pgs.
"U.S. Appl. No. 17/106,763, Restriction Requirement mailed Mar. 22, 2023", 6 pgs.
"U.S. Appl. No. 17/106,763, Third-Party Submission Under 37 CFR 1.290 mailed Mar. 17, 2023", 3 pgs.
"U.S. Appl. No. 17/106,763, Third-Party Submission Under 37 CFR 1.290 mailed Dec. 15, 2021", 4 pgs.
"U.S. Appl. No. 17/106,940, Corrected Notice of Allowability mailed Jun. 9, 2023", 5 pgs.
"U.S. Appl. No. 17/106,940, Examiner Interview Summary mailed Nov. 18, 2022", 3 pgs.
"U.S. Appl. No. 17/106,940, Non Final Office Action mailed Oct. 12, 2022", 22 pgs.
"U.S. Appl. No. 17/106,940, Notice of Allowance mailed Feb. 15, 2023", 16 pgs.
"U.S. Appl. No. 17/106,940, Preliminary Amendment filed Nov. 30, 2020", 9 pgs.
"U.S. Appl. No. 17/106,940, PTO Response to Rule 312 Communication mailed May 24, 2023", 2 pgs.
"U.S. Appl. No. 17/106,940, Response filed Sep. 13, 2022 to Restriction Requirement mailed Aug. 1, 2022", 10 pgs.
"U.S. Appl. No. 17/106,940, Response filed Nov. 18, 2022 to Non Final Office Action mailed Oct. 12, 2022", 16 pgs.
"U.S. Appl. No. 17/106,940, Restriction Requirement mailed Aug. 1, 2022", 6 pgs.
"ArmaGel HT EC Safety Data Sheet", Armacell GmbH, (Sep. 13, 2019), 1-9.
"Australian Application Serial No. 2020396088, Voluntary Amendment filed Jun. 16, 2022", 8 pgs.
"Australian Application Serial No. 2020396858, Voluntary Amendment mailed Jun. 21, 2022", 10 pgs.
"Brazilian Application Serial No. 112022010852-4, Voluntary Amendment filed Jul. 7, 2022", with machine translation, 17 pgs.
"Brazilian Application Serial No. BR112022010804-4, Voluntary Amendment filed Jul. 6, 2022", with machine translation, 16 pgs.
"Brazilian Application Serial No. BR1120220135041, Voluntary Amendment filed Jul. 7, 2022", with machine translation, 15 pgs.

(56) References Cited

OTHER PUBLICATIONS

"Canadian Application Serial No. 3,160,225, Voluntary Amendment filed Sep. 15, 2022", 3 pgs.
"Canadian Application Serial No. 3,161,363, Voluntary Amendment filed Sep. 15, 2022", 3 pgs.
"European Application Serial No. 20828804.3, Response filed Jan. 18, 2023 to Communication pursuant to Rules 161(1) and 162 EPC mailed Jul. 21, 2022", 9 pgs.
"European Application Serial No. 20828805.0, Response filed Jan. 19, 2023 to Communication Pursuant to Rules 161(1) and 162 EPC mailed Jul. 21, 2022", 10 pgs.
"European Application Serial No. 21702816.6, Response to Communication pursuant to Rules 161(1) and 162 EPC filed Feb. 15, 2023", 10 pgs.
"German Application Serial No. 202021004280.6, Response filed Aug. 24, 2023", with machine translation, 4 pgs.
"International Application Serial No. PCT/US2020/062618, International Preliminary Report on Patentability mailed Jun. 16, 2022", 10 pgs.
"International Application Serial No. PCT/US2020/062618, International Search Report mailed Mar. 26, 2021", 4 pgs.
"International Application Serial No. PCT/US2020/062618, Written Opinion mailed Mar. 26, 2021", 8 pgs.
"International Application Serial No. PCT/US2020/062622, International Preliminary Report on Patentability mailed Jun. 16, 2022", 9 pgs.
"International Application Serial No. PCT/US2020/062622, International Search Report mailed Mar. 19, 2021", 4 pgs.
"International Application Serial No. PCT/US2020/062622, Written Opinion mailed Mar. 19, 2021", 7 pgs.
"International Application Serial No. PCT/US2021/012559, International Preliminary Report on Patentability mailed Jul. 21, 2022", 11 pgs.
"International Application Serial No. PCT/US2021/012559, Written Opinion mailed Apr. 7, 2021", 9 pgs.
"Israel Application Serial No. 293573, Notification Prior to Examination mailed Nov. 13, 2022", with English Translation, 6 pgs.
"Israel Application Serial No. 293574, Office Action mailed Jan. 8, 2023", w/ English Translation, 4 pgs.
"Israel Application Serial No. 294489, Notification Prior to Examination mailed Feb. 5, 2023", w/ English Translation, 4 pgs.
"Korean Application Serial No. 1020227022827, Amendment filed Aug. 10, 2022", with machine translation, 13 pgs.
"Pyrogel XTF Safety Data Sheet", Aspen Aerogels, Northborough, MA, (Feb. 20, 2018), 1-6.
"Singapore Application Serial No. 11202205550V, Voluntary Amendment filed Oct. 4, 2022", in English, 10 pgs.
"Taiwanese Application Serial No. 109142393, Third Party Opinion mailed Jul. 29, 2022", with English translation, 9 pgs.
Geppi, et al., "Applications of Solid-State NMR to the Study of Organic/Inorganic Multicomponent Materials", Applied Spectroscopy Reviews, vol. 44, No. 1, (2008), 1-89.
Tang, G H, et al., "Multi-layer graded doping in silica aerogel insulation with temperature gradient", International Journal of Heat and Mass Transfer, 99, (2016), 192-200.
Wang, Xiao-Dong, et al., "Radiative characteristics of opacifier-loaded silica aerogel composites", Journal of Non-Crystalline Solids, 375, (2013), 31-39.
Zhao, Jun-Jie, et al., "Optical and radiative properties of infrared opacifier particles loaded into silica aerogels for high temperature thermal isolation", International Journal of Thermal Sciences, 70, (2013), 54-64.

\* cited by examiner
† cited by third party

BATTERY THERMAL MANAGEMENT MEMBER

CROSS-REFERENCE TO RELATED APPLICATIONS

This is a 35 U.S.C. 371 National Stage Patent Application which claims priority to International Application No. PCT/US2021/012559, filed Jan. 7, 2021, which claims priority to the following U.S. Patent Applications, each of which are hereby incorporated by reference in their entirety: application Ser. No. 17/106,763, filed Nov. 30, 2020; Application Ser. No. 17/106,940, filed Nov. 30, 2020; U.S. Provisional Application No. 63/056,527, filed Jul. 24, 2020; and Provisional Application No. 62/958,135, filed Jan. 7, 2020.

FIELD OF THE INVENTION

The invention relates, generally, to battery thermal management. More specifically, the present disclosure relates to compositions and systems for battery thermal management. In particular embodiments, the present disclosure relates to high performance battery thermal management compositions and systems including aerogel technology for separating battery cells or insulating battery components.

BACKGROUND OF THE INVENTION

Low-density aerogel materials are widely considered to be the best solid insulators available. Aerogels function as insulators primarily by minimizing conduction (low structural density results in tortuous path for energy transfer through the solid framework), convection (large pore volumes and very small pore sizes result in minimal convection), and radiation (with IR absorbing or scattering dopants). Aerogels can be used in a broad range of applications, including heating and cooling insulation, acoustics insulation, electronic dielectrics, aerospace, energy storage and production, and filtration. Furthermore, aerogel materials display many other interesting acoustic, optical, mechanical, and chemical properties that make them abundantly useful in various insulation and non-insulation applications.

Thermal insulation suitable for reliably controlling heat flow from heat-generating parts in small spaces and to provide safety and prevention of fire propagation for such products are needed in the fields of electronic, industrial and automotive technologies. Thermal insulation sheets with superior properties in compression may be useful in addressing these needs, for example as separators in lithium ion battery modules.

The safety standards for lithium ion batteries include a fire exposure test. The fire exposure test is a test method in which a cell in a battery module is allowed to undergo thermal runaway and then it is determined whether ignition or rupture occurs as a result of thermal propagation to other cells including the adjacent cell. A safety design intended to block propagation of thermal runaway to the adjacent cell typically involves inclusion of a material superior in thermal insulation properties between cells.

Conventional types of insulation, such as foam or fiber sheets, can tolerate high temperatures, but have a relatively low capacity for insulation or thermal containment. For such materials, the thickness of the insulation must be increased in order to provide effective thermal management. However, the space requirements for battery modules limit the size of the module, as well as the space between cells within the module. Other fire-resistant materials, such as mica or ceramic sheets, can tolerate high temperatures but are relatively incompressible and also have low capacity for insulation. Such materials may not be suitable for battery systems in which cells expand and contract during operation, such as pouch and prismatic cells. Similarly, it is desirable to limit the overall weight of the battery module. Thus, resistance to heat propagation and fire propagation need to be achieved while minimizing the thickness and weight of materials used to provide the necessary thermal properties while providing the desired mechanical properties for a given battery system. A different type of insulation system, material, and method to provide effective insulation, thermal containment and fire propagation protection is needed.

Aerogel materials are known to possess about two to six times the thermal resistance of other common types of insulation, e.g., foams, fiberglass, etc. Aerogels can increase effective shielding and thermal insulation without substantially increasing the thickness of the insulation or adding additional weight. Aerogels are known to be a class of structures having low density, open cell structures, large surface areas, and nanometer scale pore sizes.

U.S. Patent Publication No. 2012/0142802 of Steinke discloses open-cell foams filled with particles of aerogel. U.S. Patent Publication No. 2019/0161909 of Oikawa discloses a thermal insulation sheet including a non-woven fabric and an aerogel. However, these documents do not disclose materials that have the desired thermal, fire, mechanical and hydrophobic properties and the combination of many desired properties for use in battery thermal management members or the methods for producing such materials.

It would be desirable to provide battery thermal management members and systems with improved performance in various aspects, including in compressibility, compressional resilience, compliance, thermal resistance, hydrophobicity, fire reaction and others, individually and in one or more combinations. In view of the art considered as a whole at the time the present invention was made it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for improved aerogel compositions is now met by a new, useful, and nonobvious invention.

In a general aspect, the present disclosure provides battery thermal management members and systems that are durable and easy to handle, which have favorable resistance to heat propagation and fire propagation while minimizing thickness and weight of materials used, and that also have favorable properties for compressibility, compressional resilience, and compliance.

In an exemplary aspect, the present disclosure provides a battery thermal management member including a heat protection layer and a resilient layer, for example, the resilient layer includes one or more organic materials. In exemplary embodiments, the heat protection layer has a thermal conductivity less than about 65 mW/mK, for example, the heat protection layer can maintain at least a surface of the resilient layer below the decomposition temperature of at least one of the organic materials.

In some embodiments, the heat protection layer is disposed adjacent to the resilient layer. In some embodiments, the heat protection layer is disposed in contact with the at least one resilient layer. In some embodiments, the battery thermal management member includes a second heat protection layer. In such embodiments, the first heat protection layer and the second heat protection layer can be disposed on opposing sides of the at least one resilient layer. For example, at least one of the first heat protection layer and the second heat protection layer can be disposed in contact with the at least one resilient layer.

In any of the above embodiments, the resilient layer can include a compressible material. In some embodiments, the temperature of chemical decomposition of the compressible material is greater than about 200° C. In some embodiments, the temperature of chemical decomposition of the compressible material is greater than about 240° C. In some embodiments, the temperature of chemical decomposition of the compressible material is greater than about 280° C. In some embodiments, the temperature of chemical decomposition of the compressible material is in the range of about 200° C. to about 300° C. In some embodiments, the temperature of chemical decomposition of the compressible material is greater than about 300° C. In some embodiments, the temperature of chemical decomposition of the compressible material is greater than about 350° C. In some embodiments, the temperature of chemical decomposition of the compressible material is in the range of about 300° C. to about 400° C.

In exemplary embodiments, the compressible material includes a material selected from the group consisting of siloxanes, polyolefins, polyurethanes, phenolics, melamine, cellulose acetate, and polystyrene. In exemplary embodiments, the heat protection layer includes a material selected from the group consisting of mica, microporous silica, ceramic fiber, mineral wool, and combinations thereof. For example, at least one of the first and second heat protection layer can include a material selected from the group consisting of mica, microporous silica, ceramic fiber, mineral wool, and combinations thereof. For another example, both the first and second heat protection layers can include a material selected from the group consisting of mica, microporous silica, ceramic fiber, mineral wool, and combinations thereof.

In some embodiments, the heat protection layer includes an aerogel composition. For example, at least one of the first and second heat protection layer can include an aerogel composition. For another example, both the first and second heat protection layers can include an aerogel composition. The aerogel of the aerogel composition can include inorganic, organic, or inorganic/organic hybrid material. In an exemplary embodiment, the aerogel composition is a silica aerogel composition. The aerogel composition can include a reinforcement material.

For example, the reinforcement material is present in the aerogel composition. In some embodiments, the reinforcement material comprises fiber. For example, the fiber can be selected from the group consisting of discrete fibers, woven materials, non-woven materials, needled nonwovens, battings, webs, mats, felts, and combinations thereof.

In another general aspect, the present disclosure provides aerogel compositions, e.g., reinforced aerogel compositions, that are durable and easy to handle, which have favorable resistance to heat propagation and fire propagation while minimizing thickness and weight of materials used, and that also have favorable properties for compressibility, compressional resilience, and compliance. In another general aspect, the present disclosure provides heat control members or battery thermal management members that include an aerogel composition, a reinforced aerogel composition, or combinations thereof. For example, a heat control member or battery thermal management member according to aspects disclosed herein can include at least one layer of an aerogel composition or reinforced aerogel composition. For another example, a heat control member or battery thermal management member according to aspects disclosed herein can include a plurality of layers of an aerogel composition or reinforced aerogel composition.

In an exemplary aspect, the present disclosure provides a heat control member or battery thermal management member including an aerogel composition. In certain embodiments, the heat control member or battery thermal management member is substantially planar and has a first major outer surface and a second major outer surface. In exemplary embodiments, the aerogel composition includes one or more additives. The additives can, in some embodiments, be present at a level of about 5 to 20 percent by weight of the aerogel composition. The additives can, in some embodiments, be present at a level of about 10 to 20 percent by weight of the aerogel composition. In certain embodiments, the heat control member or battery thermal management member has a thermal conductivity of less than about 40 mW/mK. In exemplary embodiments, the heat control member or battery thermal management member includes a plurality of layers of the aerogel composition.

In another exemplary aspect, the present disclosure provides a heat control member or battery thermal management member including at least one layer of an aerogel composition, at least one compliant member, and a thermally capacitive material. The aerogel composition includes one or more additives, the additives being present at a level of at least about 5 to 20 percent by weight of the aerogel composition. The additives can, in some embodiments, be present at a level of about 10 to 20 percent by weight of the aerogel composition. In exemplary embodiments, the heat control member or battery thermal management member includes a plurality of layers of the aerogel composition. In some embodiments, the thermally capacitive material is disposed between at least two layers of the aerogel composition. The thermally capacitive material can be any material having a specific heat capacity of at least about 0.3 J/(g-C). In some embodiments, the material providing thermal capacitance has a specific heat capacity of at least about 0.5 J/(g-C). For example, the thermal capacitive material can include at least one layer comprising metal. In exemplary embodiments, the at least one compliant member can include a compressible material, i.e., a material that can be compressed to reduce its thickness while providing a desired resistance to compression. For example, the compliant member can include a material selected from the group consisting of polyolefins, polyurethanes, phenolics, melamine, cellulose acetate, and polystyrene. The compliant member can be disposed adjacent to the aerogel composition or the thermally capacitive material. In an exemplary embodiment, the compliant member is between at least two layers of the aerogel composition. In some embodiments, the compliant member is disposed between both layers of the aerogel composition and layers of the thermally capacitive material.

In some embodiments, the heat control member or battery thermal management member has a thermal conductivity of less than about 30 mW/mK or less, less than about 25 mW/mK, less than about 20 mW/mK, less than about 18 mW/mK, less than about 16 mW/mK, less than about 14 mW/mK, less than about 12 mW/mK, less than about 10 mW/mK, less than about 5 mW/mK, or a thermal conductivity in a range between any combination of the aforementioned thermal conductivities. In exemplary embodiments, the one or more additives include fire-class additives. In exemplary embodiments, the one or more additives include opacifiers. In some embodiments, the one or more additives include a combination of fire-class additives and opacifers. For example, the one or more additives can include a clay mineral, e.g., kaolin. For another example, the one or more additives can be selected from the group consisting of boron carbide, diatomite, manganese ferrite, MnO, NiO, SnO, Ag2O, Bi2O3, carbon black, graphite, titanium oxide, iron titanium oxide, aluminum oxide, zirconium silicate, zirconium oxide, iron (II) oxide, iron (III) oxide, manganese dioxide, iron titanium oxide (ilmenite), chromium oxide, silicon carbide, titanium carbide, tungsten carbide, or mixtures thereof. In a preferred embodiment, the one or more additives includes silicon carbide.

In exemplary embodiments, when the first major outer surface is exposed to a temperature of 650° C. or above, the heat control member or battery thermal management member maintains a temperature of 120 C or below at the second major surface for at least about 1 minute. In some embodiments, when the first major outer surface is exposed to a temperature of 650° C. or above, the heat control member or battery thermal management member maintains a temperature of 75 C or below at the second major outer surface for at least about 30 seconds. In some embodiments, when the first major outer surface is exposed to a temperature of 650° C. or above, the heat control member or battery thermal management member maintains a temperature of 150 C or below at the second major outer surface for at least about 90 seconds. In some embodiments, when the first major outer surface is exposed to a temperature of 650° C. or above, the heat control member or battery thermal management member maintains a temperature of 150 C or below at the second major outer surface for at least about 90 seconds. In some embodiments, when the first major outer surface is exposed to a temperature of 650° C. or above, the heat control member or battery thermal management member maintains a temperature of 170 C or below at the second major outer surface for at least about 90 seconds. In some embodiments, when the first major outer surface is exposed to a temperature of 650° C. or above, the heat control member or battery thermal management member maintains a temperature of 180° C. or below at the second major outer surface for at least about 2 minutes and preferably at least about 4 minutes.

In another embodiment, these heat profiles are achieved when the heat control member or battery thermal management member is integrated into the electric vehicles systems along with other components with various configurations and environments. For example, the heat control member or battery thermal management member can be integrated into system such as battery systems in which the heat control member or battery thermal management member and other components may be subjected to ambient pressure, temperature, and compression (including from gasses other than air).

In exemplary embodiments, the aerogel composition has an uncompressed thickness in the range of about 1 mm to about 10 mm. For example, the aerogel composition can have an uncompressed thickness in the range of about 1 mm to about 5 mm. For another example, the aerogel composition can have an uncompressed thickness of about 2 mm, an uncompressed thickness of about 3 mm, or an uncompressed thickness of about 4 mm.

In certain embodiments, the aerogel composition has a density of about 0.60 g/cm$^3$ or less, about 0.50 g/cm$^3$ or less, about 0.40 g/cm$^3$ or less, about 0.30 g/cm$^3$ or less, about 0.25 g/cm$^3$ or less, about 0.20 g/cm$^3$ or less, about 0.18 g/cm$^3$ or less, about 0.16 g/cm$^3$ or less, about 0.14 g/cm$^3$ or less, about 0.12 g/cm$^3$ or less, about 0.10 g/cm$^3$ or less, about 0.05 g/cm$^3$ or less, about 0.01 g/cm$^3$ or less, or in a range between any two of these values. In an exemplary embodiment, the aerogel composition has a density less than about 0.3 g/cm$^3$.

In an exemplary aspect, the present disclosure provides a battery module including a first battery cell, a second battery cell, and a heat control member or battery thermal management member according to embodiments disclosed herein disposed between at least the first battery cell and the second battery cell.

In an exemplary aspect, the present disclosure provides a battery module or battery pack including at least one battery cell and a heat control member or battery thermal management member according to embodiments disclosed herein disposed on the battery cell or on the battery module, e.g., on a surface of the at least one battery cell or on a surface of the battery module. For example, the battery module or batter pack has an inner surface and outer surface. In certain embodiments, the heat control member or battery thermal management member is on the inner surface of the battery module or battery pack. In certain embodiments, the heat control member or battery thermal management member is on an outer surface of the battery module or battery pack.

In exemplary embodiments, the heat control member or battery thermal management member includes an aerogel composition. In some embodiments, the heat control member or battery thermal management member has an energy absorbing capability in the range of about 25 J/g to about 225 J/g.

In embodiments of the aspects disclosed herein, the aerogel composition can include a reinforcement material. For example, the reinforcement material includes fibers. For example, the reinforcement material can be selected from the group consisting of discrete fibers, woven materials, non-woven materials, needled non-wovens, battings, webs, mats, felts, and combinations thereof. In some embodiments, the reinforcement material includes an open-cell macroporous framework ("OCMF") material. For example, the OCMF material can include a melamine-based foam or a urethane-based polymer foam. In other embodiments, the reinforcement material can include a combination of fiber and OCMF material.

In embodiments of the aspects disclosed herein, the heat control member or battery thermal management member can have an uncompressed thickness in the range of about 2 mm to about 10 mm. For example, the heat control member or battery thermal management member can have an uncompressed thickness of about 2 mm, about 3 mm, about 4 mm, about 5 mm, about 6 mm, about 7 mm, about 8 mm, about 9 mm, about 10 mm or in a range between any of the aforementioned thicknesses. In exemplary embodiments, the heat control member or battery thermal management member can have an uncompressed thickness in the range of about 2 mm to about 7 mm.

In some embodiments of the aspects disclosed herein, the heat control member or battery thermal management member can further include an encapsulation member forming at least one of the first or the second outer surface. For example, the aerogel composition can include an encapsulation member. The encapsulation member can include an encapsulation layer or coating surrounding the aerogel composition and/or the heat control member or battery thermal management member, for example. The encapsulation member can include at least one vent to allow air to flow in and out of the panel and, in some embodiments, a particulate filter to keep particulate matter within the encapsulation member.

In exemplary embodiments, the aerogel composition of the heat control member or battery thermal management member is hydrophobic. For example, the aerogel composition has a liquid water uptake of less than about 15 wt %.

In exemplary embodiments, the aerogel of the aerogel composition comprises inorganic, organic, or inorganic/organic hybrid materials. For example, the aerogel composition is a silica aerogel composition. In certain embodiments, the aerogel composition includes alkylated silica.

In certain embodiments, the aerogel composition is lofty. For the purposes of this patent, a lofty aerogel composition is defined as an aerogel composition that shows the properties of bulk and some resilience (with or without full bulk recovery). In certain embodiments, lofty aerogel composition (i) is compressible by at least 50% of its original or uncompressed thickness, preferably at least 65%, and most preferably at least 80%, and (ii) is sufficiently resilient that after compression for a few seconds it will return to at least 70% of its original or uncompressed thickness, preferably at least 75%, and most preferably at least 80%.

In some embodiments, the reinforcement material can include a reinforcement including a plurality of layers of material. For example, the plurality of layers of material can be bonded together. In exemplary embodiments, at least one of the plurality of layers can include a first material and at least one other layer of the plurality of layers can include a second material. The first material and the second material can have the same or different material properties. For example, the first material can be more compressible than the second material. For another example, the first material can include closed cells and the second material can include open cells.

In some embodiments of the aspects disclosed herein, the heat control member or battery thermal management member can include a plurality of layers. For example, the heat control member or battery thermal management member can include at least one layer of or including a thermally conductive material, e.g., a layer including metal, carbon, thermally conductive polymer, or combinations thereof. As used in the context of these embodiments, thermally conductive material refers to materials having a thermal conductivity greater than that of the aerogel composition. In certain embodiments, thermally conductive materials have thermal conductivities at least about one order of magnitude greater than that of the aerogel composition. In some embodiments, the heat control member or battery thermal management member can include a plurality of layers of the aerogel composition. In certain embodiments, the heat control member or battery thermal management member can include at least one layer of conductive material disposed adjacent to the aerogel composition. In certain embodiments, the heat control member or battery thermal management member can include at least one layer of conductive material disposed between at least two of a plurality of layers of the aerogel composition. In some embodiments, the heat control member or battery thermal management member can include particles of the conductive material disposed within a layer of the heat control member or battery thermal management member, e.g., within a layer of the aerogel composition.

In exemplary embodiments, the heat control member or battery thermal management member can include a materials or layers of material providing thermal capacitance (i.e., a thermally capacitive material), e.g., a material having a specific heat capacity of at least about 0.3 J/(g-C). In some embodiments, the material providing thermal capacitance has a specific heat capacity of at least about 0.5 J/(g-C). For example, the material providing thermal capacity can include metals such as aluminum, titanium, nickel, steel, iron, or combinations thereof. In some embodiments, the heat control member or battery thermal management member can include a layer or coating of the material providing thermal capacitance. In some embodiments, the heat control member or battery thermal management member can include particles of the material providing thermal capacitance disposed within a layer of the heat control member or battery thermal management member, e.g., within a layer of the aerogel composition. In certain embodiments, the heat control member or battery thermal management member can include at least one layer of a material providing thermal capacitance disposed adjacent to the aerogel composition. In certain embodiments, the heat control member or battery thermal management member can include at least one layer of a material providing thermal capacitance disposed between at least two of a plurality of layers of the aerogel composition. In exemplary embodiments, the heat control member or battery thermal management member can include both thermally conductive and thermally capacitive materials. For example, the heat control member or battery thermal management member can include a material that provides both thermal capacitance and thermal conductivity, e.g., a metal such as aluminum, titanium, nickel, steel, iron, or combinations thereof. For another example, the heat control member or battery thermal management member can include one or more different materials or layers of material that each provide either thermal capacitance, thermal conductivity, or a combination thereof, e.g., a layer including metal and a layer including thermally conductive polymer.

In some embodiments, thermal pastes can be used between layers of the heat control member or battery thermal management member to ensure even and consistent thermal conduction between such layers. As used herein, thermal paste refers to various materials also known as thermal compound, thermal grease, thermal interface material (TIM), thermal gel, heat paste, heat sink compound, and heat sink paste. For example, a layer of thermal paste can be disposed between the aerogel composition and other layers such as the layer or layers including thermally conductive or thermally capacitive materials.

In embodiments of the aspects disclosed herein, the composition can further include at least one facing layer, as discussed in more detail below. For example, the facing layer can be a layer selected from the group consisting of a polymeric sheet, a metallic sheet, a fibrous sheet, and a fabric sheet. In exemplary embodiments, the facing layer can include the conductive material, the material providing thermal capacity, or a combination thereof. In some embodiments, the facing layer can be attached to the composition, e.g., by an adhesive mechanism selected from the consisting of: an aerosol adhesive, a urethane-based adhesive, an acrylate adhesive, a hot melt adhesive, an epoxy, a rubber resin adhesive; a polyurethane composite adhesive, and combinations thereof. In some embodiments, the facing layer can be attached to the composition by a non-adhesive mechanism, e.g., a mechanism selected from the group consisting of: flame bonding, stitching, sealing bags, rivets, buttons, clamps, wraps, braces, and combinations thereof. In some embodiments, a combination of any of the aforementioned adhesive and non-adhesive mechanisms can be used to attach a facing layer to the composition. In some embodiments of the above aspects, the heat control member or battery thermal management member can further include at least one layer of conductive material or thermally capacitive material. For example, the at least one layer of conductive or thermally capacitive material can include metal, carbon, conductive polymer, or combinations thereof. In some examples, the at least one layer of conductive material comprising carbon can be a highly oriented graphite material, e.g., a pyrolytic graphite sheet or similar material.

In embodiments of the aspects disclosed herein, the one or more additives are selected from the group consisting of boron carbide, diatomite, manganese ferrite, MnO, NiO, SnO, $Ag_2O$, $Bi_2O_3$, carbon black, graphite, titanium oxide, iron titanium oxide, aluminum oxide, zirconium silicate, zirconium oxide, iron (II) oxide, iron (III) oxide, manganese dioxide, iron titanium oxide (ilmenite), chromium oxide, silicon carbide, titanium carbide, tungsten carbide, or mixtures thereof. In certain embodiments, the one or more additives can include silicon carbide. In particular embodiments, the one or more additives excludes whiskers or fibers of silicon carbide.

In some embodiments, the aerogel composition further includes one or more additional additives. For example, the one or more additional additives include fire-class additives. In these or other embodiments of the above aspects, the composition is low-flammable, non-flammable, low-combustible, or non-combustible. In some embodiments, the additives include a clay mineral, for example, kaolin. In these or other embodiments, the one or more additives include a combination of fire-class additives and opacifers.

Furthermore, aerogel materials or framework of the various embodiments of the present disclosure are practiced with aerogel particle-based slurries or suspensions infiltrated into the reinforcement materials described in various embodiments. Various embodiments of the present disclosure may be practiced with non-particulate aerogel materials produced in-situ by infiltrating the reinforcement materials with various gel precursors in suitable solvent and followed by the removal of the solvent using various methods, including using supercritical fluids, or at elevated temperatures and ambient pressures or at sub-critical pressures.

In separate embodiments, the current disclosure includes a heat control member or battery thermal management member including an aerogel composition, e.g., OCMF-reinforced or fiber-reinforced aerogel composition, comprising one or more—or even all—of the foregoing features and characteristics, including various combinations and methods of manufacture thereof.

Embodiments of the thermal barriers and aerogel compositions disclosed herein are useful for separating, insulating and protecting battery cells or battery components of batteries of any configuration, e.g., pouch cells, cylindrical cells, prismatic cells, as well as packs and modules incorporating or including any such cells. The thermal barriers and aerogel compositions disclosed herein are useful in lithium ion batteries, solid state batteries, and any other energy storage device or technology in which separation, insulation, and protection are necessary.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

DETAILED DESCRIPTION

Figure 1:
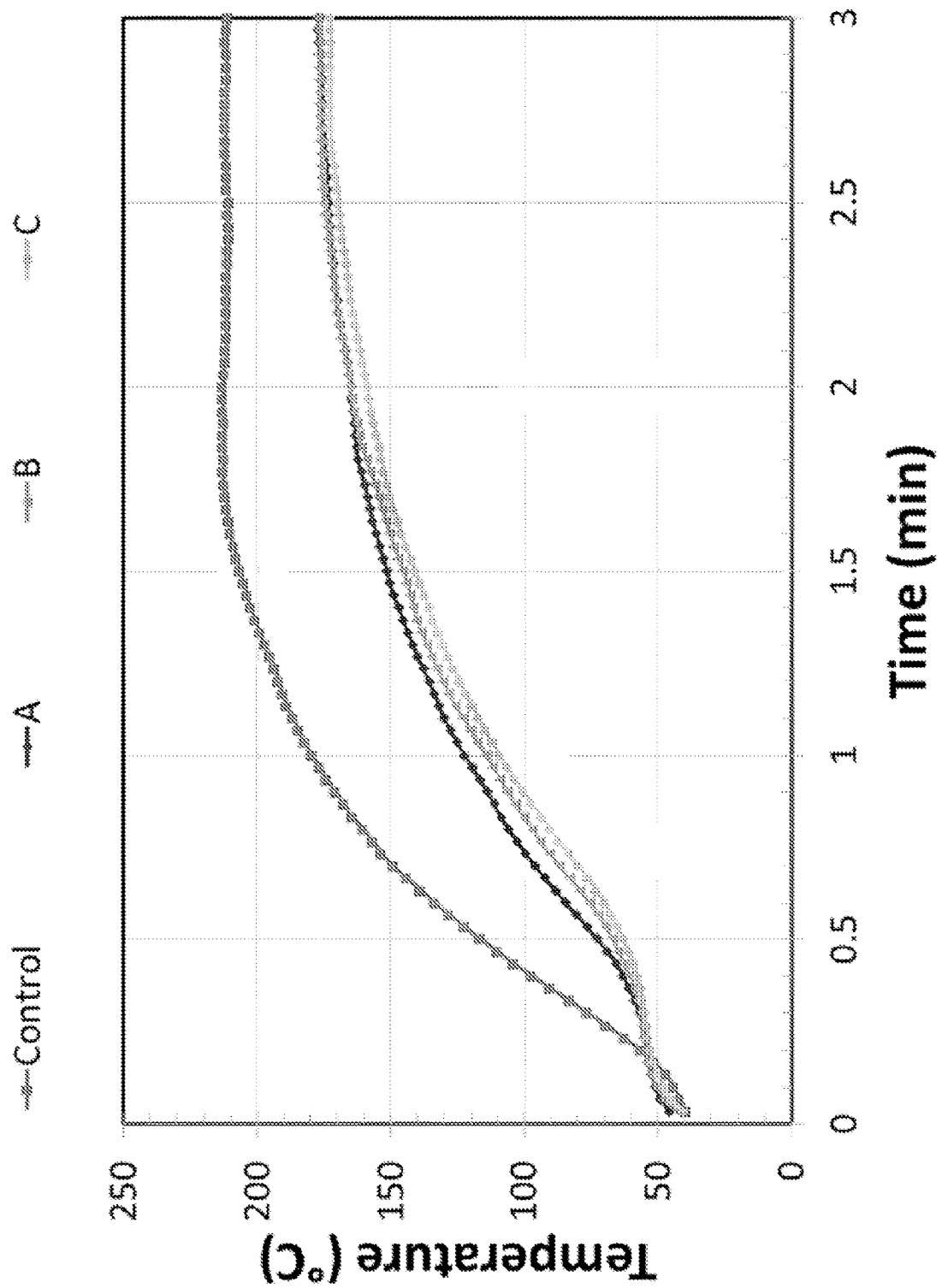
FIG. 1 is a chart showing heat control member or battery thermal management members controlling time-to-temperature behavior according to certain embodiments disclosed herein.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means ±5% of the numerical. In an embodiment, the term "about" can include traditional rounding according to significant figures of the numerical value. In addition, the phrase "about 'x' to 'y'" includes "about 'x' to about 'y'".

As used herein, the terms "composition" and "composite" are used interchangeably.

Aerogels are a class of porous materials with open-cells comprising a framework of interconnected structures, with a corresponding network of pores integrated within the framework, and an interstitial phase within the network of pores primarily comprised of gases such as air. Aerogels are typically characterized by a low density, a high porosity, a large surface area, and small pore sizes. Aerogels can be distinguished from other porous materials by their physical and structural properties.

Within the context of the present disclosure, the term "aerogel" or "aerogel material" refers to a gel comprising a framework of interconnected structures, with a corresponding network of interconnected pores integrated within the framework, and containing gases such as air as a dispersed interstitial medium; and which is characterized by the following physical and structural properties (according to Nitrogen Porosimetry Testing) attributable to aerogels: (a) an average pore diameter ranging from about 2 nm to about 100 nm, (b) a porosity of at least 80% or more, and (c) a surface area of about 100 $m^2/g$ or more.

Aerogel materials of the present disclosure thus include any aerogels or other open-celled materials which satisfy the defining elements set forth in previous paragraphs; including materials which can be otherwise categorized as xerogels, cryogels, ambigels, microporous materials, and the like.

Aerogel materials may also be further characterized by additional physical properties, including: (d) a pore volume of about 2.0 mL/g or more, particularly about 3.0 mL/g or more; (e) a density of about 0.50 g/cc or less, particularly about 0.3 g/cc or less, more particularly about 0.25 g/cc or less; and (f) at least 50% of the total pore volume comprising pores having a pore diameter of between 2 and 50 nm (although embodiments disclosed herein include aerogel frameworks and compositions that include pores having a pore diameter greater than 50 nm, as discussed in more detail below). However, satisfaction of these additional properties is not required for the characterization of a compound as an aerogel material.

Within the context of the present disclosure, the term "innovative processing and extraction techniques" refers to methods of replacing a liquid interstitial phase in a wet-gel material with a gas such as air, in a manner which causes low pore collapse and low shrinkage to the framework structure of the gel. Drying techniques, such as ambient pressure evaporation, often introduce strong capillary pressures and other mass transfer limitations at the liquid-vapor interface of the interstitial phase being evaporated or removed. The strong capillary forces generated by liquid evaporation or removal can cause significant pore shrinkage and framework collapse within the gel material. The use of innovative processing and extraction techniques during the extraction of a liquid interstitial phase reduces the negative effects of capillary forces on the pores and the framework of a gel during liquid extraction (also referred to as solvent removal or drying).

In certain embodiments, an innovative processing and extraction technique uses near critical or supercritical fluids, or near critical or super critical conditions, to extract the liquid interstitial phase from a wet-gel material. This can be accomplished by removing the liquid interstitial phase from the gel near or above the critical point of the liquid or mixture of liquids. Co-solvents and solvent exchanges can be used to optimize the near critical or super critical fluid extraction process.

In certain embodiments, an innovative processing and extraction technique includes the modification of the gel framework to reduce the irreversible effects of capillary pressures and other mass transfer limitations at the liquid-vapor interface. This embodiment can include the treatment of a gel framework with a hydrophobizing agent, or other functionalizing agents, which allow a gel framework to withstand or recover from any collapsing forces during liquid extraction conducted below the critical point of the liquid interstitial phase. This embodiment can also include the incorporation of functional groups or framework elements, which provide a framework modulus that is sufficiently high to withstand or recover from collapsing forces during liquid extraction conducted below the critical point of the liquid interstitial phase.

Within the context of the present disclosure, the terms "framework" or "framework structure" refer to a network of interconnected oligomers, polymers, or particles that form the solid structure of a material. Within the context of the present disclosure, the terms "aerogel framework" or "aerogel framework structure" refer to the network of interconnected oligomers, polymers, or colloidal particles that form the solid structure of a gel or an aerogel. The polymers or particles that make up the aerogel framework structure typically have a diameter of about 100 angstroms. However, framework structures of the present disclosure may also include networks of interconnected oligomers, polymers, or colloidal particles of all diameter sizes that form the solid structure within a material such as a gel or aerogel. Furthermore, the terms "silica-based aerogel" or "silica-based aerogel framework" refer to an aerogel framework in which silica comprises at least 50% (by weight) of the oligomers, polymers, or colloidal particles that form the solid framework structure within in the gel or aerogel.

Within the context of the present disclosure, the term "aerogel composition" refers to any composite material that includes aerogel material as a component of the composite. Examples of aerogel compositions include, but are not limited to fiber-reinforced aerogel composites; aerogel composites which include additive elements such as opacifiers; aerogel composites reinforced by open-cell macroporous frameworks; aerogel-polymer composites; and composite materials which incorporate aerogel particulates, particles, granules, beads, or powders into a solid or semi-solid material, such as in conjunction with binders, resins, cements, foams, polymers, or similar solid materials. Aerogel compositions are generally obtained after the removal of the solvent from various gel materials disclosed herein. Aerogel compositions thus obtained may further be subjected to additional processing or treatment. The various gel materials may also be subjected to additional processing or treatment otherwise known or useful in the art before subjected to solvent removal (or liquid extraction or drying).

Within the context of the present disclosure, the term "monolithic" refers to aerogel materials in which a majority (by weight) of the aerogel included in the aerogel material or composition is in the form of a unitary interconnected aerogel nanostructure. Monolithic aerogel materials include aerogel materials which are initially formed to have a unitary interconnected gel or aerogel nanostructure, but which are subsequently cracked, fractured, or segmented into non-unitary aerogel nanostructures. Monolithic aerogel materials are differentiated from particulate aerogel materials. The term "particulate aerogel material" refers to aerogel materials in which a majority (by weight) of the aerogel included in the aerogel material is in the form of particulates, particles, granules, beads, or powders, which can be combined or compressed together but which lack an interconnected aerogel nanostructure between individual particles.

Within the context of the present disclosure, the term "wet gel" refers to a gel in which the mobile interstitial phase within the network of interconnected pores is primarily comprised of a liquid, such as a conventional solvent, liquefied gases like liquid carbon dioxide, or a combination thereof. Aerogels typically require the initial production of a wet gel, followed by innovative processing and extraction to replace the mobile interstitial liquid in the gel with air. Examples of wet gels include, but are not limited to alcogels, hydrogels, ketogels, carbonogels, and any other wet gels known to those in the art.

Aerogel compositions of the present disclosure may comprise reinforced aerogel compositions. Within the context of the present disclosure, the term "reinforced aerogel composition" refers to aerogel compositions comprising a reinforcing phase within the aerogel material, where the reinforcing phase is not part of the aerogel framework itself. The reinforcing phase may be any material that provides increased flexibility, resilience, conformability, or structural stability to the aerogel material. Examples of well-known reinforcing materials include, but are not limited to open-cell macroporous framework reinforcement materials, closed-cell macroporous framework reinforcement materials, open-cell membranes, honeycomb reinforcement materials, polymeric reinforcement materials, and fiber reinforcement materials such as discrete fibers, woven materials, non-woven materials, needled non-wovens, battings, webs, mats, and felts.

Within the context of the present disclosure, the term "fiber-reinforced aerogel composition" refers to a reinforced aerogel composition which comprises a fiber reinforcement material as a reinforcing phase. Examples of fiber reinforcement materials include, but are not limited to, discrete fibers, woven materials, non-woven materials, bans, battings, webs, mats, felts, or combinations thereof. Fiber reinforcement materials can comprise a range of materials, including, but not limited to: Polyesters, polyolefin terephthalates, poly (ethylene) naphthalate, polycarbonates (examples Rayon, Nylon), cotton, (e.g. lycra manufactured by DuPont), carbon (e.g. graphite), polyacrylonitriles (PAN), oxidized PAN, uncarbonized heat treated PANs (such as those manufactured by SGL carbon), glass or fiberglass based material (like S-glass, 901 glass, 902 glass, 475 glass, E-glass) silica based fibers like quartz, (e.g. Quartzel manufactured by Saint-Gobain), Q-felt (manufactured by Johns Manville), Saffil (manufactured by Saffil), Durablanket (manufactured by Unifrax) and other silica fibers, Duraback (manufactured by Carborundum), Polyaramid fibers like Kevlar, Nomex, Sontera (all manufactured by DuPont), Conex (manufactured by Taijin), polyolefins like Tyvek (manufactured by DuPont), Dyneema (manufactured by DSM), Spectra (manufactured by Honeywell), other polypropylene fibers like Typar, Xavan (both manufactured by DuPont), fluoropolymers like PTFE with trade names as Teflon (manufactured by DuPont), Goretex (manufactured by W. L. GORE), Silicon carbide fibers like Nicalon (manufactured by COI Ceramics), ceramic fibers like Nextel (manufactured by 3M), Acrylic polymers, fibers of wool, silk, hemp, leather, suede, PBO—Zylon fibers (manufactured by Tyobo), Liquid crystal material like Vectan (manufactured by Hoechst), Cambrelle fiber (manufactured by DuPont), Polyurethanes, polyamaides, Wood fibers, Boron, Aluminum, Iron, Stainless Steel fibers and other thermoplastics like PEEK, PES, PEI, PEK, PPS. The glass or fiberglass-based fiber reinforcement materials may be manufactured using one or more techniques. In certain embodiments, it is desirable to make them using a carding and cross-lapping or air-laid process. In exemplary embodiments, carded and cross-lapped glass or fiberglass-based fiber reinforcement materials provide certain advantages over air-laid materials. For example, carded and cross-lapped glass or fiberglass-based fiber reinforcement materials can provide a consistent material thickness for a given basis weight of reinforcement material. In certain additional embodiments, it is desirable to further needle the fiber reinforcement materials with a need to interlace the fibers in z-direction for enhanced mechanical and other properties in the final aerogel composition.

Reinforced aerogel compositions of the present disclosure may comprise aerogel compositions reinforced with open-cell macroporous framework materials. Within the context of the present disclosure, the term "open-cell macroporous framework" or "OCMF" refers to a porous material comprising a framework of interconnected structures of substantially uniform composition, with a corresponding network of interconnected pores integrated within the framework; and which is characterized by an average pore diameter ranging from about 10 μm to about 700 μm Such average pore diameter may be measured by known techniques, including but not limited to, Microscopy with optical analysis. OCMF materials of the present disclosure thus include any open-celled materials that satisfy the defining elements set forth in this paragraph, including compounds that can be otherwise categorized as foams, foam-like materials, macroporous materials, and the like. OCMF materials can be differentiated from materials comprising a framework of interconnected structures that have a void volume within the framework and that do not have a uniform composition, such as collections of fibers and binders having a void volume within the fiber matrix.

Within the context of the present disclosure, the term "substantially uniform composition" refers to uniformity in the composition of the referred material within 10% tolerance.

Within the context of the present disclosure, the term "OCMF-reinforced aerogel composition" refers to a reinforced aerogel composition comprising an open-cell macroporous framework material as a reinforcing phase. Suitable OCMF materials for use in the present disclosure include, but are not limited to, OCMF materials made from organic polymeric materials. Examples include OCMF materials made from polyolefins, polyurethanes, phenolics, melamine, cellulose acetate, and polystyrene. Within the context of the present disclosure, the term "organic OCMF" refers to OCMF materials having a framework comprised primarily of organic polymeric materials. OCMF materials made from melamine or melamine derivatives are also preferred in certain embodiments. Within the context of the present disclosure, the terms "melamine OCMF" or "melamine-based OCMF" refer to organic OCMF materials having a framework comprised primarily of polymeric materials derived from reacting melamine with a condensation agent, such as formaldehyde. Examples of OCMF materials made from melamine or melamine derivatives for use in the present disclosure are presented in U.S. Pat. Nos. 8,546,457; 4,666,948; and WO 2001/094436. The term "inorganic OCMF" refers to OCMF materials having a framework comprised primarily of inorganic materials. Examples of inorganic OCMF include, but not limited to, cementous materials, gypsum, and calcium silicate.

Within the context of the present disclosure, the term "foam" refers to a material comprising a framework of interconnected polymeric structures of substantially uniform composition, with a corresponding network or collection of pores integrated within the framework, and which is formed by dispersing a proportion of gas in the form of bubbles into a liquid or resin foam material such that the gas bubbles are retained as pores as the foam material solidifies into a solid structure. In general, foams can be made using a wide variety of processes—see, for example, U.S. Pat. Nos. 6,147,134; 5,889,071; 6,187,831; and 5,229,429. Foam materials of the present disclosure thus include any materials that satisfy the defining elements set forth in this paragraph, including compounds that can be otherwise categorized as OCMF materials, macroporous materials, and the like. Foams as defined in the present disclosure may be in the types of thermoplastics, elastomers, and thermosets (duromers).

The pores within a solid framework can also be referred to as "cells". Cells can be divided by cell walls or membranes, creating a collection of independent closed pores within the porous material. The term "closed cell" refers to porous materials in which at least 50% of the pore volume is [substantially] confined cells enclosed by membranes or walls. Cells in a material can also be interconnected through cell openings, creating a network of interconnected open pores within the material. The term "open cell" refers to porous materials in which at least 50% of the pore volume is open cells. The open-cell material may comprise a reticulated open-cell material, a non-reticulated open-cell material, or a combination thereof. Reticulated materials are open cell materials produced through a reticulation process that eliminates or punctures cell membranes within the porous material. Reticulated materials typically have a higher concentration of open cells than non-reticulated materials, but tend to be more expensive and difficult to produce. Generally, no porous material has entirely one type of cell structure (open cell or closed cell). Porous materials may be made using a wide variety of processes, including foam production processes presented in U.S. Pat. Nos. 6,147,134; 5,889,071; 6,187,831; 5,229,429; 4,454,248; and US Patent Application No 2007/0213417.

Within the context of the present disclosure, the terms "aerogel blanket" or "aerogel blanket composition" refer to aerogel compositions reinforced with a continuous sheet of reinforcement material. Aerogel blanket compositions can be differentiated from other reinforced aerogel compositions that are reinforced with a non-continuous reinforcement material, such as separated agglomerates or clumps of reinforcement materials. Aerogel blanket compositions are particularly useful for applications requiring flexibility, since they are highly conformable and may be used like a blanket to cover surfaces of simple or complex geometry, while also retaining the excellent thermal insulation properties of aerogels.

Within the context of the present disclosure, the terms "flexible" and "flexibility" refer to the ability of an aerogel material or composition to be bent or flexed without macro-structural failure. Aerogel compositions of the present disclosure are capable of bending at least 5°, at least 25°, at least 45°, at least 65°, or at least 85° without macroscopic failure; and/or have a bending radius of less than 4 feet, less than 2 feet, less than 1 foot, less than 6 inches, less than 3 inches, less than 2 inches, less than 1 inch, or less than ½ inch without macroscopic failure. Likewise, the terms "highly flexible" or "high flexibility" refer to aerogel materials or compositions capable of bending to at least 90° and/or have a bending radius of less than ½ inch without macroscopic failure. Furthermore, the terms "classified flexible" and "classified as flexible" refer to aerogel materials or compositions which can be classified as flexible according to ASTM C1101 (ASTM International, West Conshohocken, PA).

Aerogel compositions of the present disclosure can be flexible, highly flexible, and/or classified flexible. Aerogel compositions of the present disclosure can also be drapable. Within the context of the present disclosure, the terms "drapable" and "drapability" refer to the ability of an aerogel material or composition to be bent or flexed to 90° or more with a radius of curvature of about 4 inches or less, without macroscopic failure. Aerogel materials or compositions according to certain embodiments of the current disclosure are flexible such that the composition is non-rigid and may be applied and conformed to three-dimensional surfaces or objects, or pre-formed into a variety of shapes and configurations to simplify installation or application.

Within the context of the present disclosure, the terms "additive" or "additive element" refer to materials that may be added to an aerogel composition before, during, or after the production of the aerogel. Additives may be added to alter or improve desirable properties in an aerogel, or to counteract undesirable properties in an aerogel. Additives are typically added to an aerogel material either prior to gelation to precursor liquid, during gelation to a transition state material or after gelation to a solid or semi solid material. Examples of additives include, but are not limited to microfibers, fillers, reinforcing agents, stabilizers, thickeners, elastic compounds, opacifiers, coloring or pigmentation compounds, radiation absorbing compounds, radiation reflecting compounds, fire-class additives, corrosion inhibitors, thermally conductive components, components providing thermal capacitance, phase change materials, pH adjustors, redox adjustors, HCN mitigators, off-gas mitigators, electrically conductive compounds, electrically dielectric compounds, magnetic compounds, radar blocking components, hardeners, anti-shrinking agents, and other aerogel additives known to those in the art. In some embodiments, components providing thermal capacity can include materials having a specific heat capacity of at least about 0.3 J/(g-C). In some embodiments, the material providing thermal capacitance has a specific heat capacity of at least about 0.5 J/(g-C). For example, the material providing thermal capacity can include metals such as aluminum, titanium, nickel, steel, iron, or combinations thereof. In some embodiments, the heat control member or battery thermal management member can include a layer or coating of the material providing thermal capacitance. In some embodiments, the heat control member or battery thermal management member can include particles of the material providing thermal capacitance disposed within a layer of the heat control member or battery thermal management member. In certain embodiments, the heat control member or battery thermal management member can include at least one layer of a material providing thermal capacitance disposed adjacent to the aerogel composition. In certain embodiments, the heat control member or battery thermal management member can include at least one layer of a material providing thermal capacitance disposed between at least two of a plurality of layers of the aerogel composition.

In certain embodiments, the aerogel compositions, reinforced aerogel compositions, and heat control member or battery thermal management members disclosed herein can perform during high temperature events, e.g., provide thermal protection during high temperature events as disclosed herein. High temperature events are characterized by a sustained heat flux of at least about 25 kW/m$^2$, at least about 30 kW/m$^2$, at least about 35 kW/m$^2$ or at least about 40 kW/m$^2$ over an area of at least about 1 cm$^2$ for at least 2 seconds. A heat flux of about 40 kW/m$^2$ has been associated with that arising from typical fires (Behavior of Charring Solids under Fire-Level Heat Fluxes; Milosavljevic, I., Suuberg, E. M.; NISTIR 5499; September 1994). In a special case, the high temperature event is a heat flux of heat flux of about 40 kW/m over an area of at least about 10 cm$^2$ for a duration of at least 1 minute.

Within the context of the present disclosure, the terms "thermal conductivity" and "TC" refer to a measurement of the ability of a material or composition to transfer heat between two surfaces on either side of the material or composition, with a temperature difference between the two surfaces. Thermal conductivity is specifically measured as the heat energy transferred per unit time and per unit surface area, divided by the temperature difference. It is typically recorded in SI units as mW/m*K (milliwatts per meter*Kelvin). The thermal conductivity of a material may be determined by test methods known in the art, including, but not limited to Test Method for Steady-State Thermal Transmission Properties by Means of the Heat Flow Meter Apparatus (ASTM C518, ASTM International, West Conshohocken, PA); a Test Method for Steady-State Heat Flux Measurements and Thermal Transmission Properties by Means of the Guarded-Hot-Plate Apparatus (ASTM C177, ASTM International, West Conshohocken, PA); a Test Method for Steady-State Heat Transfer Properties of Pipe Insulation (ASTM C335, ASTM International, West Conshohocken, PA); a Thin Heater Thermal Conductivity Test (ASTM C1114, ASTM International, West Conshohocken, PA); Standard Test Method for Thermal Transmission Properties of Thermally Conductive Electrical Insulation Materials (ASTM D5470, ASTM International, West Conshohocken, PA); Determination of thermal resistance by means of guarded hot plate and heat flow meter methods (EN 12667, British Standards Institution, United Kingdom); or Determination of steady-state thermal resistance and related properties—Guarded hot plate apparatus (ISO 8203, International Organization for Standardization, Switzerland). Due to different methods possibly resulting in different results, it should be understood that within the context of the present disclosure and unless expressly stated otherwise, thermal conductivity measurements are acquired according to ASTM C518 standard (Test Method for Steady-State Thermal Transmission Properties by Means of the Heat Flow Meter Apparatus), at a temperature of about 37.5° C. at atmospheric pressure in ambient environment, and under a compression load of about 2 psi. The measurements reported as per ASTM C518 typically correlate well with any measurements made as per EN 12667 with any relevant adjustment to the compression load. In certain embodiments, aerogel materials or compositions of the present disclosure have a thermal conductivity of about 40 mW/mK or less, about 30 mW/mK or less, about 25 mW/mK or less, about 20 mW/mK or less, about 18 mW/mK or less, about 14 mW/mK or less, about 12 mW/mK or less, about 10 mW/mK or less, about 5 mW/mK or less, or in a range between any two of these values.

Thermal conductivity measurements can also be acquired at a temperature of about 10° C. at atmospheric pressure under compression. Thermal conductivity measurements at 10° C. are generally 0.5-0.7 mW/mK lower than corresponding thermal conductivity measurements at 37.5° C. In certain embodiments, aerogel materials or compositions of the present disclosure have a thermal conductivity at 10° C. of about 40 mW/mK or less, about 30 mW/mK or less, about 25 mW/mK or less, about 20 mW/mK or less, about 18 mW/mK or less, about 16 mW/mK or less, about 14 mW/mK or less, about 12 mW/mK or less, about 10 mW/mK or less, about 5 mW/mK or less, or in a range between any two of these values.

Within the context of the present disclosure, the term "density" refers to a measurement of the mass per unit volume of an aerogel material or composition. The term "density" generally refers to the apparent density of an aerogel material, as well as the bulk density of an aerogel composition. Density is typically recorded as kg/m$^3$ or g/cc. The density of an aerogel material or composition may be determined by methods known in the art, including, but not limited to Standard Test Method for Dimensions and Density of Preformed Block and Board—Type Thermal Insulation (ASTM C303, ASTM International, West Conshohocken, PA); Standard Test Methods for Thickness and Density of Blanket or Batt Thermal Insulations (ASTM C167, ASTM International, West Conshohocken, PA); Determination of the apparent density of preformed pipe insulation (EN 13470, British Standards Institution, United Kingdom); or Determination of the apparent density of preformed pipe insulation (ISO 18098, International Organization for Standardization, Switzerland). Due to different methods possibly resulting in different results, it should be understood that within the context of the present disclosure, density measurements are acquired according to ASTM C167 standard (Standard Test Methods for Thickness and Density of Blanket or Batt Thermal Insulations) at 2 psi compression for thickness measurement, unless otherwise stated. In certain embodiments, aerogel materials or compositions of the present disclosure have a density of about 0.60 g/cc or less, about 0.50 g/cc or less, about 0.40 g/cc or less, about 0.30 g/cc or less, about 0.25 g/cc or less, about 0.20 g/cc or less, about 0.18 g/cc or less, about 0.16 g/cc or less, about 0.14 g/cc or less, about 0.12 g/cc or less, about 0.10 g/cc or less, about 0.05 g/cc or less, about 0.01 g/cc or less, or in a range between any two of these values.

Within the context of the present disclosure, the term "hydrophobicity" refers to a measurement of the ability of an aerogel material or composition to repel water.

Hydrophobicity of an aerogel material or composition may be expressed in terms of the liquid water uptake. Within the context of the present disclosure, the term "liquid water uptake" refers to a measurement of the potential of an aerogel material or composition to absorb or otherwise retain liquid water. Liquid water uptake can be expressed as a percent (by weight or by volume) of water that is absorbed or otherwise retained by an aerogel material or composition when exposed to liquid water under certain measurement conditions. The liquid water uptake of an aerogel material or composition may be determined by methods known in the art, including, but not limited to Standard Test Method for Determining the Water Retention (Repellency) Characteristics of Fibrous Glass Insulation (ASTM C1511, ASTM International, West Conshohocken, PA); Standard Test Method for Water Absorption by Immersion of Thermal Insulation Materials (ASTM C1763, ASTM International, West Conshohocken, PA); Thermal insulating products for building applications: Determination of short term water absorption by partial immersion (EN 1609, British Standards Institution, United Kingdom). Due to different methods possibly resulting in different results, it should be understood that within the context of the present disclosure, measurements of liquid water uptake are acquired according to ASTM C1511 standard (Standard Test Method for Determining the Water Retention (Repellency) Characteristics of Fibrous Glass Insulation), under ambient pressure and temperature, unless otherwise stated. In certain embodiments, aerogel materials or compositions of the present disclosure can have a liquid water uptake of about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. An aerogel material or composition that has improved liquid water uptake relative to another aerogel material or composition will have a lower percentage of liquid water uptake/retention relative to the reference aerogel materials or compositions.

Hydrophobicity of an aerogel material or composition can be expressed in terms of the water vapor uptake. Within the context of the present disclosure, the term "water vapor uptake" refers to a measurement of the potential of an aerogel material or composition to absorb water vapor. Water vapor uptake can be expressed as a percent (by weight) of water that is absorbed or otherwise retained by an aerogel material or composition when exposed to water vapor under certain measurement conditions. The water vapor uptake of an aerogel material or composition may be determined by methods known in the art, including, but not limited to Standard Test Method for Determining the Water Vapor Sorption of Unfaced Mineral Fiber Insulation (ASTM C1104, ASTM International, West Conshohocken, PA); Thermal insulating products for building applications: Determination of long term water absorption by diffusion (EN 12088, British Standards Institution, United Kingdom). Due to different methods possibly resulting in different results, it should be understood that within the context of the present disclosure, measurements of water vapor uptake are acquired according to ASTM C1104 standard (Standard Test Method for Determining the Water Vapor Sorption of Unfaced Mineral Fiber Insulation) at 49° C. and 95% humidity for 24 hours (modified from 96 hours according to the ASTM C1104 standard) under ambient pressure, unless otherwise stated. In certain embodiments, aerogel materials or compositions of the present disclosure can have a water vapor uptake of about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. An aerogel material or composition that has improved water vapor uptake relative to another aerogel material or composition will have a lower percentage of water vapor uptake/retention relative to the reference aerogel materials or compositions.

Hydrophobicity of an aerogel material or composition can be expressed by measuring the equilibrium contact angle of a water droplet at the interface with the surface of the material. Aerogel materials or compositions of the present disclosure can have a water contact angle of about 90° or more, about 120° or more, about 130° or more, about 140° or more, about 150° or more, about 160° or more, about 170° or more, about 175° or more, or in a range between any two of these values.

Within the context of the present disclosure, the terms "heat of combustion", "HOC" and "$\Delta H_S$" refer to a measurement of the amount of heat energy released in the combustion or exothermic thermal decomposition of a material or composition. Heat of combustion is typically recorded in calories of heat energy released per gram of aerogel material or composition (cal/g), or as megajoules of heat energy released per kilogram of material or composition (MJ/kg). The heat of combustion of a material or composition may be determined by methods known in the art, including, but not limited to Reaction to fire tests for products—Determination of the gross heat of combustion (calorific value) (EN ISO 1716, International Organization for Standardization, Switzerland; EN adopted). Within the context of the present disclosure, heat of combustion measurements are acquired according to EN ISO 1716 standards (Reaction to fire tests for products—Determination of the gross heat of combustion (calorific value)), unless otherwise stated. In certain embodiments, aerogel compositions of the present disclosure may have a heat of combustion of about 750 cal/g or less, about 717 cal/g or less, about 700 cal/g or less, about 650 cal/g or less, about 600 cal/g or less, about 575 cal/g or less, about 550 cal/g or less, about 500 cal/g or less, about 450 cal/g or less, about 400 cal/g or less, about 350 cal/g or less, about 300 cal/g or less, about 250 cal/g or less, about 200 cal/g or less, about 150 cal/g or less, about 100 cal/g or less, about 50 cal/g or less, about 25 cal/g or less, about 10 cal/g or less, or in a range between any two of these values. An aerogel composition that has an improved heat of combustion relative to another aerogel composition will have a lower heat of combustion value, relative to the reference aerogel compositions. In certain embodiments of the present disclosure, the HOC of an aerogel composite is improved by incorporating a fire-class additive into the aerogel composite.

Within the context of the present disclosure, all thermal analyses and related definitions are referenced with measurements performed by starting at 25° C. and ramping at a rate of 20° C. per minute up to 1000° C. in air at ambient pressure. Accordingly, any changes in these parameters will have to be accounted for (or re-performed under these conditions) in measuring and calculating onset of thermal decomposition, temperature of peak heat release, temperature of peak hear absorption and the like.

Within the context of the present disclosure, the terms "onset of thermal decomposition" and "TD" refer to a measurement of the lowest temperature of environmental heat at which rapid exothermic reactions from the decomposition of organic material appear within a material or composition. The onset of thermal decomposition of organic material within a material or composition may be measured using thermo-gravimetric analysis (TGA). The TGA curve of a material depicts the weight loss (% mass) of a material as it is exposed to an increase in surrounding temperature, thus indicating thermal decomposition. The onset of thermal decomposition of a material can be correlated with the intersection point of the following tangent lines of the TGA curve: a line tangent to the base line of the TGA curve, and a line tangent to the TGA curve at the point of maximum slope during the rapid exothermic decomposition event related to the decomposition of organic material. Within the context of the present disclosure, measurements of the onset of thermal decomposition of organic material are acquired using TGA analysis as provided in this paragraph, unless otherwise stated.

The onset of thermal decomposition of a material may also be measured using differential scanning calorimetry (DSC) analysis. The DSC curve of a material depicts the heat energy (mW/mg) released by a material as it is exposed to a gradual increase in surrounding temperature. The onset of thermal decomposition temperature of a material can be correlated with the point in the DSC curve where the Δ mW/mg (change in the heat energy output) maximally increases, thus indicating exothermic heat production from the aerogel material. Within the context of the present disclosure, measurements of onset of thermal decomposition using DSC, TGA, or both are acquired using a temperature ramp rate of 20° C./min as further defined in the previous paragraph, unless otherwise stated expressly. DSC and TGA each provide similar values for this onset of thermal decomposition, and many times, the tests are run concurrently, so that results are obtained from both. In certain embodiments, aerogel materials or compositions of the present disclosure have an onset of thermal decomposition of about 300° C. or more, about 320° C. or more, about 340° C. or more, about 360° C. or more, about 380° C. or more, about 400° C. or more, about 420° C. or more, about 440° C. or more, about 460° C. or more, about 480° C. or more, about 500° C. or more, about 550° C. or more, about 600° C. or more, or in a range between any two of these values. Within the context herein, for example, a first composition having an onset of thermal decomposition that is higher than an onset of thermal decomposition of a second composition, would be considered an improvement of the first composition over the second composition. It is contemplated herein that onset of thermal decomposition of a composition or material is increased when adding one or more fire-class additives, as compared to a composition that does not include any fire-class additives.

Within the context of the present disclosure, the terms "onset of endothermic decomposition" and "TED" refer to a measurement of the lowest temperature of environmental heat at which endothermic reactions from decomposition or dehydration appear within a material or composition. The onset of endothermic decomposition of a material or composition may be measured using thermo-gravimetric analysis (TGA). The TGA curve of a material depicts the weight loss (% mass) of a material as it is exposed to an increase in surrounding temperature. The onset of thermal decomposition of a material may be correlated with the intersection point of the following tangent lines of the TGA curve: a line tangent to the base line of the TGA curve, and a line tangent to the TGA curve at the point of maximum slope during the rapid endothermic decomposition or dehydration of the material. Within the context of the present disclosure, measurements of the onset of endothermic decomposition of a material or composition are acquired using TGA analysis as provided in this paragraph, unless otherwise stated.

Within the context of the present disclosure, the terms "furnace temperature rise" and "$\Delta T_R$" refer to a measurement of the difference between a maximum temperature ($T_{MAX}$) of a material or composition under thermal decomposition conditions relative to a baseline temperature of that material or composition under the thermal decomposition conditions (usually the final temperature, or $T_{FIN}$). Furnace temperature rise is typically recorded in degrees Celsius, or ° C. The furnace temperature rise of a material or composition may be determined by methods known in the art, including, but not limited to Reaction to fire tests for building and transport products: Non-combustibility test (EN ISO 1182, International Organization for Standardization, Switzerland; EN adopted). Within the context of the present disclosure, furnace temperature rise measurements are acquired according to conditions comparable to EN ISO 1182 standard (Reaction to fire tests for building and transport products: Non-combustibility test), unless otherwise stated. In certain embodiments, aerogel compositions of the present disclosure can have a furnace temperature rise of about 100° C. or less, about 90° C. or less, about 80° C. or less, about 70° C. or less, about 60° C. or less, about 50° C. or less, about 45° C. or less, about 40° C. or less, about 38° C. or less, about 36° C. or less, about 34° C. or less, about 32° C. or less, about 30° C. or less, about 28° C. or less, about 26° C. or less, about 24° C. or less, or in a range between any two of these values. Within the context of compositional stability at elevated temperatures, for example, a first composition having a furnace temperature rise that is lower than a furnace temperature rise of a second composition, would be considered an improvement of the first composition over the second composition. It is contemplated herein that furnace temperature rise of a composition is reduced when adding one or more fire-class additives, as compared to a composition that does not include any fire-class additives.

Within the context of the present disclosure, the terms "flame time" and "$T_{FLAME}$" refer to a measurement of sustained flaming of a material or composition under thermal decomposition conditions, where "sustained flaming" is a persistence of flame at any part on the visible part of the specimen lasting 5 seconds or longer. Flame time is typically recorded in seconds or minutes. The flame time of a material or composition may be determined by methods known in the art, including, but not limited to Reaction to fire tests for building and transport products: Non-combustibility test (EN ISO 1182, International Organization for Standardization, Switzerland; EN adopted). Within the context of the present disclosure, flame time measurements are acquired according to conditions comparable to EN ISO 1182 standard (Reaction to fire tests for building and transport products: Non-combustibility test), unless otherwise stated. In certain embodiments, aerogel compositions of the present disclosure have a flame time of about 30 seconds or less, about 25 seconds or less, about 20 seconds or less, about 15 seconds or less, about 10 seconds or less, about 5 seconds or less, about 2 seconds or less, or in a range between any two of these values. Within the context herein, for example, a first composition having a flame time that is lower than a flame time of a second composition, would be considered an improvement of the first composition over the second composition. It is contemplated herein that flame time of a composition is reduced when adding one or more fire-class additives, as compared to a composition that does not include any fire-class additives.

Within the context of the present disclosure, the terms "mass loss" and "ΔM" refer to a measurement of the amount of a material, composition, or composite that is lost or burned off under thermal decomposition conditions. Mass loss is typically recorded as weight percent or wt %. The mass loss of a material, composition, or composite may be determined by methods known in the art, including, but not limited to: Reaction to fire tests for building and transport products: Non-combustibility test (EN ISO 1182, International Organization for Standardization, Switzerland; EN adopted). Within the context of the present disclosure, mass loss measurements are acquired according to conditions comparable to EN ISO 1182 standard (Reaction to fire tests for building and transport products: Non-combustibility test), unless otherwise stated. In certain embodiments, aerogel compositions of the present disclosure can have a mass loss of about 50% or less, about 40% or less, about 30% or less, about 28% or less, about 26% or less, about 24% or less, about 22% or less, about 20% or less, about 18% or less, about 16% or less, or in a range between any two of these values. Within the context herein, for example, a first composition having a mass loss that is lower than a mass loss of a second composition would be considered an improvement of the first composition over the second composition. It is contemplated herein that mass loss of a composition is reduced when adding one or more fire-class additives, as compared to a composition that does not include any fire-class additives.

Within the context of the present disclosure, the terms "temperature of peak heat release" refers to a measurement of the temperature of environmental heat at which exothermic heat release from decomposition is at the maximum. The temperature of peak heat release of a material or composition may be measured using TGA analysis, differential scanning calorimetry (DSC) or a combination thereof. DSC and TGA each would provide similar values for temperature of peak heat release, and many times, the tests are run concurrently, so that results are obtained from both. In a typical DSC analysis, heat flow is plotted against the rising temperature and temperature of peak heat release is the temperature at which the highest peak in such curve occurs. Within the context of the present disclosure, measurements of the temperature of peak heat release of a material or composition are acquired using TGA analysis as provided in this paragraph, unless otherwise stated.

In the context of an endothermic material, the terms "temperature of peak heat absorption" refers to a measurement of the temperature of environmental heat at which endothermic heat absorption from decomposition is at the minimum. The temperature of peak heat absorption of a material or composition may be measured using TGA analysis, differential scanning calorimetry (DSC) or a combination thereof. In a typical DSC analysis, heat flow is plotted against the rising temperature and temperature of peak heat absorption is the temperature at which the lowest peak in such curve occurs. Within the context of the present disclosure, measurements of the temperature of peak heat absorption of a material or composition are acquired using TGA analysis as provided in this paragraph, unless otherwise stated.

Within the context of the present disclosure, the term "low-flammability" and "low-flammable" refer to a material or composition which satisfy the following combination of properties: i) a furnace temperature rise of 50° C. or less; ii) a flame time of 20 seconds or less; and iii) a mass loss of 50 wt % or less. Within the context of the present disclosure, the term "non-flammability" and "non-flammable" refer to a material or composition which satisfy the following combination of properties: i) a furnace temperature rise of 40° C. or less; ii) a flame time of 2 seconds or less; and iii) a mass loss of 30 wt % or less. It is contemplated that flammability (e.g., combination of furnace temperature rise, flame time, and mass loss) of a composition is reduced upon inclusion of one or more fire-class additives, as described herein.

Within the context of the present disclosure, the term "low-combustibility" and "low-combustible" refer to a low-flammable material or composition which has a total heat of combustion (HOC) less than or equal to 3 MJ/kg. Within the context of the present disclosure, the term "non-combustibility" and "non-combustible" refer to a non-flammable material or composition which has the heat of combustion (HOC) less than or equal to 2 MJ/kg. It is contemplated that HOC of a composition is reduced upon inclusion of one or more fire-class additives, as described herein.

Aerogels are described as a framework of interconnected structures that are most commonly comprised of interconnected oligomers, polymers, or colloidal particles. An aerogel framework may be made from a range of precursor materials, including inorganic precursor materials (such as precursors used in producing silica-based aerogels); organic precursor materials (such precursors used in producing carbon-based aerogels); hybrid inorganic/organic precursor materials; and combinations thereof. Within the context of the present disclosure, the term "amalgam aerogel" refers to an aerogel produced from a combination of two or more different gel precursors; the corresponding precursors are referred to as "amalgam precursors".

Inorganic aerogels are generally formed from metal oxide or metal alkoxide materials. The metal oxide or metal alkoxide materials may be based on oxides or alkoxides of any metal that can form oxides. Such metals include, but are not limited to silicon, aluminum, titanium, zirconium, hafnium, yttrium, vanadium, cerium, and the like. Inorganic silica aerogels are traditionally made via the hydrolysis and condensation of silica-based alkoxides (such as tetraethoxylsilane), or via gelation of silicic acid or water glass. Other relevant inorganic precursor materials for silica based aerogel synthesis include, but are not limited to metal silicates such as sodium silicate or potassium silicate, alkoxysilanes, partially hydrolyzed alkoxysilanes, tetraethoxylsilane (TEOS), partially hydrolyzed TEOS, condensed polymers of TEOS, tetramethoxylsilane (TMOS), partially hydrolyzed TMOS, condensed polymers of TMOS, tetra-n-propoxysilane, partially hydrolyzed and/or condensed polymers of tetra-n-propoxysilane, polyethylsilicates, partially hydrolyzed polyethysilicates, monomeric alkylalkoxy silanes, bis-trialkoxy alkyl or aryl silanes, polyhedral silsesquioxanes, or combinations thereof.

In certain embodiments of the present disclosure, prehydrolyzed TEOS, such as Silbond H-5 (SBHS, Silbond Corp), which is hydrolyzed with a water/silica ratio of about 1.9-2, may be used as commercially available or may be further hydrolyzed prior to incorporation into the gelling process. Partially hydrolyzed TEOS or TMOS, such as polyethysilicate (Silbond 40) or polymethylsilicate may also be used as commercially available or may be further hydrolyzed prior to incorporation into the gelling process.

Inorganic aerogels can also include gel precursors comprising at least one hydrophobic group, such as alkyl metal alkoxides, cycloalkyl metal alkoxides, and aryl metal alkoxides, which can impart or improve certain properties in the gel such as stability and hydrophobicity. Inorganic silica aerogels can specifically include hydrophobic precursors such as alkylsilanes or arylsilanes. Hydrophobic gel precursors may be used as primary precursor materials to form the framework of a gel material. However, hydrophobic gel precursors are more commonly used as co-precursors in combination with simple metal alkoxides in the formation of amalgam aerogels. Hydrophobic inorganic precursor materials for silica based aerogel synthesis include, but are not limited to trimethyl methoxysilane (TMS), dimethyl dimethoxysilane (DMS), methyl trimethoxysilane (MTMS), trimethyl ethoxysilane, dimethyl diethoxysilane (DMDS), methyl triethoxysilane (MTES), ethyl triethoxysilane (ETES), diethyl diethoxysilane, dimethyl diethoxysilane (DMDES), ethyl triethoxysilane, propyl trimethoxysilane, propyl triethoxysilane, phenyl trimethoxysilane, phenyl triethoxysilane (PhTES), hexamethyldisilazane and hexaethyldisilazane, and the like. Any derivatives of any of the above precursors may be used and specifically certain polymeric of other chemical groups may be added or cross-linked to one or more of the above precursors.

Aerogels may also be treated to impart or improve hydrophobicity. Hydrophobic treatment can be applied to a sol-gel solution, a wet-gel prior to liquid extraction, or to an aerogel subsequent to liquid extraction. Hydrophobic treatment is especially common in the production of metal oxide aerogels, such as silica aerogels. An example of a hydrophobic treatment of a gel is discussed below in greater detail, specifically in the context of treating a silica wet-gel. However, the specific examples and illustrations provided herein are not intended to limit the scope of the present disclosure to any specific type of hydrophobic treatment procedure or aerogel substrate. The present disclosure can include any gel or aerogel known to those in the art, as well as associated methods of hydrophobic treatment of the aerogels, in either wet-gel form or dried aerogel form.

Hydrophobic treatment is carried out by reacting a hydroxy moiety on a gel, such as a silanol group (Si—OH) present on a framework of a silica gel, with a functional group of a hydrophobizing agent. The resulting reaction converts the silanol group and the hydrophobizing agent into a hydrophobic group on the framework of the silica gel. The hydrophobizing agent compound can react with hydroxyl groups on the gel according the following reaction: $R_NMX_{4-N}$ (hydrophobizing agent)+MOH (silanol)→$MOMR_N$ (hydrophobic group)+HX. Hydrophobic treatment can take place both on the outer macro-surface of a silica gel, as well as on the inner-pore surfaces within the porous network of a gel.

A gel can be immersed in a mixture of a hydrophobizing agent and an optional hydrophobic-treatment solvent in which the hydrophobizing agent is soluble, and which is also miscible with the gel solvent in the wet-gel. A wide range of hydrophobic-treatment solvents can be used, including solvents such as methanol, ethanol, isopropanol, xylene, toluene, benzene, dimethylformamide, and hexane. Hydrophobizing agents in liquid or gaseous form may also be directly contacted with the gel to impart hydrophobicity.

The hydrophobic treatment process can include mixing or agitation to help the hydrophobizing agent to permeate the wet-gel. The hydrophobic treatment process can also include varying other conditions such as temperature and pH to further enhance and optimize the treatment reactions. After the reaction is completed, the wet-gel is washed to remove unreacted compounds and reaction by-products.

Hydrophobizing agents for hydrophobic treatment of an aerogel are generally compounds of the formula: $R_NMX_{4-N}$; where M is the metal; R is a hydrophobic group such as $CH_3$, $CH_2CH_3$, $C_6H_6$, or similar hydrophobic alkyl, cycloalkyl, or aryl moieties; and X is a halogen, usually Cl. Specific examples of hydrophobizing agents include, but are not limited to trimethylchlorosilane (TMCS), triethylchlorosilane (TECS), triphenylchlorosilane (TPCS), dimethylchlorosilane (DMCS), dimethyldichlorosilane (DMDCS), and the like. Hydrophobizing agents can also be of the formula: $Y(R_3M)_2$; where M is a metal; Y is bridging group such as NH or O; and R is a hydrophobic group such as $CH_3$, $CH_2CH_3$, $C_6H_6$, or similar hydrophobic alkyl, cycloalkyl, or aryl moieites. Specific examples of such hydrophobizing agents include, but are not limited to hexamethyldisilazane [HMDZ] and hexamethyldisiloxane [HMDSO]. Hydrophobizing agents can further include compounds of the formula: $R_NMV_{4-N}$, wherein V is a reactive or leaving group other than a halogen. Specific examples of such hydrophobizing agents include, but are not limited to vinyltriethoxysilane and vinyltrimethoxysilane.

Hydrophobic treatments of the present disclosure may also be performed during the removal, exchange or drying of liquid in the gel. In a specific embodiment, the hydrophobic treatment may be performed in supercritical fluid environment (such as, but not limited to supercritical carbon dioxide) and may be combined with the drying or extraction step.

Within the context of the present disclosure, the term "hydrophobic-bound silicon" refers to a silicon atom within the framework of a gel or aerogel comprising at least one hydrophobic group covalently bonded to the silicon atom. Examples of hydrophobic-bound silicon include, but are not limited to, silicon atoms in silica groups within the gel framework which are formed from gel precursors comprising at least one hydrophobic group (such as MTES or DMDS). Hydrophobic-bound silicon may also include, but are not limited to, silicon atoms in the gel framework or on the surface of the gel which are treated with a hydrophobizing agent (such as HMDZ) to impart or improve hydrophobicity by incorporating additional hydrophobic groups into the composition. Hydrophobic groups of the present disclosure include, but are not limited to, methyl groups, ethyl groups, propyl groups, isopropyl groups, butyl groups, isobutyl groups, tertbutyl groups, octyl groups, phenyl groups, or other substituted or unsubstituted hydrophobic organic groups known to those with skill in the art. Within the context of the present disclosure, the terms "hydrophobic group," "hydrophobic organic material," and "hydrophobic organic content" specifically exclude readily hydrolysable organic silicon-bound alkoxy groups on the framework of the gel material, which are the product of reactions between organic solvents and silanol groups. Such excluded groups are distinguishable from hydrophobic organic content of this through NMR analysis. The amount of hydrophobic-bound silicon contained in an aerogel can be analyzed using NMR spectroscopy, such as CP/MAS $^{29}$Si Solid State NMR. An NMR analysis of an aerogel allows for the characterization and relative quantification of M-type hydrophobic-bound silicon (monofunctional silica, such as TMS derivatives); D-type hydrophobic-bound silicon (bifunctional silica, such as DMDS derivatives); T-type hydrophobic-bound silicon (trifunctional silica, such as MTES derivatives); and Q-type silicon (quadfunctional silica, such as TEOS derivatives). NMR analysis can also be used to analyze the bonding chemistry of hydrophobic-bound silicon contained in an aerogel by allowing for categorization of specific types of hydrophobic-bound silicon into sub-types (such as the categorization of T-type hydrophobic-bound silicon into $T^1$ species, $T^2$ species, and $T^3$ species). Specific details related to the NMR analysis of silica materials can be found in the article "Applications of Solid-State NMR to the Study of Organic/Inorganic Multicomponent Materials" by Geppi et al., specifically pages 7-9 (Appl. Spec. Rev. (2008), 44-1: 1-89), which is hereby incorporated by reference according to the specifically cited pages.

The characterization of hydrophobic-bound silicon in a CP/MAS $^{29}$Si NMR analysis can be based on the following chemical shift peaks: $M^1$ (30 to 10 ppm); $D^1$ (10 to −10 ppm), $D^2$ (−10 to −20 ppm); $T^1$ (−30 to −40 ppm), $T^2$ (−40 to −50 ppm), $T^3$ (−50 to −70 ppm); $Q^2$ (−70 to −85 ppm), $Q^3$ (−85 to −95 ppm), $Q^4$ (−95 to −110 ppm). These chemical shift peaks are approximate and exemplary, and are not intended to be limiting or definitive. The precise chemical shift peaks attributable to the various silicon species within a material can depend on the specific chemical components of the material, and can generally be deciphered through routine experimentation and analysis by those in the art.

Within the context of the present disclosure, the term "hydrophobic organic content" or "hydrophobe content" or "hydrophobic organic content" refers to the amount of hydrophobic organic material bound to the framework in an aerogel material or composition. The hydrophobic organic content of an aerogel material or composition can be expressed as a weight percentage of the amount of hydrophobic organic material on the aerogel framework relative to the total amount of material in the aerogel material or composition. Hydrophobic organic content can be calculated by those with ordinary skill in the art based on the nature and relative concentrations of materials used in producing the aerogel material or composition. Hydrophobic organic content can also be measured using thermo-gravimetric analysis (TGA) of the subject materials, preferably in oxygen atmosphere (though TGA under alternate gas environments are also useful). Specifically, the percentage of hydrophobic organic material in an aerogel can be correlated with the percentage of weight loss in a hydrophobic aerogel material or composition when subjected to combustive heat temperatures during a TGA analysis, with adjustments being made for the loss of moisture, loss of residual solvent, and the loss of readily hydrolysable alkoxy groups during the TGA analysis. Other alternative techniques such as differential scanning calorimetry, elemental analysis (particularly, carbon), chromatographic techniques, nuclear magnetic resonance spectra and other analytical techniques known to person of skilled in the art may be used to measure and determine hydrophobe content in the aerogel compositions of the present disclosure. In certain instances, a combination of the known techniques may be useful or necessary in determining the hydrophobe content of the aerogel compositions of the present disclosure.

Aerogel materials or compositions of the present disclosure can have a hydrophobic organic content of 50 wt % or less, 40 wt % or less, 30 wt % or less, 25 wt % or less, 20 wt % or less, 15 wt % or less, 10 wt % or less, 8 wt % or less, 6 wt % or less, 5 wt % or less, 4 wt % or less, 3 wt % or less, 2 wt % or less, 1 wt % or less, or in a range between any two of these values.

The term "fuel content" refers to the total amount of combustible material in an aerogel material or composition, which can be correlated with the total percentage of weight loss in an aerogel material or composition when subjected to combustive heat temperatures during a TGA or TG-DSC analysis, with adjustments being made for the loss of moisture. The fuel content of an aerogel material or composition can include hydrophobic organic content, as well as other combustible residual alcoholic solvents, filler materials, reinforcing materials, and readily hydrolysable alkoxy groups.

Organic aerogels are generally formed from carbon-based polymeric precursors. Such polymeric materials include, but are not limited to resorcinol formaldehydes (RF), polyimide, polyacrylate, polymethyl methacrylate, acrylate oligomers, polyoxyalkylene, polyurethane, polyphenol, polybutadiane, trialkoxysilyl-terminated polydimethylsiloxane, polystyrene, polyacrylonitrile, polyfurfural, melamine-formaldehyde, cresol formaldehyde, phenol-furfural, polyether, polyol, polyisocyanate, polyhydroxybenze, polyvinyl alcohol dialdehyde, polycyanurates, polyacrylamides, various epoxies, agar, agarose, chitosan, and combinations thereof. As one example, organic RF aerogels are typically made from the sol-gel polymerization of resorcinol or melamine with formaldehyde under alkaline conditions.

Organic/inorganic hybrid aerogels are mainly comprised of (organically modified silica ("ormosil") aerogels. These ormosil materials include organic components that are covalently bonded to a silica network. Ormosils are typically formed through the hydrolysis and condensation of organically modified silanes, $R-Si(OX)_3$, with traditional alkoxide precursors, $Y(OX)_4$. In these formulas, X may represent, for example, $CH_3$, $C_2H_5$, $C_3H_7$, $C_4H_9$; Y may represent, for example, Si, Ti, Zr, or Al; and R may be any organic fragment such as methyl, ethyl, propyl, butyl, isopropyl, methacrylate, acrylate, vinyl, epoxide, and the like. The organic components in ormosil aerogel may also be dispersed throughout or chemically bonded to the silica network.

Within the context of the present disclosure, the term "ormosil" encompasses the foregoing materials as well as other organically modified materials, sometimes referred to as "ormocers." Ormosils are often used as coatings where an ormosil film is cast over a substrate material through, for example, the sol-gel process. Examples of other organic-inorganic hybrid aerogels of the disclosure include, but are not limited to, silica-polyether, silica-PMMA, silica-chitosan, carbides, nitrides, and other combinations of the aforementioned organic and inorganic aerogel forming compounds. Published US Pat. App. 20050192367 (Paragraphs [0022]-[0038] and [0044]-[0058]) includes teachings of such hybrid organic-inorganic materials, and is hereby incorporated by reference according to the individually cited sections and paragraphs.

In certain embodiments, aerogels of the present disclosure are inorganic silica aerogels formed primarily from prepolymerized silica precursors preferably as oligomers, or hydrolyzed silicate esters formed from silicon alkoxides in an alcohol solvent. In certain embodiments, such prepolymerized silica precursors or hydrolyzed silicate esters may be formed in situ from other precurosrs or silicate esters such as alkoxy silanes or water glass. However, the disclosure as a whole may be practiced with any other aerogel compositions known to those in the art, and is not limited to any one precursor material or amalgam mixture of precursor materials.

As discussed above, aerogel compositions according to embodiments of the present disclosure provide favorable properties for compressibility, compressional resilience, and compliance. When used as a separator between cells within a battery module, thermal insulation sheets formed using aerogel compositions can provide resistance to compression deformation to accommodate the expansion of cells due to the degradation and swelling of active materials during charge/discharge cycles for the battery. During initial assembly of a battery module, a relatively low load of 1 MPa or lower is typically applied to the cell separator materials, e.g., the reinforced aerogel compositions disclosed herein. When the cells within a battery module expand or swell during charge/discharge cycles, a load of up to about 5 MPa may be applied to the cell separator materials, e.g., the reinforced aerogel compositions disclosed herein. Accordingly, compressibility, compressional resilience and compliance of the cell separator materials are important properties.

In other embodiments, battery thermal management members can include other heat protection layers both separately or in combination with aerogel compositions. For example, heat protection layers can include a material selected from the group consisting of mica, microporous silica, ceramic fiber, mineral wool, and combinations thereof. In some embodiments, heat protection layers can include mica boards, e.g., including at least 80% mica. In some embodiments, heat protection layers can include inorganic ceramic papers made from refractory ceramic fibers.

In an exemplary aspect, the present disclosure provides a heat control member or battery thermal management member where the heat control member or battery thermal management member exhibits a compressibility of less than about 25% at about 25 kPa. In some embodiments, the compression force deflection can be 5 to 500 kPa, or 5 to 80 kPa at 25% deflection. The compression force deflection can be 100 to 500 kPa, or 200 to 300 kPa at 75% deflection. Optionally, upon release of compression, the heat control member or battery thermal management member can be sufficiently resilient to return to at least about 80%, 75%, 65%, 60% or 50%, of its original thickness. In some embodiments, the heat control member or battery thermal management member exhibits a compressibility of less than about 25% in a range of about 25 kPa to about 35 kPa and preferably a compressibility less than about 50% at about 50 kPa. In some embodiments, the heat control member or battery thermal management member exhibits a compressibility in the range of about 25% to about 50% at about 50 kPa. In exemplary embodiments, the heat control member or battery thermal management member exhibits a compressibility of less than about 80% at about 245 kPa, e.g., less than about 70% at about 235 kPa. In exemplary embodiments, the heat control member or battery thermal management member exhibits a compressibility of less than about 70% at about 345 kPa. The thermal conductivity of the heat control member or battery thermal management member is preferably maintained at less than about 60 mW/mK, at less than about 50 mW/mK, about 40 mW/mK, about 30 mW/mK, about 25 mW/mK or a range between these values when the heat control member or battery thermal management member is compressed.

As discussed above, aerogel compositions according to embodiments of the present disclosure can include an aerogel framework that includes macropores. Without being bound by any particular theory of operation, the presence of macropores within the aerogel framework can allow for compression of the aerogel composition, e.g., the reinforced aerogel composition, while maintaining, or even improving, the thermal properties, e.g., reducing the thermal conductivity. For example, the macropores may be deformed, crushed, or otherwise reduced in size by compression of the composition, thereby allowing for the thickness of the composition to be reduced under load. However, as the macropores are deformed, they effectively become smaller pores. As a result, the path for heat transfer within the aerogel framework can be more tortuous as the macropores are deformed, thereby improving thermal properties, e.g., reducing the thermal conductivity. Within the context of the present disclosure, "mesopores" are pores for which the average pore diameter is in the range of about 2 nm and about 50 nm. Aerogel frameworks are typically mesoporous (i.e., primarily containing pores with an average diameter ranging from about 2 nm to about 50 nm). In certain embodiments, the aerogel framework of aerogel compositions of the present disclosure can include macropores. Within the context of the present disclosure, "macropores" are pores for which the average pore diameter is greater than about 50 nm. An aerogel framework can include both macropores and mesopores. For example, at least 10% of a pore volume of the aerogel framework can be made up of macropores, at least 5% of the pore volume of the aerogel framework can be made up of macropores, at least 75% of the pore volume of the aerogel framework can be made up of macropores, at least 95% of the pore volume of the aerogel framework can be made up of macropores, or 100% of the pore volume of the aerogel framework can be made up of macropores. In some particular embodiments, the aerogel framework can be a macroporous aerogel framework such that a majority of its pore volume is made up of macropores. In some instances, the macroporous aerogel framework can also include micropores and/or mesopores. In some embodiments, the average pore size (diameter) of pores in the aerogel framework can be greater than 50 nm, greater than 50 nm to 5000 nm, 250 nm to 2000 nm, 500 nm to 2000 nm, 500 nm to 1400 nm, or 1200 nm. In certain embodiments, the average pore size can be greater than 50 nm in diameter, greater than 50 nm to 1000 nm, preferably 100 nm to 800 nm, more preferably 250 nm to 750 nm.

In some embodiments, the variation in pore size within the aerogel framework can be distributed homogenously through the aerogel framework. For example, the average pore size can be substantially the same throughout the aerogel framework.

In other embodiments, the variation in pores size within the aerogel framework can be distributed heterogeneously through the aerogel framework. For example, the average pore size can be different in certain regions of the aerogel framework. In some exemplary embodiments, the average pore size can be greater in the region of the upper surface, the lower surface or both the upper and lower surfaces of the aerogel framework. For example, macropores can be distributed within the composition such that the ratio of macropores to mesopores is greater at the upper surface than at the lower surface, greater at the lower surface than at the upper surface, or greater at both the upper and lower surfaces than in a middle region between the upper and lower surfaces. For another example, macropores can be distributed within the composition such that the ratio of macropores to mesopores is greater near the upper surface than near the lower surface, greater near the lower surface than near the upper surface, or greater near both the upper and lower surfaces than in the middle region between the upper and lower surfaces. In other embodiments, the average pore size can be greater in a middle region between the upper and lower surface of the aerogel framework.

Macropores can be formed during production of the aerogel composition. For example, the formation of macropores can be induced in the gel precursor materials during transition into the gel composition. In some embodiments, the formation of macropores can be through inducing spinodal decomposition, e.g., of the gel precursor solution. For another example, the formation of macropores can be induced by the addition of one or more foaming agents.

The macropores present in the resulting aerogel framework can be formed by selecting processing conditions that favor the formation of macropores vs mesopores and/or micropores. The amount of macropores can be adjusted by implementing any one of, any combination of, or all of the following variables: (1) the polymerization solvent; (2) the polymerization temperature; (3) the polymer molecular weight; (4) the molecular weight distribution; (5) the copolymer composition; (6) the amount of branching; (7) the amount of crosslinking; (8) the method of branching; (9) the method of crosslinking; (10) the method used in formation of the gel; (11) the type of catalyst used to form the gel; (12) the chemical composition of the catalyst used to form the gel; (13) the amount of the catalyst used to form the gel; (14) the temperature of gel formation; (15) the type of gas flowing over the material during gel formation; (16) the rate of gas flowing over the material during gel formation; (17) the pressure of the atmosphere during gel formation; (18) the removal of dissolved gasses during gel formation; (19) the presence of solid additives in the resin during gel formation;

(20) the amount of time of the gel formation process; (21) the substrate used for gel formation; (22) the type of solvent or solvents used in each step of the solvent exchange process; (23) the composition of solvent or solvents used in each step of the solvent exchange process; (24) the amount of time used in each step of the solvent exchange process; (25) the dwell time of the part in each step of the solvent exchange process; (26) the rate of flow of the solvent exchange solvent; (27) the type of flow of the solvent exchange solvent; (28) the agitation rate of the solvent exchange solvent; (29) the temperature used in each step of the solvent exchange process; (30) the ratio of the volume of solvent exchange solvent to the volume of the part; (31) the method of drying; (32) the temperature of each step in the drying process; (33) the pressure in each step of the drying process; (34) the composition of the gas used in each step of the drying process; (35) the rate of gas flow during each step of the drying process; (36) the temperature of the gas during each step of the drying process; (37) the temperature of the part during each step of the drying process; (38) the presence of an enclosure around the part during each step of the drying process; (39) the type of enclosure surrounding the part during drying; and/or (40) the solvents used in each step of the drying process. The multifunctional amine and diamine compounds may be added separately or together in one or more portions as solids, neat, or dissolved in an appropriate solvent. In other aspects, a method of making an aerogel can include the steps of: (a) providing a multifunctional amine compound and at least one diamine compound to a solvent to form a solution; (b) providing at least one dianhydride compound to the solution of step (a) under conditions sufficient to form a branched polymer matrix solution, where the branched polymer matrix is solubilized in the solution; and (c) subjecting the branched polymer matrix solution to conditions sufficient to form an aerogel having an open-cell structure. The macropores present in the resulting aerogel framework can be formed in the manner noted above. In one preferred and non-limiting aspect, the formation of macropores vs smaller mesopores and micropores can be primarily controlled by controlling the polymer/solvent dynamics during gel formation.

As discussed above, aerogel compositions according to embodiments of the present disclosure can include an aerogel framework and a reinforcement material where at least a portion of the reinforcement material does not contain aerogel. For example, the aerogel framework can extend partially through the thickness of the reinforcement material. In such embodiments, a portion of the reinforcement material, e.g., an OCMF, fiber, or combinations thereof, can include aerogel material and a portion can be free of aerogel. For example, in some embodiments, the aerogel extends through about 90% of the thickness of the reinforcement material, through a range of about 50% and about 90% of the thickness of the reinforcement material, through a range of about 10% to about 50% of the thickness of the reinforcement material, or through about 10% of the thickness of the reinforcement material.

Without being bound by any particular theory of operation, aerogel compositions in which at least a portion of the reinforcement material does not contain aerogel can provide favorable properties for compressibility, compressional resilience, and compliance. For example, the properties of the reinforcement material can be selected to provide sufficient reinforcement and support for thermal properties in the region containing aerogel and also to provide sufficient compressibility, compressional resilience, and/or compliance in the region without aerogel. The aerogel-containing portion of the reinforced aerogel composition can provide the desired thermal conductivity, e.g., less than about 25 mW/m*K while the portion of the reinforcement without aerogel can provide or improve the desired physical characteristics, e.g., compressibility.

In some embodiments, reinforced aerogel compositions in which at least a portion of the reinforcement material does not contain aerogel can be formed using methods disclosed herein in which the reinforcement material is combined with an amount of precursor solution sufficient to partially fill the reinforcement material with precursor solution. For example, the volume of precursor can be less than the volume of the reinforcement material such that the precursor extends only partially through the reinforcement. When dried, the resulting reinforced aerogel composition will include an aerogel framework extending through less than the full thickness of the reinforcement material, as discussed above. In other embodiments, reinforced aerogel compositions in which at least a portion of the reinforcement material does not contain aerogel can be formed by removing surface aerogel layers from the reinforced aerogel composition.

In some embodiments, reinforced aerogel compositions in which at least a portion of the reinforcement material does not contain aerogel can be formed using a reinforcement material having mixed properties through the thickness of the reinforcement. For example, the reinforcement can include a plurality of layers, each layer having varying properties, e.g., differences in average pore/cell size, material composition, closed cells, open cells, surface treatments, or combinations thereof. The plurality of layers can be bonded to each other, e.g., using an adhesive, by flame bonding or by other suitable methods or mechanisms such as those discussed herein. The different properties of the reinforcement material can provide a varied distribution of aerogel through the layers. For example, the open cell portion of the reinforcement material can include an aerogel framework while the closed cell portion remains substantially free of aerogel. Similarly, other material properties of the reinforcement material or layers thereof can determine the distribution of aerogel within the reinforcement and thus within the reinforced aerogel composition.

In some exemplary embodiments, reinforced aerogel compositions in which at least a portion of the reinforcement material does not contain aerogel can be formed using methods disclosed herein in which the properties of the reinforcement material or layers or reinforcement material control or affect the amount of precursor solution that fills that material or layer, e.g., during the casting process, so as to provide partial filling of the reinforcement material with precursor solution. For example, one layer of the reinforcement can have open cells and another layer of the reinforcement can have closed cells. When a precursor solution is combined with such a reinforcement, the gel precursor solution can infiltrate the open cells of that layer while not substantially infiltrating the closed cells of the other layer. When such a composition is dried, the resulting reinforced aerogel composition can include a portion, e.g., the closed cell layer, that does not contain aerogel while another portion, e.g., the open cell layer, contains aerogel.

In some embodiments, the additives disclosed herein (e.g., endothermic additives, opacifying additives, fire-class additives, or other additives) can be heterogeneously dispersed within the reinforced aerogel composition. For example, the additive material can vary through the thickness or along the length and/or width of the aerogel composition. For example, the additive can be accumulated on one side of the aerogel composition. In some embodiments, the additive material(s) can be concentrated in one layer of the aerogel composite or be provided as a separate layer consisting essentially of the additive adjacent to or attached to the composite. For example, the heat control member or battery thermal management member can include a layer consisting essentially of an endothermic material, such as gypsum, sodium bicarbonate, magnesia-based cement. In further exemplary embodiments, the aerogel composition can also include at least one layer of additional material, either within the composition or as a facing layer. For example, the layer can be a layer selected from the group consisting of a polymeric sheet, a metallic sheet, a fibrous sheet, a highly oriented graphite material, e.g., a pyrolytic graphite sheet, and a fabric sheet. In some embodiments, the facing layer can be attached to the composition, e.g., by an adhesive mechanism selected from the consisting of: an aerosol adhesive, a urethane-based adhesive, an acrylate adhesive, a hot melt adhesive, an epoxy, a rubber resin adhesive; a polyurethane composite adhesive, and combinations thereof. In some embodiments, the facing layer can be attached to the composition by a non-adhesive mechanism, e.g., a mechanism selected from the group consisting of: flame bonding, needling, stitching, sealing bags, rivets, buttons, clamps, wraps, braces, and combinations thereof. In some embodiments, a combination of any of the aforementioned adhesive and non-adhesive mechanisms can be used to attach a facing layer to the composition.

As discussed herein, aerogel compositions or composites can include materials which incorporate aerogel particulates, particles, granules, beads, or powders into a solid or semi-solid material, such as in conjunction with binders such as adhesives, resins, cements, foams, polymers, or similar solid or solidifying materials. For example, aerogel compositions can include a reinforcing material, aerogel particles, and, optionally, a binder. In exemplary embodiments, a slurry containing aerogel particles and at least one type of wetting agent can be provided. For example, the aerogel particles can be coated or wetted with at least one wetting agent, such as a surfactant or dispersant. The aerogel particles can be fully wetted, partially wetted (e.g., surface wetting), or be present in a slurry. The preferred wetting agent is capable of volatilizing to allow suitable recovery of the hydrophobicity of hydrophobic aerogel particles. If the wetting agent remains on the surface of the aerogel particles, the remaining wetting agent can contribute to the overall thermal conductivity of the composite material. Thus, the preferred wetting agent is one that is removeable, such as by volatilization with or without decomposition or other means. Generally, any wetting agent that is compatible with the aerogel can be used.

The slurry or aerogel coated with a wetting agent can be useful as a way to easily introduce hydrophobic aerogel into a variety of materials, such as other aqueous-containing fluids, slurries, adhesives, binder materials, which can optionally harden to form solid materials, fibers, metalized fibers, discrete fibers, woven materials, non-woven materials, needled non-wovens, battings, webs, mats, felts, and combinations thereof. The aerogel wetted with at least one wetting agent or the slurry containing the aerogel with at least one wetting agent permits the easy introduction and uniform distribution of hydrophobic aerogel. Wet laid processes, such as the ones described in U.S. Pat. Nos. 9,399,864; 8,021,583; 7,635,411; and 5,399,422 (each of which are incorporated by reference herein in their entirety), use an aqueous slurry to disperse aerogel particles, fibers and other additives. The slurry can then be dewatered to form a layer of aerogel particles, fibers and additives that can be dried and optionally calendared to produce an aerogel composite.

In other embodiments, aerogel compositions can include aerogel particles, at least one inorganic matrix material and, optionally, fibers, auxiliary materials, additives, and further inorganic binders. The inorganic matrix material can, in some embodiments, include phyllosilicates, e.g., naturally occurring phyllosilicates, such as kaolins, clays or bentonites, synthetic phyllosilicates, such as magadiite or kenyaite, or mixtures of these. The phyllosilicates may be fired or unfired, e.g., to dry the materials and drive off the water of crystallization. The inorganic matrix material can also, in some embodiments, include inorganic binders, such as cement, lime, gypsum or suitable mixtures thereof, in combination with phyllosilicates. The inorganic matrix material can also, in some embodiments, include other inorganic additives, such as fire-class additives, opacifiers, or combinations thereof, disclosed herein. Exemplary processes and aerogel compositions including inorganic matrix materials are disclosed in U.S. Pat. Nos. 6,143,400; 6,083,619 (each of which are incorporated by reference herein in their entirety). In some embodiments, aerogel compositions can include aerogel particles coated on or absorbed within woven materials, non-woven materials, needled non-wovens, battings, webs, mats, felts, and combinations thereof. Adhesive binders can be included in the composition. Additives such as fire-class additives, opacifiers, or combinations thereof, as disclosed herein, can also be included. Exemplary processes and aerogel compositions coated on or absorbed into fabrics are disclosed in U.S. Pat. Pub. No. 2019/0264381A1 (which is incorporated by reference herein in its entirety)

As discussed herein, aerogel composites can be laminated or faced with other materials, such as reinforcing layers of facing materials. In one embodiment, the present disclosure provides a multi-layer laminate comprising at least one base layer including a reinforced aerogel composition, and at least one facing layer. In one embodiment, the facing layer comprises a reinforcing material. In one embodiment, the reinforced aerogel composition is reinforced with a fiber reinforcement layer or an open-cell foam reinforcement layer. In one embodiment, the present disclosure provides a multi-layer laminate comprising a base layer comprising a reinforced aerogel composition, and at least two facing layers comprising reinforcing materials, wherein the two facing layers are on opposite surfaces of the base layer. For example, the multi-layer aerogel laminate composite can be produced according to the methods and materials described in US Patent Application 2007/0173157.

The facing layer can comprise materials which will help provide specific characteristics to the final composite structure, such as improved flexibility or reduced dusting. The facing materials can be stiff or flexible. The facing materials can include conductive layers or reflective foils. For example, the facing materials can include metallic or metallized materials. The facing materials can include non-woven materials. The facing layers can be disposed on a surface of the composite structure or the reinforced aerogel composites that form the composite structure, e.g., the heat control member or battery thermal management member. The facing layers can form a continuous coating or bag around the composite structure or the reinforced aerogel composites that form the composite structure, e.g., the heat control member or battery thermal management member. In some embodiments, the facing layer or layers can encapsulate the composite structure or the reinforced aerogel composites that form the composite structure.

In one embodiment, the facing layer comprises a polymeric sheet surrounding the composite structure; more specifically a polymeric material which comprises polyesters, polyethylenes, polyurethanes, polypropylenes, polyacrylonitriles, polyamids, aramids; and more specifically polymers such as polyethyleneterphthalate, low density polyethylene, ethylene-propylene co-polymers, poly(4-methylpentane), polytetrafluoroethylene, poly(l-butene), polystyrene, polyvinylacetatae, polyvinylchloride, polyvinylidenechloride, polyvinylfluoride, polyvinylacrylonitrile, plymethylmethacrylate, polyoxymethylene, polyphenylenesulfone, cellulosetriacetate, polycarbonate, polyethylene naphthalate, polycaprolactam, polyhexamethyleneadipamide, polyundecanoamide, polyimide, or combinations thereof. In one embodiment, the polymeric sheet comprises or consists essentially of an expanded polymeric material; more specifically an expanded polymeric material comprising PTFE (ePTFE), expanded polypropylene (ePP), expanded polyethylene (ePE), expanded polystyrene (ePS), or combinations thereof. In one preferred embodiment, the facing material consists essentially of an expanded polymeric material. In one embodiment, the polymeric sheet comprises or consists essentially of a microporous polymeric material characterized by a pore size ranging from 0.1 µm to 210 µm, 0.1 µm to 115 µm, 0.1 µm to 15 µm, or 0.1 µm to 0.6 µm.

In one embodiment, the facing layer material comprises or consists essentially of a fluoropolymeric material. Within the context of the present disclosure, the terms "fluoropolymeric" or "fluoropolymer material" refer to materials comprised primarily of polymeric fluorocarbons. Suitable fluoropolymeric facing layer materials include, but are not limited to: polytetrafluoroethylene (PTFE), including microporous PTFE described in U.S. Pat. No. 5,814,405, and expanded PTFE (ePTFE) such as Gore-Tex® (available from W. L. Gore); polyvinylfluoride (PVF); polyvinylidene fluoride (PVDF); perfluoroalkoxy (PFA); fluorinated ethylene-propylene (FEP); Polychlorotrifluoroethylene (PCTFE); Ethylene tetrafluoroethylene (ETFE); polyvinylidene fluoride (PVDF); ethylene chlorotrifluoroethylene (ECTFE); and combinations thereof. In one preferred embodiment, the facing material consists essentially of a fluoropolymeric material. In one preferred embodiment, the facing material consists essentially of an expanded PTFE (ePTFE) material.

In one embodiment, the facing layer material comprises or consists essentially of a non-fluoropolymeric material. Within the context of the present disclosure, the terms "non-fluoropolymeric" or "non-fluoropolymer material" refer to materials which do not comprise a fluorpolymeric material. Suitable non-fluoropolymeric facing layer materials include, but are not limited to: aluminized Mylar; low density polyethylene, such as Tyvek® (available from DuPont); rubber or rubber composites; non-woven materials, elastic fibers such as spandex, nylon, lycra or elastane; and combinations thereof. In one embodiment, the facing material is a flexible facing material.

In some embodiments, the facing layer material can include automotive resins and polymers such as those having a maximum use temperature up to about 100 C, up to about 120 C or up to about 150 C. For example, the facing layer material can include acrylonitrile butadiene styrene (ABS) polycarbonate ABS, polypropylene, polyurethane, polystyrene, polyethylene, polycarbonate, polymides, PVC, or combinations thereof. For example, aerogel composites and heat control member or battery thermal management members according to embodiments disclosed herein can include layers of automotive resins or automotive polymers, metallic or metallized layers, and aerogel layers.

The facing layer can be attached to the base layer by using adhesives which are suitable for securing inorganic or organic facing materials to the reinforcing material of the base layer. Examples of adhesives which can be used in the present disclosure include, but are not limited to: cement-based adhesives, sodium silicates, latexes, pressure sensitive adhesives, silicone, polystyrene, aerosol adhesives, urethane, acrylate adhesives, hot melt boding systems, boding systems commercially available from 3M, epoxy, rubber resin adhesives, polyurethane adhesive mixtures such as those described in U.S. Pat. No. 4,532,316.

The facing layer can also be attached to the base layer by using non-adhesive materials or techniques which are suitable for securing inorganic or organic facing materials to the reinforcing material of the base layer. Examples of non-adhesive materials or techniques which can be used in the present disclosure include, but are not limited to: heat sealing, ultrasonic stitching, RF sealing, stitches or threading, needling, sealing bags, rivets or buttons, clamps, wraps, or other non-adhesive lamination materials.

The facing layer can be attached to the base layer at any stage of production of the aerogel composite material. In one embodiment, the facing layer is attached to the base layer after infusion of the sol gel solution into the base reinforcement material but prior to gelation. In another embodiment, the facing layer is attached to the base layer after infusion of the sol gel solution into the base reinforcement material and after subsequent gelation, but prior to aging or drying the gel material. In yet another embodiment, the facing layer is attached to the base layer after aging and drying the gel material. In a preferred embodiment, the facing layer is attached to the reinforcement material of the base layer prior to infusion of the sol gel solution into the base reinforcement material. The facing layer can be solid and fluid impermeable. The facing layer can be porous and fluid permeable. In a preferred embodiment, the facing layer is porous and fluid permeable, and contains pores or holes with diameters large enough to allow fluids to diffuse through the facing material. In another preferred embodiment, the facing layer is attached to the reinforcement material of the base layer prior to infusion of the sol gel solution into the base reinforcement material, wherein the facing layer is porous and fluid permeable, and contains pores or holes with diameters large enough to allow fluids to diffuse through the facing material. In yet another preferred embodiment, the facing layer is attached to an open-cell foam reinforcement material prior to infusion of the sol gel solution into the foam reinforcement material, wherein the facing layer is porous and fluid permeable, and contains pores or holes with diameters large enough to allow fluids to diffuse through the facing material.

In some embodiments, the composite structure or the reinforced aerogel composites that form the composite structure may be encapsulated by an encapsulation member. For example, the encapsulation member can include a layer or layers of material surrounding the composite or composite structure and/or a coating of material surrounding the composite or composite structure. For example, the encapsulation member can include a film, a layer, an envelope or a coating. The encapsulation member can be made of any material suitable to enclose the composite structure or the reinforced aerogel composites that form the composite structure. For example, the encapsulation member can reduce or eliminate the generation of dust or particulate material shed from the composite structure.

The encapsulation member may include at least one vent that allows air to flow in and out of the panel. The encapsulation member may include at least one filter that filters particulate matter. In an exemplary embodiment, the encapsulation member includes a vent that allows air to flow in and out of the panel, and a particulate filter over the vent that keeps particulate matter within the encapsulation member. In another embodiment, the encapsulation member includes edge seals which include at least one vent and at least one particulate filter. In a further embodiment, the encapsulation member includes edge seals which include at least one vent and at least one particulate filter, wherein the vents in the edge seals allow air to flow in and out of the encapsulation member edges, and wherein the filters capture and retain particulate matter in the flowing air to prevent contamination of the air outside the encapsulation member with particulate matter. In some embodiments of the above aspects, the heat control member or battery thermal management member can include a plurality of layers. For example, the heat control member or battery thermal management member can include at least one layer of or including a thermally conductive material, e.g., a layer including metal, carbon, thermally conductive polymer, or combinations thereof. As used in the context of these embodiments, thermally conductive material refers to materials having a thermal conductivity greater than that of the aerogel composition. In certain embodiments, thermally conductive materials have thermal conductivities at least about one order of magnitude greater than that of the aerogel composition. In some embodiments, the heat control member or battery thermal management member can include a plurality of layers of the aerogel composition. In certain embodiments, the heat control member or battery thermal management member can include at least one layer of conductive material disposed adjacent to the aerogel composition. In certain embodiments, the heat control member or battery thermal management member can include at least one layer of conductive material disposed between at least two of a plurality of layers of the aerogel composition. In some embodiments, the heat control member or battery thermal management member can include particles of the conductive material disposed within a layer of the heat control member or battery thermal management member, e.g., within a layer of the aerogel composition.

In exemplary embodiments, the heat control member or battery thermal management member can include a materials or layers of material providing thermal capacitance (i.e., a thermally capacitive material), e.g., a material having a specific heat capacity of at least about 0.3 J/(g-C). In some embodiments, the material providing thermal capacitance has a specific heat capacity of at least about 0.5 J/(g-C). For example, the material providing thermal capacity can include metals such as aluminum, titanium, nickel, steel, iron, or combinations thereof. In some embodiments, the heat control member or battery thermal management member can include a layer or coating of the material providing thermal capacitance. In some embodiments, the heat control member or battery thermal management member can include particles of the material providing thermal capacitance disposed within a layer of the heat control member or battery thermal management member, e.g., within a layer of the aerogel composition. In certain embodiments, the heat control member or battery thermal management member can include at least one layer of a material providing thermal capacitance disposed adjacent to the aerogel composition. In certain embodiments, the heat control member or battery thermal management member can include at least one layer of a material providing thermal capacitance disposed between at least two of a plurality of layers of the aerogel composition. In exemplary embodiments, the heat control member or battery thermal management member can include both thermally conductive and thermally capacitive materials. For example, the heat control member or battery thermal management member can include a material that provides both thermal capacitance and thermal conductivity, e.g., a metal such as aluminum, titanium, nickel, steel, iron, or combinations thereof. For another example, the heat control member or battery thermal management member can include one or more different materials or layers of material that each provide either thermal capacitance, thermal conductivity, or a combination thereof, e.g., a layer including metal and a layer including thermally conductive polymer.

In some embodiments, thermal pastes can be used between layers of the heat control member or battery thermal management member to ensure even and consistent thermal conduction between such layers. As used herein, thermal paste refers to various materials also known as thermal compound, thermal grease, thermal interface material (TIM), thermal gel, heat paste, heat sink compound, and heat sink paste. For example, a layer of thermal paste can be disposed between the aerogel composition and any other layers such as the layer or layers including thermally conductive or thermally capacitive materials, the facing layer or layers, or the encapsulation member.

As discussed herein, the heat control member or battery thermal management member or battery thermal management member can include multiple layers of material, such as insulating layers, thermally conductive layers, thermally capacitive layers, heat reflecting layers, compressible, resilient or compliant layers, or combinations thereof. The combination of layers in the heat control member or battery thermal management member can be selected to obtain the desired combination of properties, e.g., compressibility, resilience, thermal performance, fire reaction, and other properties. In some embodiments, the heat control member or battery thermal management member includes at least one resilient or compliant member disposed between one or more layers of a heat protection material, e.g., a material selected from the group consisting of mica, microporous silica, ceramic fiber, mineral wool, aerogel compositions, and combinations. The compliant or resilient member includes a compressible material, i.e., a material that can be compressed to reduce its thickness while providing a desired resistance to compression. For example, the compliant member can be a foam or other compressible material such as polyolefins, polyurethanes, phenolics, melamine, cellulose acetate, or polystyrene. In certain embodiments, the heat control or battery thermal management member can also include at least one layer of thermally conductive material or thermally capacitive material disposed between the at least one compliant or resilient member and at least one of the plurality of layers of the reinforced aerogel composition. The thermally conductive material or thermally capacitive material can absorb and/or disperse heat within the heat control or battery thermal management member. In some embodiments, the heat control member or battery thermal management member can further include a heat reflecting layer. For example, the heat reflecting layer can include a metallic foil or sheet.

In embodiments of the heat control member or battery thermal management member that include several layers, the layers can be attached to other layers, e.g., by an adhesive mechanism selected from the consisting of: an aerosol adhesive, a urethane-based adhesive, an acrylate adhesive, a hot melt adhesive, an epoxy, a rubber resin adhesive; a polyurethane composite adhesive, and combinations thereof. In some embodiments, the layers can be attached by a non-adhesive mechanism, e.g., a mechanism selected from the group consisting of: flame bonding, needling, stitching, sealing bags, rivets, buttons, clamps, wraps, braces, and combinations thereof. In some embodiments, a combination of any of the aforementioned adhesive and non-adhesive mechanisms can be used to attach layers together.

Figure 5:
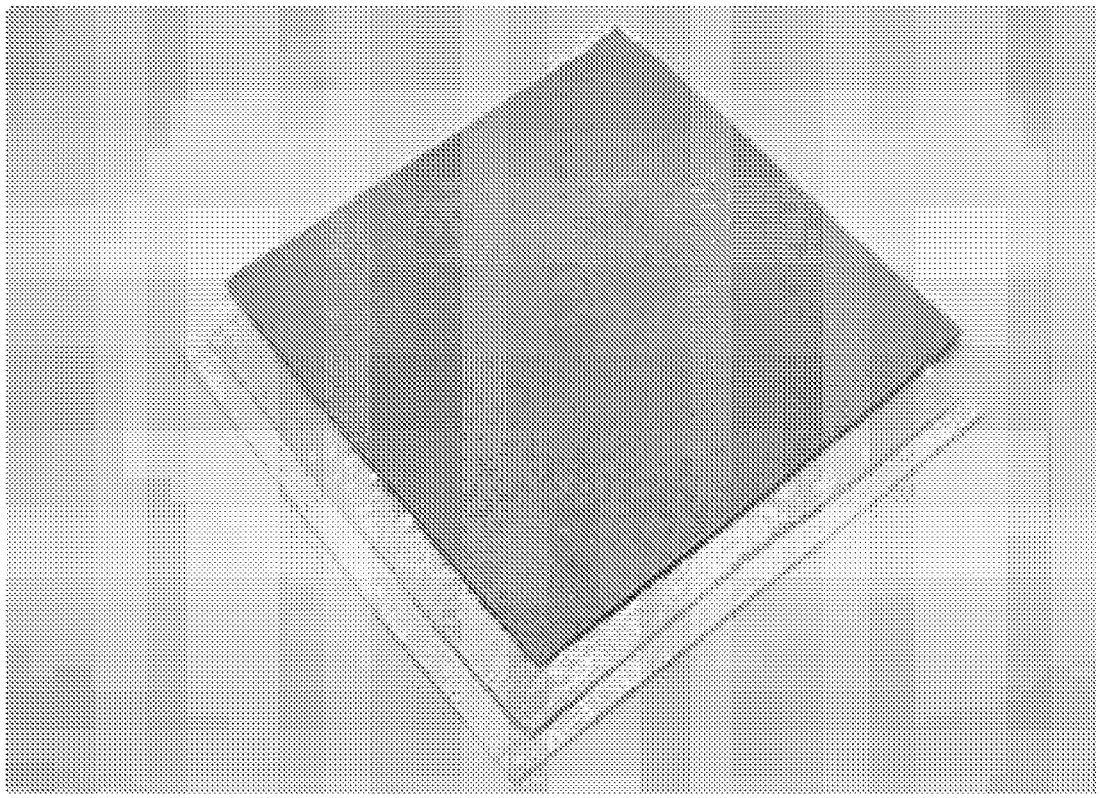
FIG. 5 is an exemplary heat control member or battery thermal management member according to certain embodiments disclosed herein.
Figure 6:
FIG. 6 schematically illustrates a heat control member or battery thermal management member according to certain embodiments disclosed herein.

FIG. 5 illustrates an exemplary heat control member or battery thermal management member according to embodiments disclosed herein. As illustrated in FIG. 6, an exemplary heat control member or battery thermal management member 10 includes a layer of heat protection 12, e.g., a reinforced aerogel composition. A layer of thermally conductive or thermally capacitive material 14 is disposed adjacent to the heat protection layer 12. The heat control member or battery thermal management member 10 is substantially planar and has a first major outer surface defined by an outer surface of the first heat protection layer 12 and a second major outer surface defined by an outer surface of the layer of thermally conductive or thermally capacitive material 14. In some embodiments, the heat control member or battery thermal management member 10 includes an encapsulation member or layer surrounding all or part of the outer surface of the heat control member or battery thermal management member. In some embodiments, the heat protection layer can be surrounded by an encapsulation member or layer surrounding all or part of the layer.

Figure 7:
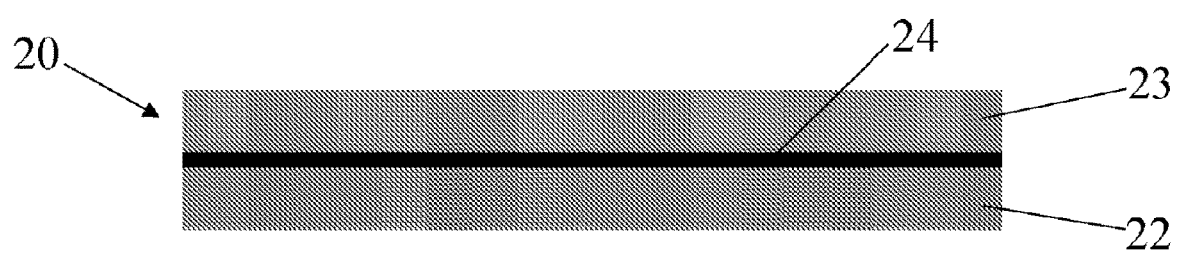
FIG. 7 schematically illustrates a heat control member or battery thermal management member according to certain embodiments disclosed herein.

As illustrated in FIG. 7, an exemplary heat control member or battery thermal management member 20 includes a first heat protection layer 22, e.g., a layer of reinforced aerogel composition and a second heat protection layer 23, e.g., a reinforced aerogel composition 23. A layer of thermally conductive or thermally capacitive material 14 is disposed between the first heat protection layer 22 and the second heat protection layer 23. The heat control member or battery thermal management member 20 is substantially planar and has a first major outer surface defined by an outer surface of the first heat protection layer 22 and a second major outer surface defined by an outer surface of the second heat protection layer 23. In some embodiments, the heat control member or battery thermal management member 10 includes an encapsulation member or layer surrounding all or part of the outer surface of the heat control member or battery thermal management member. In some embodiments, the heat protection layer can be surrounded by an encapsulation member or layer surrounding all or part of the layer.

Figure 8:
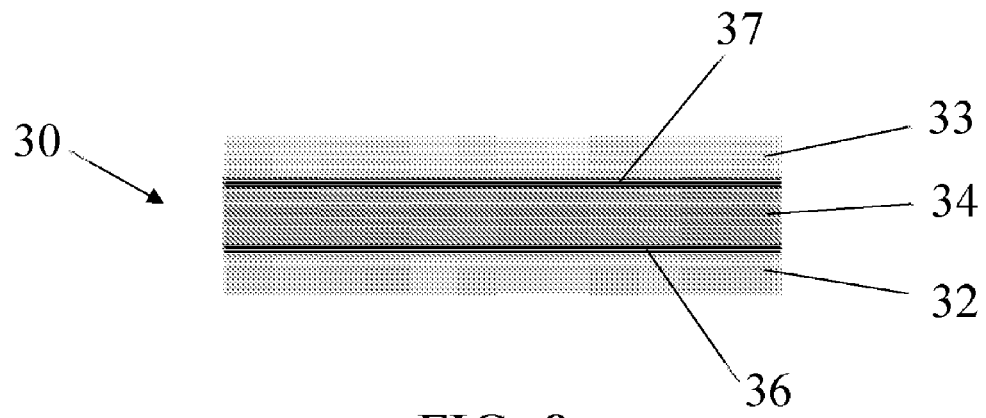
FIG. 8 schematically illustrates a heat control member or battery thermal management member according to certain embodiments disclosed herein.

As illustrated in FIG. 8, an exemplary heat control member or battery thermal management member 30 includes a first heat protection layer 32, e.g., a layer of reinforced aerogel composition and a second heat protection layer 33, e.g., a layer of reinforced aerogel composition. The heat control member or battery thermal management member 30 is substantially planar and has a first major outer surface defined by an outer surface of the first heat protection layer 32 and a second major outer surface defined by an outer surface of the second heat protection layer 33. A layer of compliant material 34 is disposed between the first and second heat protection layers. A first layer of thermally conductive or thermally capacitive material 36 is disposed between the first heat protection layer 32 and the layer of compliant material 34. A second layer of thermally conductive or thermally capacitive material 37 is disposed between the second heat protection layer 33 and the layer of compliant material 34. In some embodiments, the heat control member or battery thermal management member 30 includes an encapsulation member or layer surrounding all or part of the outer surface of the heat control member or battery thermal management member. In some embodiments, each heat protection layer can be surrounded by an encapsulation member or layer surrounding all or part of the layer.

Figure 9:
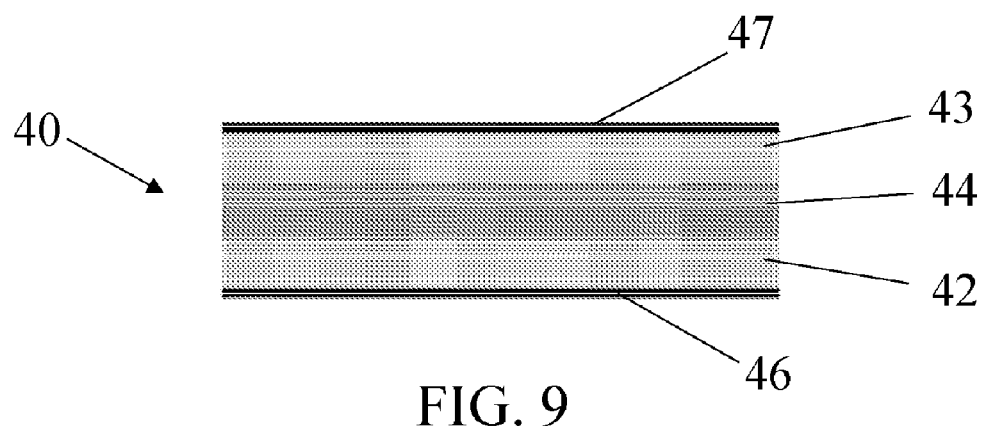
FIG. 9 schematically illustrates a heat control member or battery thermal management member according to certain embodiments disclosed herein.

As illustrated in FIG. 9, an exemplary heat control member or battery thermal management member 40 includes a first heat protection layer 42, e.g., a layer of reinforced aerogel composition and a second heat protection layer 43, e.g., a layer of reinforced aerogel composition. The heat control member or battery thermal management member 40 is substantially planar and has a first major outer surface defined by an outer surface of the first heat protection layer 42 and a second major outer surface defined by an outer surface of the second heat protection layer 43. A layer of compliant material 44 is disposed between the first and second heat protection layers. A first layer of thermally conductive or thermally capacitive material 46 is disposed at a major outer surface of the first heat protection layer of 42. A second layer of thermally conductive or thermally capacitive material 47 is disposed at a major outer surface of the second heat protection layer 43. In some embodiments, the heat control member or battery thermal management member 40 includes an encapsulation member or layer surrounding all or part of the outer surface of the heat control member or battery thermal management member. In some embodiments, each heat protection layer can be surrounded by an encapsulation member or layer surrounding all or part of the layer.

Figure 10:
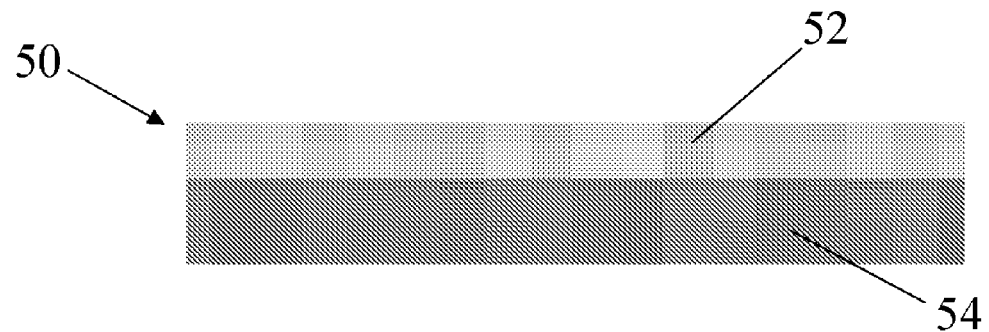
FIG. 10 schematically illustrates a heat control member or battery thermal management member according to certain embodiments disclosed herein.

As illustrated in FIG. 10, an exemplary heat control member or battery thermal management member 50 includes a first heat protection layer 52 and at least one resilient layer 54. In some embodiments, the heat protection layer 52 is disposed adjacent to the resilient layer 54. In some embodiments, the heat protection layer 52 is disposed in contact with the at least one resilient layer 54. For example, the heat protection layer 52 can be joined or bonded to the resilient layer 54 as disclosed in more detail herein. In some embodiments, the heat control member or battery thermal management member 50 includes an encapsulation member or layer surrounding all or part of the outer surface of the battery thermal management member. In some embodiments, each heat protection layer can be surrounded by an encapsulation member or layer surrounding all or part of the heat protection layer.

Figure 11:
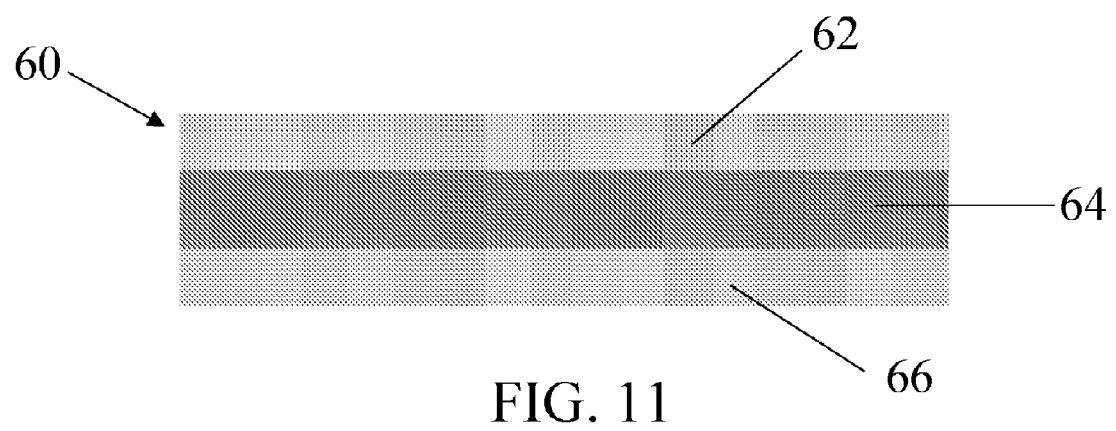
FIG. 11 schematically illustrates a heat control member or battery thermal management member according to certain embodiments disclosed herein.

As illustrated in FIG. 11 a heat control member or exemplary battery thermal management member 60 includes a first heat protection layer 62, at least one resilient layer 64, and a second heat protection layer 66. In such embodiments, the first heat protection layer and the second heat protection layer can be disposed on opposing sides of the at least one resilient layer. In some embodiments, at least one of the heat protection layers 62, 64 can be disposed adjacent to the resilient layer 64. In some embodiments, both of the heat protection layers 62, 64 can be disposed adjacent to the resilient layer 64. In some embodiments, at least one of the heat protection layers 62, 64 can be disposed in contact with the at least one resilient layer 64. In some embodiments, both of the heat protection layers 62, 64 can be disposed in contact with the at least one resilient layer 64. For example, the heat protection layer 62 can be joined or bonded to the resilient layer 54 as disclosed in more detail herein. In some embodiments, the heat control member or battery thermal management member 50 includes an encapsulation member or layer surrounding all or part of the outer surface of the heat control member or battery thermal management member. In some embodiments, each heat protection layer can be surrounded by an encapsulation member or layer surrounding all or part of the heat protection layer.

In exemplary embodiments, the compressible material includes a material selected from the group consisting of siloxanes, polyolefins, polyurethanes, phenolics, melamine, cellulose acetate, and polystyrene. In exemplary embodiments, the heat protection layer includes a material selected from the group consisting of mica, microporous silica, ceramic fiber, mineral wool, and combinations thereof. For example, at least one of the first and second heat protection layer can include a material selected from the group consisting of mica, microporous silica, ceramic fiber, mineral wool, and combinations thereof. For another example, both the first and second heat protection layers can include a material selected from the group consisting of mica, microporous silica, ceramic fiber, mineral wool, and combinations thereof.

In some embodiments, the heat protection layer includes an aerogel composition. For example, at least one of the first and second heat protection layer can include an aerogel composition. For another example, both the first and second heat protection layers can include an aerogel composition. The aerogel of the aerogel composition can include inorganic, organic, or inorganic/organic hybrid material. In an exemplary embodiment, the aerogel composition is a silica aerogel composition. The aerogel composition can include a reinforcement material. For example, the reinforcement material is present in the aerogel composition. In some embodiments, the reinforcement material comprises fiber. For example, the fiber can be selected from the group consisting of discrete fibers, woven materials, non-woven materials, needled nonwovens, battings, webs, mats, felts, and combinations thereof.

In any of the embodiments disclosed herein, the heat protection layer can have a thermal conductivity sufficient to maintain at least a surface of the resilient or compressible layer at or below the decomposition temperature of the compressible material of the resilient or compressible layer. For example, the compressible material can include one or more organic materials that decompose at high temperatures. In such embodiments, the heat protection layer (or layers) can maintain at least a surface of the resilient or compressible layer at or below the decomposition temperature of at least one of the organic materials. In some embodiments, the temperature of chemical decomposition of the resilient or compressible layer is greater than about 200° C. In some embodiments, the temperature of chemical decomposition of the resilient or compressible layer is greater than about 240° C. In some embodiments, the temperature of chemical decomposition of the resilient or compressible layer is greater than about 280° C. In some embodiments, the temperature of chemical decomposition of the resilient or compressible layer is in the range of about 200° C. to about 300° C. In some embodiments, the temperature of chemical decomposition of the resilient or compressible layer is greater than about 300° C. In some embodiments, the temperature of chemical decomposition of the resilient or compressible layer is greater than about 350° C. In some embodiments, the temperature of chemical decomposition of the resilient or compressible layer is in the range of about 300° C. to about 400° C.

Production of multi-layer gel or aerogel compositions can include the following steps: a) attaching a fluid-permeable facing layer to a sheet of reinforcement material to produce a laminated reinforcement sheet, wherein the facing layer contains pores or holes with diameters large enough to allow fluids to diffuse through the facing material; b) infusing a gel precursor solution through the facing layer into the reinforcement sheet; and c) transitioning the gel precursor material into a gel material comprising a gel framework. A portion of the gel precursor solution is likely to be retained within the pores or holes of the facing layer, such that the gel framework in the reinforcement material of the base layer will extend into at least a portion of the facing layer. The resulting product is a multi-layer gel composition comprising: a) at least one base layer comprising a reinforcement material, and an gel framework integrated within the reinforcement material; and b) at least one facing layer comprising a fluid-permeable facing material, and an gel framework integrated within the fluid-permeable facing material; wherein at least a portion of the gel framework of the base layer extends into and is continuous with at least a portion of the gel framework of the facing layer.

Large-scale production of multi-layer aerogel compositions can include a conveyor based system, wherein the production comprises the following steps: a) attaching at least one fluid-permeable facing layer to a sheet of reinforcement material to produce a laminated reinforcement sheet, wherein the facing layer contains pores or holes with diameters large enough to allow fluids to diffuse through; and b) combining a gel precursor solution with the laminated reinforcement sheet at one end of a conveyor to produce a continuous reinforced gel sheet laminate; wherein at least a portion of the gel precursor solution infuses through the facing layer into the reinforcement sheet; and wherein the gel precursor solution is combined with the laminated reinforcement sheet at a rate which allows the gel precursor solution to pass through the facing layer and infiltrate the reinforcement sheet. In a preferred embodiment, the reinforcement material comprises an open-cell foam reinforcement material.

The reinforced, laminated gel sheet may be wound into a plurality of layers (preferably around a mandrel with a uniform tension) and processed in subsequent chemical treatment, aging and drying steps. An additional separator layers can be co-wound between the gel sheet layers to facilitate aging or drying of the gel material, such as providing a flow path for aging agents or drying materials. In a preferred embodiment, the facing layer provides a flow path for aging agents or drying materials, such that an additional separator layer is not required for aging and drying of the gel material.

Large-scale production of multi-layer aerogel compositions can include a semi-continuous, batch-based process which is commonly referred as a gel-in-a-roll process, wherein the production comprises the following steps: a) attaching a fluid-permeable facing layer to a sheet of reinforcement material, wherein the facing layer contains pores or holes with diameters large enough to allow fluids to diffuse through; b) rolling the laminated reinforcement materials into plurality of layers as a preform roll; and c) combining a gel precursor solution with the preform role. Additional separator layers may be co-rolled with the reinforcement material in the preform roll to provide a flow path for the gel precursor solution, aging agents, and drying materials. In a preferred embodiment, the facing layer provides a flow path for the gel precursor solution, aging agents, and drying materials, such that an additional separator layer is not required. In a preferred embodiment, the reinforcement material comprises an open-cell foam reinforcement material.

Aerogel compositions according to embodiments of the present disclosure can be formed into various end products. In the simplest configuration, the reinforced aerogel composition can be in the form of a sheet. The sheet can be formed continuously or semi-continuously, e.g., as a rolled product, or sheets of a desired size and shape can be cut or otherwise formed from a larger sheet. The sheet material can be used to form a thermal barrier between battery cells. In other configurations, the reinforced aerogel composition can be formed into a pouch, e.g., to contain a pouch cell of a battery, or into a cylinder to contain cylindrical battery cells.

Aerogel composites of the present disclosure may be shaped into a range of three-dimensional forms, including paneling, pipe preforms, half-shell preforms, elbows, joints, pouches, cylinders and other shapes regularly required in the application of insulation materials to industrial and commercial applications. In one embodiment, the reinforcement material is formed into a desired shape prior to being infused with gel precursor material. The gel material is processed in a manner which allows the preform to maintain its shape, thus resulting in a reinforced aerogel preform of a desired shape. This technique of forming shaped aerogel preforms can be challenging and inefficient because of the difficulties required to process gel materials of various shapes and configurations.

In exemplary embodiments of the present disclosure, aerogels can be formed from gel precursors or combinations of gel precursors which comprise at least one hydrophobic group. Such aerogels, e.g., inorganic aerogels such as silica-based aerogels, can include hydrophobic-bound silicon. For example, the source of the hydrophobic-bound silicon in the aerogel can be the hydrophobic precursor material or materials. In embodiments of the present disclosure, aerogels formed from such precursors can be hydrophobic. In some embodiments, aerogels formed from such precursors can be intrinsically hydrophobic.

Within the context of the present disclosure, the term "intrinsically hydrophobic" refers to a material that possesses hydrophobicity without modification by a hydrophobizing agent. For example, aerogels can be treated to impart or improve hydrophobicity. Hydrophobic treatment can be applied to a sol-gel solution, a wet-gel prior to liquid phase extraction, or to an aerogel subsequent to liquid phase extraction. Hydrophobic treatment can be carried out by reacting a hydroxy moiety on a gel, such as a silanol group (Si—OH) present on a framework of a silica gel, with a functional group of a hydrophobizing agent. The resulting reaction converts the silanol group and the hydrophobizing agent into a hydrophobic group on the framework of the silica gel. The hydrophobizing agent compound can react with hydroxyl groups on the gel according the following reaction: $R_N MX_{4-N}$ (hydrophobizing agent)+MOH (silanol)→$MOMR_N$ (hydrophobic group)+HX. Hydrophobic treatment can take place both on the outer macro-surface of a silica gel, as well as on the inner-pore surfaces within the porous network of a gel. Published US Pat. App. 2016/0096949 A1 (Paragraphs [0044]-[0048]) teaches hydrophobic treatments and is hereby incorporated by reference according to the individually cited paragraphs. However, as discussed above, aerogels according to embodiments of the present disclosure are hydrophobic without hydrophobic treatment, e.g., without treatment by a hydrophobizing agent.

Production of an aerogel generally includes the following steps: i) formation of a sol-gel solution; ii) formation of a gel from the sol-gel solution; and iii) extracting the solvent from the gel materials through innovative processing and extraction, to obtain a dried aerogel material. This process is discussed below in greater detail, specifically in the context of forming inorganic aerogels such as silica aerogels. However, the specific examples and illustrations provided herein are not intended to limit the present disclosure to any specific type of aerogel and/or method of preparation. The present disclosure can include any aerogel formed by any associated method of preparation known to those in the art, unless otherwise noted.

The first step in forming an inorganic aerogel is generally the formation of a sol-gel solution through hydrolysis and condensation of silica precursors, such as, but not limited to, metal alkoxide precursors in an alcohol-based solvent. Major variables in the formation of inorganic aerogels include the type of alkoxide precursors included in the sol-gel solution, the nature of the solvent, the processing temperature and pH of the sol-gel solution (which may be altered by addition of an acid or a base), and precursor/solvent/water ratio within the sol-gel solution. Control of these variables in forming a sol-gel solution can permit control of the growth and aggregation of the gel framework during the subsequent transition of the gel material from the "sol" state to the "gel" state. While properties of the resulting aerogels are affected by the pH of the precursor solution and the molar ratio of the reactants, any pH and any molar ratios that permit the formation of gels may be used in the present disclosure.

A sol-gel solution is formed by combining at least one gelling precursor with a solvent. Suitable solvents for use in forming a sol-gel solution include lower alcohols with 1 to 6 carbon atoms, particularly 2 to 4, although other solvents can be used as known to those with skill in the art. Examples of useful solvents include, but are not limited to methanol, ethanol, isopropanol, ethyl acetate, ethyl acetoacetate, acetone, dichloromethane, tetrahydrofuran, and the like. Multiple solvents can also be combined to achieve a desired level of dispersion or to optimize properties of the gel material. Selection of optimal solvents for the sol-gel and gel formation steps thus depends on the specific precursors, fillers, and additives being incorporated into the sol-gel solution; as well as the target processing conditions for gelling and liquid extraction, and the desired properties of the final aerogel materials.

Water can also be present in the precursor-solvent solution. The water acts to hydrolyze the metal alkoxide precursors into metal hydroxide precursors. The hydrolysis reaction can be (using TEOS in ethanol solvent as an example): $Si(OC_2H_5)_4 + 4H_2O \rightarrow Si(OH)_4 + 4(C_2H_5OH)$. The resulting hydrolyzed metal hydroxide precursors remain suspended in the solvent solution in a "sol" state, either as individual molecules or as small polymerized (or oligomarized) colloidal clusters of molecules. For example, polymerization/condensation of the $Si(OH)_4$ precursors can occur as follows: $2\ Si(OH)_4 = (OH)_3Si—O—Si(OH)_3 + H_2O$. This polymerization can continue until colloidal clusters of polymerized (or oligomarized) $SiO_2$ (silica) molecules are formed.

Acids and bases can be incorporated into the sol-gel solution to control the pH of the solution, and to catalyze the hydrolysis and condensation reactions of the precursor materials. While any acid may be used to catalyze precursor reactions and to obtain a lower pH solution, exemplary acids include HCl, $H_2SO_4$, $H_3PO_4$, oxalic acid and acetic acid. Any base may likewise be used to catalyze precursor reactions and to obtain a higher pH solution, with an exemplary base comprising $NH_4OH$.

Strong bases may be used to catalyze precursor reactions and obtain a higher pH solution. The use of a strong base to catalyze precursor reactions can enable the content of hydrophobic inorganic precursor materials, e.g., MTES or DMDES, to be significantly higher than would be possible using a weak base, e.g., a base comprising $NH_4OH$. Within the context of the present disclosure, the term "strong base" refers to both inorganic and organic bases. For example, strong bases according to embodiments herein include cations selected from the group consisting of lithium, calcium, sodium, potassium, rubidium, barium, strontium, and guanidinium. For another example, the basic catalyst used to catalyze precursor reactions can include a catalytic amount of sodium hydroxide, lithium hydroxide, calcium hydroxide, potassium hydroxide, strontium hydroxide, barium hydroxide, guanidine hydroxide, sodium hydroxide, tetrabutylammonium hydroxide, tetramethylammonium hydroxide, choline hydroxide, phosphonium hydroxide, DABCO, DBU, guanidine derivatives, amidines, or phosphazenes.

The sol-gel solution can include additional co-gelling precursors, as well as filler materials and other additives. Filler materials and other additives may be dispensed in the sol-gel solution at any point before or during the formation of a gel. Filler materials and other additives may also be incorporated into the gel material after gelation through various techniques known to those in the art. In certain embodiments, the sol-gel solution comprising the gelling precursors, solvents, catalysts, water, filler materials, and other additives is a homogenous solution that is capable of effective gel formation under suitable conditions.

Once a sol-gel solution has been formed and optimized, the gel-forming components in the sol-gel can be transitioned into a gel material. The process of transitioning gel-forming components into a gel material comprises an initial gel formation step wherein the gel solidifies up to the gel point of the gel material. The gel point of a gel material may be viewed as the point where the gelling solution exhibits resistance to flow and/or forms a substantially continuous polymeric framework throughout its volume. A range of gel-forming techniques is known to those in the art. Examples include, but are not limited to maintaining the mixture in a quiescent state for a sufficient period of time; adjusting the pH of the solution; adjusting the temperature of the solution; directing a form of energy onto the mixture (ultraviolet, visible, infrared, microwave, ultrasound, particle radiation, electromagnetic); or a combination thereof.

The process of transitioning gel-forming components (gel precursors) into a gel material may also include an aging step (also referred to as curing) prior to liquid extraction or removal of the solvent from the gel (also referred to as drying of the gel). Aging a gel material after it reaches its gel point can further strengthen the gel framework by increasing the number of cross-linkages within the network. The duration of gel aging can be adjusted to control various properties within the resulting aerogel material. This aging procedure can be useful in preventing potential volume loss and shrinkage during liquid extraction. Aging can involve maintaining the gel (prior to extraction) at a quiescent state for an extended period, maintaining the gel at elevated temperatures, adding cross-linkage promoting compounds, or any combination thereof. Preferred temperatures for aging are typically between about 10° C. and about 100° C., though other suitable temperatures are contemplated herein as well. The aging of a gel material typically continues up to the liquid extraction of the wet-gel material.

The time period for transitioning gel-forming materials (gel precursors) into a gel material includes both the duration of the initial gel formation (from initiation of gelation up to the gel point), as well as the duration of any subsequent curing and aging of the gel material prior to liquid extraction or removal of the solvent from the gel (also referred to as drying of the gel) (from the gel point up to the initiation of liquid extraction/removal of solvent). The total time period for transitioning gel-forming materials into a gel material is typically between about 1 minute and several days, typically about 30 hours or less, about 24 hours or less, about 15 hours or less, about 10 hours or less, about 6 hours or less, about 4 hours or less, about 2 hours or less, and preferably, about 1 hour or less, about 30 minutes or less, about 15 minutes or less, or about 10 minutes or less.

In another embodiment, the resulting gel material may be washed in a suitable secondary solvent to replace the primary reaction solvent present in the wet-gel. Such secondary solvents may be linear monohydric alcohols with one or more aliphatic carbon atoms, dihydric alcohols with 2 or more carbon atoms, branched alcohols, cyclic alcohols, alicyclic alcohols, aromatic alcohols, polyhydric alcohols, ethers, ketones, cyclic ethers or their derivative. In another embodiment, the resulting gel material may be washed in additional quantities of the same solvent present within the gel material, which among others, may remove any undesired by-products or other precipitates in the gel material.

Once a gel material has been formed and processed, the liquid of the gel can then be at least partially extracted from the wet-gel using extraction methods, including innovative processing and extraction techniques, to form an aerogel material. Liquid extraction, among other factors, plays an important role in engineering the characteristics of aerogels, such as porosity and density, as well as related properties such as thermal conductivity. Generally, aerogels are obtained when a liquid is extracted from a gel in a manner that causes low shrinkage to the porous network and framework of the wet gel. This liquid extraction may also be referred to as solvent removal or drying among others.

One example of an alternative method of forming a silica aerogel uses metal oxide salts such as sodium silicate, also known as water glass. A water glass solution is first produced by mixing sodium silicate with water and an acid to form a silicic acid precursor solution. Salt by-products may be removed from the silicic acid precursor by ion exchange, surfactant separation, membrane filtration, or other chemical or physical separation techniques. The resulting sol can then be gelled, such as by the addition of a base catalyst, to produce a hydrogel. The hydrogel can be washed to remove any residual salts or reactants. Removing the water from the pores of the gel can then be performed via exchange with a polar organic solvent such as ethanol, methanol, or acetone. The liquid in the gel is then at least partially extracted using innovative processing and extraction techniques.

Aerogels are commonly formed by removing the liquid mobile phase from the gel material at a temperature and pressure near or above the critical point of the liquid mobile phase. Once the critical point is reached (near critical) or surpassed (supercritical) (i.e., pressure and temperature of the system is at or higher than the critical pressure and critical temperature respectively) a new supercritical phase appears in the fluid that is distinct from the liquid or vapor phase. The solvent can then be removed without introducing a liquid-vapor interface, capillary pressure, or any associated mass transfer limitations typically associated with liquid-vapor boundaries. Additionally, the supercritical phase is more miscible with organic solvents in general, thus having the capacity for better extraction. Co-solvents and solvent exchanges are also commonly used to optimize the supercritical fluid drying process.

If evaporation or extraction occurs well below the critical point, capillary forces generated by liquid evaporation can cause shrinkage and pore collapse within the gel material. Maintaining the mobile phase near or above the critical pressure and temperature during the solvent extraction process reduces the negative effects of such capillary forces. In certain embodiments of the present disclosure, the use of near-critical conditions just below the critical point of the solvent system may allow production of aerogel materials or compositions with sufficiently low shrinkage, thus producing a commercially viable end-product. Several additional aerogel extraction techniques are known in the art, including a range of different approaches in the use of supercritical fluids in drying aerogels. For example, Kistler (J. Phys. Chem. (1932) 36: 52-64) describes a simple supercritical extraction process where the gel solvent is maintained above its critical pressure and temperature, thereby reducing evaporative capillary forces and maintaining the structural integrity of the gel network. U.S. Pat. No. 4,610,863 describes an extraction process where the gel solvent is exchanged with liquid carbon dioxide and subsequently extracted at conditions where carbon dioxide is in a supercritical state. U.S. Pat. No. 6,670,402 teaches extracting a liquid from a gel via rapid solvent exchange by injecting supercritical (rather than liquid) carbon dioxide into an extractor that has been pre-heated and pre-pressurized to substantially supercritical conditions or above, thereby producing aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and extracting the fluid/sol-gel using a supercritical fluid such as supercritical carbon dioxide, supercritical ethanol, or supercritical hexane. U.S. Pat. No. 6,315,971 discloses a process for producing gel compositions comprising drying a wet gel comprising gel solids and a drying agent to remove the drying agent under drying conditions sufficient to reduce shrinkage of the gel during drying. U.S. Pat. No. 5,420,168 describes a process whereby Resorcinol/Formaldehyde aerogels can be manufactured using a simple air-drying procedure. U.S. Pat. No. 5,565,142 describes drying techniques in which the gel surface is modified to be stronger and more hydrophobic, such that the gel framework and pores can resist collapse during ambient drying or subcritical extraction. Other examples of extracting a liquid from aerogel materials can be found in U.S. Pat. Nos. 5,275,796 and 5,395,805. US Pat. Publication No. 2019/0161909 provides examples of a process using alkoxysilane and water glass to produce a high-density aerogel.

One embodiment of extracting a liquid from the wet-gel uses supercritical fluids such as carbon dioxide, including, for example first substantially exchanging the primary solvent present in the pore network of the gel with liquid carbon dioxide; and then heating the wet gel (typically in an autoclave) beyond the critical temperature of carbon dioxide (about 31.06° C.) and increasing the pressure of the system to a pressure greater than the critical pressure of carbon dioxide (about 1070 psig). The pressure around the gel material can be slightly fluctuated to facilitate removal of the liquid from the gel. Carbon dioxide can be recirculated through the extraction system to facilitate the continual removal of the primary solvent from the wet gel. Finally, the temperature and pressure are slowly returned to ambient conditions to produce a dry aerogel material. Carbon dioxide can also be pre-processed into a supercritical state prior to being injected into an extraction chamber.

Another example of an alternative method of forming aerogels includes reducing the damaging capillary pressure forces at the solvent/pore interface by chemical modification of the matrix materials in their wet gel state via conversion of surface hydroxyl groups to hydrophobic trimethylsilylethers, thereby allowing for liquid extraction from the gel materials at temperatures and pressures below the critical point of the solvent.

In yet another embodiment, liquid (solvent) in the gel material may be frozen at lower temperatures followed by a sublimation process whereby the solvent is removed from the gel material. Such removal or drying of the solvent from the gel material is understood to be within the scope of this disclosure. Such removal largely preserves the gel structure, thus producing an aerogel with unique properties.

Large-scale production of aerogel materials or compositions can be complicated by difficulties related to the continuous formation of gel materials on a large scale; as well as the difficulties related to liquid extraction from gel materials in large volumes using innovative processing and extraction techniques. In certain embodiments, aerogel materials or compositions of the present disclosure are accommodating to production on a large scale. In certain embodiments, gel materials of the present disclosure can be produced in large scale through a continuous casting and gelation process. In certain embodiments, aerogel materials or compositions of the present disclosure are produced in a large scale, requiring the use of large-scale extraction vessels. Large scale extraction vessels of the present disclosure can include extraction vessels which have a volume of about 0.1 $m^3$ or more, about 0.25 $m^3$ or more, about 0.5 $m^3$ or more, or about 0.75 $m^3$ or more.

Aerogel compositions of the present disclosure can have a thickness of 15 mm or less, 10 mm or less, 5 mm or less, 4 mm or less, 3 mm or less, 2 mm or less, 1 mm or less, 0.5 mm or less, 0.3 mm or less, or ranges of thicknesses between any combination of the aforementioned thicknesses.

Aerogel compositions may be reinforced with various reinforcement materials to achieve a more flexible, resilient and conformable composite product. The reinforcement materials can be added to the gels at any point in the gelling process to produce a wet, reinforced gel composition. The wet gel composition may then be dried to produce a reinforced aerogel composition.

Aerogel compositions may be OCMF-reinforced with various open-celled macroporous framework reinforcement materials to achieve a more flexible, resilient and conformable composite product. The OCMF reinforcement materials can be added to the gels at any point in the gelling process before gelation to produce a wet, reinforced gel composition. The wet gel composition may then be dried to produce an OCMF-reinforced aerogel composition. OCMF reinforcement materials can be formed from organic polymeric materials such as melamine or melamine derivatives, and are present in the form of a continuous sheet or panel. Melamine OCMF materials can be produced from melamine-formaldehyde precondensation solution. An aqueous solution of a melamine-formaldehyde condensation product is produced by combining a melamine-formaldehyde precondensate with a solvent, an emulsifier/dispersant, a curing agent such as an acid, and a blowing agent such as a C5 to C7 hydrocarbon. The melamine-formaldehyde solution or resin is then cured at elevated temperature above the boiling point of the blowing agent to produce an OCMF comprising a multiplicity of interconnected, three-dimensionally branched melamine structures, with a corresponding network of interconnected pores integrated within the framework. The melamine-formaldehyde precondensates generally have a molar ratio of formaldehyde to melamine in the range from 5:1 to 1.3:1 and typically in the range from 3.5:1 to 1.5:1. The precondensates can be in the form of a powder, a spray, a resin, or a solution. The solvent included in the melamine-formaldehyde precondensation solution can comprise alcohols such as methanol, ethanol, or butanol.

The emulsifier/dispersant included in the melamine-formaldehyde precondensation solution can comprise an anionic surfactant, a cationic emulsifier, or a nonionic surfactant. Useful anionic surfactants include, but are not limited to diphenylene oxide sulfonates, alkane- and alkylbenzenesulfonates, alkylnaphthalenesulfonates, olefinsulfonates, alkyl ether sulfonates, fatty alcohol sulfates, ether sulfates, α-sulfo fatty acid esters, acylaminoalkanesulfonates, acyl isethionates, alkyl ether carboxylates, N-acylsarcosinates, alkyl, and alkylether phosphates. Useful cationic emulsifiers include, but are not limited to alkyltriammonium salts, alkylbenzyl dimethylammonium salts, or alkylpyridinium salts. Useful nonionic surfactants include, but are not limited to alkylphenol polyglycol ethers, fatty alcohol polyglycol ethers, fatty acid polyglycol ethers, fatty acid alkanolamides, ethylene oxide-propylene oxide block copolymers, amine oxides, glycerol fatty acid esters, sorbitan esters, and alkylpolyglycosides. The emulsifier/dispersant can be added in amounts from 0.2% to 5% by weight, based on the melamine-formaldehyde precondensate.

The curing agent included in the melamine-formaldehyde precondensation solution can comprise acidic compounds. The amount of these curatives is generally in the range from 0.01% to 20% by weight and typically in the range from 0.05% to 5% by weight, all based on the melamine-formaldehyde precondensate. Useful acidic compounds include, but are not limited to organic and inorganic acids, for example selected from the group consisting of hydrochloric acid, sulfuric acid, phosphoric acid, nitric acid, formic acid, acetic acid, oxalic acid, toluenesulfonic acids, amidosulfonic acids, acid anhydrides, and mixtures thereof.

The blowing agent included in the melamine-formaldehyde precondensation solution can comprise physical blowing agents or chemical blowing agents. Useful physical blowing agents include, but are not limited to hydrocarbons, such as pentane and hexane; halogenated hydrocarbons, more particularly chlorinated and/or fluorinated hydrocarbons, for example methylene chloride, chloroform, trichloroethane, chlorofluorocarbons, and hydro-chlorofluorocarbons (HCFCs); alcohols, for example methanol, ethanol, n-propanol or isopropanol; ethers, ketones and esters, for example methyl formate, ethyl formate, methyl acetate or ethyl acetate; and gases, such as air, nitrogen or carbon dioxide. In certain embodiments, it is preferable to add a physical blowing agent having a boiling point between 0° C. and 80° C. Useful chemical blowing agents include, but are not limited to, isocyanates mixed with water (releasing carbon dioxide as active blowing agent); carbonates and/or bicarbonates mixed with acids (releasing carbon dioxide as active blowing agent); and azo compounds, for example azodicarbonamide. The blowing agent is present in the melamine-formaldehyde precondensation solution in an amount of 0.5% to 60% by weight, particularly 1% to 40% by weight and in certain embodiments 1.5% to 30% by weight, based on the melamine-formaldehyde precondensate.

The melamine-formaldehyde precondensation solution can be formed into a melamine OCMF material by heating the solution to a temperature generally above the boiling point of the blowing agent used, thereby forming an OCMF comprising a multiplicity of interconnected, three-dimensionally branched melamine structures, with a corresponding network of interconnected open-cell pores integrated within the framework. The introduction of heat energy may be effected via electromagnetic radiation, for example via high-frequency radiation at 5 to 400 kW, for example 5 to 200 kW and in certain embodiments 9 to 120 kW per kilogram of the mixture used in a frequency range from 0.2 to 100 GHz, or more specifically 0.5 to 10 GHz. Magnetrons are a useful source of dielectric radiation, and one magnetron can be used or two or more magnetrons at the same time.

The OCMF material can be dried to remove residual liquids (water, solvent, blowing agent) from the OCMF material. An after-treatment can also be utilized to hydrophobicize the OCMF material. This after-treatment can employ hydrophobic coating agents having high thermal stability and/or low flammability, for example silicones, siliconates or fluorinated compounds.

The density of the melamine OCMF is generally in the range from 0.005 to 0.3 g/cc, for example in the range from 0.01 to 0.2 g/cc, in certain embodiments in the range from 0.03 to 0.15 g/cc, or most specifically in the range from 0.05 to 0.15 g/cc. The average pore diameter of the melamine OCMF is generally in the range of 10 μm to about 1000 μm, particularly in the range from 50 to 700 μm.

In an embodiment, OCMF reinforcement materials are incorporated into the aerogel composition as continuous sheet. The process comprises initially producing a continuous sheet of OCMF-reinforced gel by casting or impregnating a gel precursor solution into a continuous sheet of OCMF reinforcement material, and allowing the material to form into a reinforced gel composite sheet. The liquid may then be at least partially extracted from the OCMF-reinforced gel composite sheet to produce a sheet-like, OCMF-reinforced aerogel composition.

Aerogel compositions can include an opacifier to reduce the radiative component of heat transfer. At any point prior to gel formation, opacifying compounds or precursors thereof may be dispersed into the mixture comprising gel precursors. Examples of opacifying compounds include, but are not limited to Boron Carbide ($B_4C$), Diatomite, Manganese ferrite, MnO, NiO, SnO, $Ag_2O$, $Bi_2O_3$, carbon black, graphite, titanium oxide, iron titanium oxide, aluminum oxide, zirconium silicate, zirconium oxide, iron (II) oxide, iron (III) oxide, manganese dioxide, iron titanium oxide (ilmenite), chromium oxide, carbides (such as SiC, TiC or WC), or mixtures thereof. Examples of opacifying compound precursors include, but are not limited to $TiOSO_4$ or $TiOCl_2$. In some embodiments, the opacifying compounds used as additives can exclude whiskers or fibers of silicon carbide. When aerogel compositions are intended for use in electrical devices, e.g., in batteries as a barrier layer or other related applications, the composition including an opacifier can desirably possess a high dielectric strength with high volume and surface resistivities. In such embodiments, carbon additives used as an opacifier can be non-conductive or modified to reduce electrical conductivity. For example, the opacifier can be surface oxidized to reduce electrical conductivity. In some embodiments, carbonaceous additives with inherent electrical conductivity can be used as an opacifier in aerogel compositions intended for used in electrical devices. In such embodiments, the conductive carbonaceous additives can be used at concentrations below the percolation threshold so as to provide a composition with a suitable dielectric strength for use in an electrical device.

Aerogel compositions can include one or more fire-class additives. Within the context of the present disclosure, the term "fire-class additive" refers to a material that has an endothermic effect in the context of reaction to fire and can be incorporated into an aerogel composition. Furthermore, in certain embodiments, fire-class additives have an onset of endothermic decomposition ($E_D$) that is no more than 100° C. greater than the onset of thermal decomposition ($T_d$) of the aerogel composition in which the fire-class additive is present, and in certain embodiments, also an $E_D$ that is no more than 50° C. lower than the $T_d$ of the aerogel composition in which the fire-class additive is present. In other words, the $E_D$ of fire-class additives has a range of ($T_d-50°$ C.) to ($T_d+100°$ C.):

$$E_D \begin{cases} \text{max: } T_d + 100° \text{ C.} \\ \text{min: } T_d - 50° \text{ C.} \end{cases}$$

Prior to, concurrent with, or even subsequent to incorporation or mixing with the sol (e.g., silica sol prepared from alkyl silicates or water glass in various ways as understood in prior art), fire-class additives can be mixed with or otherwise dispersed into a medium including ethanol and optionally up to 10% vol. water. The mixture may be mixed and/or agitated as necessary to achieve a substantially uniform dispersion of additives in the medium. Without being bound by theory, utilizing a hydrated form of the above-referenced clays and other fire-class additives provides an additional endothermic effect. For example, halloysite clay (commercially available under the tradename DRAGONITE from Applied Minerals, Inc. or from Imerys simply as Halloysite), kaolinite clay are aluminum silicate clays that in hydrated form has an endothermic effect by releasing water of hydration at elevated temperatures (gas dilution). As another example, carbonates in hydrated form can release carbon dioxide on heating or at elevated temperatures.

Within the context of the present disclosure, the terms "heat of dehydration" means the amount of heat required to vaporize the water (and dihydroxylation, if applicable) from the material that is in hydrated form when not exposed to elevated temperatures. Heat of dehydration is typically expressed on a unit weight basis.

In certain embodiments, fire-class additives of the present disclosure have an onset of thermal decomposition of about 100° C. or more, about 130° C. or more, about 200° C. or more, about 230° C. or more, about 240° C. or more, about 330° C. or more, 350° C. or more, about 400° C. or more, about 415° C. or more, about 425° C. or more, about 450° C. or more, about 500° C. or more, about 550° C. or more, about 600° C. or more, about 650° C. or more, about 700° C. or more, about 750° C. or more, about 800° C. or more, or in a range between any two of these values. In certain embodiments, fire-class additives of the present disclosure have an onset of thermal decomposition of about 440° C. or 570° C. In certain embodiments, fire-class additives of the present disclosure have an onset of thermal decomposition which is no more than 50° C. more or less than the Ta of the aerogel composition (without the fire-class additive) into which the fire-class additive is incorporated, no more than 40° C. more or less, no more than 30° C. more or less, no more than 20° C. more or less, no more than 10° C. more or less, no more than 5° C. more or less, or in a range between any two of these values The fire-class additives of this disclosure include, clay materials such as, but not limited to, phyllosilicate clays (such as illite), kaolin or kaolinite (aluminum silicate; $Al_2Si_2O_5(OH)_4$), metakaolin, halloysite (aluminum silicate; $Al_2Si_2O_5(OH)_4$), endellite (aluminum silicate; $Al_2Si_2O_5(OH)_4$), mica (silica minerals), diaspore (aluminum oxide hydroxide; $\alpha$-AlO(OH)), gibbsite (aluminum hydroxide), boehmite (aluminum oxide hydroxide; $\gamma$-AlO(OH)), montmorillonite, beidellite, pyrophyllite (aluminum silicate; $Al_2Si_4O_{10}(OH)_2$), nontronite, bravaisite, smectite, leverrierite, rectorite, celadonite, attapulgite, chloropal, volkonskoite, allophone, racewinite, dillnite, severite, miloschite, collyrite, cimolite and newtonite, sodium bicarbonate ($NaHCO_3$), magnesium hydroxide (or magnesium dihydroxide, "MDH"), alumina trihydrate ("ATH"), gypsum (calcium sulfate dihydrate; $CaSO_4 \cdot 2H_2O$), barringtonite ($MgCO_3 \cdot 2H_2O$), nesquehonite ($MgCO_3 \cdot 3H_2O$), lansfordite ($MgCO_3 \cdot 5H_2O$), hydromagnesite (hydrated magnesium carbonate; $Mg_5(CO_3)_4(OH)_2 \cdot 4H_2O$), other carbonates such as, but not limited to, dolomite and lithium carbonate. Among the clay materials, certain embodiments of the present disclosure use clay materials that have at least a partial layered structure. In certain embodiments of the present disclosure, clay materials as fire-class additives in the aerogel compositions have at least some water such as in hydrated form. The additives may be in hydrated crystalline form or may become hydrated in the manufacturing/processing of the compositions of the present disclosure. In certain embodiments, fire-class additives also include low melting additives that absorb heat without a change in chemical composition. An example of this class is a low melting glass, such as inert glass beads. Other additives that may be useful in the compositions of the present disclosure include, but are not limited to, wollastonite (calcium silicate) and titanium dioxide ($TiO_2$). In certain embodiments, other additives may include infrared opacifiers such as, but not limited to, titanium dioxide or silicon carbide, ceramifiers such as, but not limited to, low melting glass frit, calcium silicate or charformers such as, but not limited to, phosphates and sulfates. In certain embodiments, additives may require special processing considerations such as techniques to ensure the additives are uniformly distributed and not agglomerated heavily to cause product performance variations. The processing techniques may involve additional static and dynamic mixers, stabilizers, adjustment of process conditions and others known in the art.

The amount of additives in the aerogel compositions disclosed herein may depend on the desired properties of the composition. The amount of additives used during preparation and processing of the sol gel compositions is typically referred to as a weight percentage relative to silica content of the sol. The amount of additives in the sol may vary from about 5 wt % to about 70 wt % by weight relative to silica content. In certain embodiments, the amount of additives in the sol is between 10 wt % and 60 wt % relative to silica content and in certain preferred embodiments, it is between 20 wt % and 40 wt % relative to silica content. In exemplary embodiments, the amount of additives in the sol relative to silica content is in the range of about 5% to about 20%, about 10% to about 20%, about 10% to about 30%, about 10% to about 20%, about 30 wt % to about 50 wt %, about 35 wt % to about 45 wt %, or about 35 wt % to about 40 wt % relative to silica content. In some embodiments, the amount of additives in the sol is at least about 10 wt % relative to silica content or about 10 wt % relative to silica content. In some embodiments, the amount of additives is in the range of about 5 wt % to about 15 wt % relative to silica content. In certain embodiments, the additives may be of more than one type. One or more fire-class additives may also be present in the final aerogel compositions. In some preferred embodiments which include aluminum silicate fire-class additives, the additives are present in the aerogel compositions in about 60-70 wt % relative to silica content. For example, in some preferred embodiments which include aluminum silicate fire-class additives such as kaolin or combinations of aluminum silicate fire-class additives such as kaolin with alumina trihydrate ("ATH"), the total amount of additives present in the aerogel compositions is about 30-40 wt % relative to silica content. For another example, in some preferred embodiments in which additives include silicon carbide, the total amount of additives present in the aerogel compositions is about 30-40 wt %, e.g. 35 wt %, relative to silica content. For another example, in some preferred embodiments in which additives include silicon carbide, the total amount of additives present in the aerogel compositions is about 5-15 wt %, e.g. 10 wt %, relative to silica content.

When referring to the final reinforced aerogel compositions, the amount of additives is typically referred to as a weight percentage of the final reinforced aerogel composition. The amount of additives in the final reinforced aerogel composition may vary from about 1% to about 50%, about 1% to about 25%, or about 10% to about 25% by weight of the reinforced aerogel composition. In exemplary embodiments, the amount of additives in the final reinforced aerogel composition is in the range of about 10% to about 20% by weight of the reinforced aerogel composition. In exemplary embodiments, the amount of additives in the final reinforced aerogel composition as a weight percentage of the composition is about 1%, about 2% about 3%, about 4%, about 5%, about 6%, about 7%, about 8%, about 9%, about 10%, about 11%, about 12%, about 13%, about 14%, about 15%, about 16%, about 17%, about 18%, about 19% about 20% or in a range between any of the aforementioned percentages. In certain embodiments, the amount of additives in the final reinforced aerogel composition is about 15% by weight of the reinforced aerogel composition. In certain embodiments, the amount of additives in the final reinforced aerogel composition is about 13% by weight of the reinforced aerogel composition. For example, in some preferred embodiments which include additives such as silicon carbide, the total amount of additives present in the aerogel compositions is about 10-20%, e.g., about 15%, by weight of the reinforced aerogel composition. For another example, in some preferred embodiments in which additives include silicon carbide, the total amount of additives present in the aerogel compositions is about 3-5%, e.g., about 4%, by weight of the reinforced aerogel composition.

In certain embodiments, fire-class additives can be classified or grouped based on their onset temperature of thermal decomposition. For example, fire-class additives can be classified or grouped as having an onset temperature of thermal decomposition less than about 200° C., less than about 400° C., or greater than about 400° C. For example, additives having an onset temperature of thermal decomposition less than about 200° C. include sodium bicarbonate ($NaHCO_3$), nesquehonite ($MgCO_3 \cdot 3H_2O$), and gypsum (calcium sulfate dihydrate; $CaSO_4 \cdot 2H_2O$). For another example, additives having an onset temperature of thermal decomposition less than about 400° C. include alumina trihydrate ("ATH"), hydromagnesite (hydrated magnesium carbonate; $Mg_5(CO_3)_4(OH)_2 \cdot 4H_2O$), and magnesium hydroxide (or magnesium dihydroxide, "MDH"). For another example, additives having an onset temperature of thermal decomposition less than about 400° C. include halloysite (aluminum silicate; $Al_2Si_2O_5(OH)_4$), kaolin or kaolinite (aluminum silicate; $Al_2Si_2O_5(OH)_4$), boehmite (aluminum oxide hydroxide; $\gamma$-AlO(OH)) or high temperature phase change materials (PCM).

In certain embodiments of the present disclosure, clay materials e.g., aluminosilicate clays such as halloysite or kaolinite, as additives in the aerogel compositions are in the dehydrated form, e.g., meta-halloysite or metakaolin. Other additives that may be useful in the compositions of the present disclosure include, but are not limited to, wollastonite (calcium silicate) and titanium dioxide ($TiO_2$). In certain embodiments, other additives may include infrared opacifiers such as, but not limited to, titanium dioxide or silicon carbide, ceramifiers such as, but not limited to, low melting glass frit, calcium silicate or charformers such as, but not limited to, phosphates and sulfates. In certain embodiments, additives may require special processing considerations such as techniques to ensure the additives are uniformly distributed and not agglomerated heavily to cause product performance variations. The processing techniques may involve additional static and dynamic mixers, stabilizers, adjustment of process conditions and others known in the art. One or more fire-class additives may also be present in the final aerogel compositions.

In certain embodiments, the inclusion of additives, e.g., aluminosilicate clay-based materials such as halloysite or kaolin, in the aerogel materials and compositions of the present disclosure can provide improved high temperature shrinkage properties. An exemplary test method for high temperature shrinkage is "Standard Test Method for Linear Shrinkage of Preformed High-Temperature Thermal Insulation Subjected to Soaking Heat" (ASTM C356, ASTM International, West Conshohocken, PA). In such tests, referred to as a "thermal soak," materials are exposed to temperatures greater than 1000° C. for a duration of up to 60 minutes. In certain exemplary embodiments, aerogel materials or compositions of the present disclosure can have high temperature shrinkage, i.e., a linear shrinkage, width shrinkage, thickness shrinkage or any combination of dimensional shrinkage, of about 20% or less, about 15% or less, about 10% or less, about 6% or less, about 5% or less, 4% or less, 3% or less, 2% or less, 1% or less, or in a range between any two of these values.

In some exemplary embodiments, certain basic catalysts used to catalyze precursor reactions can result in trace levels of alkali metals in the aerogel composition. Trace levels, e.g., 100 to 500 ppm, of alkali, e.g., sodium or potassium, in the aerogel materials can have a deleterious effect on high temperature shrinkage and thermal durability. However, without being bound by any particular mechanism or theory, aluminosilicate clay-based materials such as halloysite or kaolin can sequester fugitive alkali, e.g., sodium or potassium, thereby reducing or eliminating the effect of alkali on shrinkage and thermal durability. In certain embodiments of the present disclosure, the aluminosilicate clay materials are in the dehydrated form, e.g., meta-halloysite or metakaolin. For example, aerogel materials or compositions including an amount of metakaolin or meta-halloysite of greater than about 0.5 wt % relative to silica content can significantly reduce thermal shrinkage and thermal durability. In exemplary embodiments, aerogel materials or compositions can include an amount of metakaolin or meta-halloysite in a range of about 0.5 wt % to about 3.0 wt % relative to silica content.

FIG. 1 illustrates test data for samples of heat control member or battery thermal management member materials according to embodiments disclosed herein in which a temperature of 650° C. was applied to one surface of a heat control member or battery thermal management member, i.e., the hot side, and the temperature at the other side of the heat control member or battery thermal management member, i.e., the cold side, was measured over time. The control sample corresponds to the composition of Example 1, described in more detail below. Samples A, B and C are embodiments of heat control member or battery thermal management members disclosed herein including kaolin as an additive. Sample A corresponds to the composition of Example 2, described in more detail below. Sample B corresponds to the composition of Example 4, below. Sample C corresponds to the composition of Example 3 below. As shown in FIG. 1, the compositions including kaolin provide a time to reach a temperature of 75° C. at the cold face of about 30 seconds, a time to reach a temperature of 120° C. at the cold face of about 1 minute, a time to reach a temperature of 150° C. at the cold face of about 90 seconds, and at time to reach a temperature of 180° C. at the cold face of about 4 minutes. The unusually good performance with kaolin minerals as additives at temperature ranges below 200° C. was surprising and unexpected.

In certain embodiments of the present disclosure, methods are provided to prepare reinforced aerogel compositions with fire-class performance. The fire-class compositions of these embodiments also possess hydrophobicity sufficient for use as thermal insulation in industrial environments, as measured by water uptake and low thermal conductivity to help meet the ever-demanding energy conservation needs. To obtain these combinations of desirable properties, simply loading additives or even fire-class additives are not successful. While one can try various permutations and combinations or various additives and arrive at an optimized solution, such efforts are not always successful and present risks for a viable manufacturing with repeatable quality control on these desired properties. An important aspect of these embodiments is to assess the thermal behavior (assessed through thermogravimetry or differential scanning calorimetry) of the composition that would otherwise provide all desirable properties except for the fire performance and consider a fire-class additive that closely matches the onset of thermal decomposition of the underlying composition or alternatively, the temperature at which most heat is emitted with the fire-class additives' onset of thermal decomposition or the temperature at which most heat is absorbed.

In certain embodiments, the desired fire properties of the final composition may include not just the inherent property such as heat of combustion (ISO 1716), but also system fire properties such as reaction to fire performance as per ISO 1182. In the case of ISO 1182, weight loss, increase in furnace temperature, and flame time are assessed when exposed to a furnace at a temperature of about 750° C.

A fiber or OCMF reinforced aerogel composition may have various components that add oxidizable organic content (fuel) to the system. Additionally, it may have various other components, while not contributing as fuel, may interfere in combustion upon exposure to fire. As such, combustion behavior of such systems cannot be predicted simply based on the constituent elements. In situations where a multitude of properties are desired, in certain embodiments, the composition should be arrived at without regard to its fire property and such arrived composition's thermal performance should be assessed to find a suitable fire-class additive that will provide the fire property without compromising the other properties the starting composition was intended to provide.

In certain embodiments, onset of thermal decomposition is a critical property of the composition. In certain other embodiments, the temperature at which the peak heat release may be a critical property for the purposes of developing an enhanced fire-performing aerogel compositions. When multiple fuel components are present in the composition identified by multiple peaks in the DSC curve, such compositions are well served by matching the temperature of the peak heat release of the reinforced aerogel composition with a fire-class additive having a temperature of endothermic peak heat release within 140° C., 120° C., 100° C. or 80° C. In many embodiments, the temperature of endothermic peak heat release is within 50° C.

The aerogel materials and compositions of the present disclosure have been shown to be highly effective as insulation materials. However, application of the methods and materials of the present disclosure are not intended to be limited to applications related to insulation. The methods and materials of the present disclosure can be applied to any system or application, which would benefit from the unique combination of properties or procedures provided by the materials and methods of the present disclosure.

Figure 2:
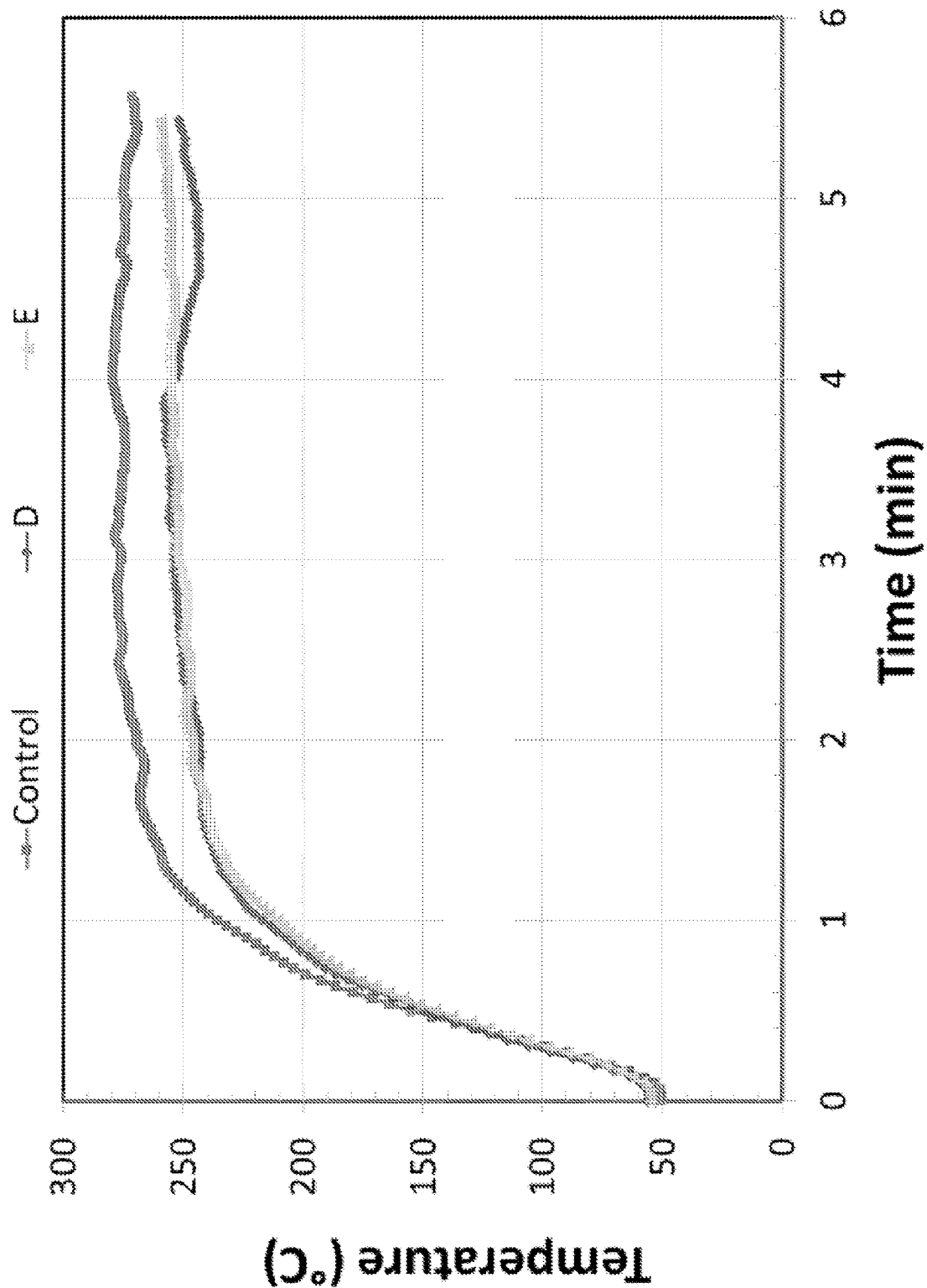
FIG. 2 is a chart showing heat control member or battery thermal management members controlling time-to-temperature behavior according to certain embodiments disclosed herein.

The following examples provide various non-limiting embodiments and properties of the present disclosure. In the examples below, the additive wt % is provided with 100% reference being the total weight of the aerogel composition. FIGS. 1 and 2 are charts showing heat control member or battery thermal management members of the examples below controlling time-to-temperature behavior.

Example 1

A glass fiber reinforced silica aerogel composition was produced according to the methods disclosed above. The reinforced silica aerogel composition had a thickness of about 3 mm and included 21.7 wt % of synthetic amorphous silica, 12.2 wt % methylsilylated silica, 62.27 wt % fibrous glass, and 3.8 wt % iron oxide ($Fe_2O_3$). An 8 inch square sample of this composition was evaluated using a hot surface performance test with the hot surface at 650° C. The temperature at the cold face of the sample composition was measured over a period of time. For the sample composition of this example, the time to reach a temperature of 75° C. at the cold face was about 15 seconds, the time to reach a temperature of 120° C. at the cold face was about 30 seconds, the time to reach a temperature of 150° C. at the cold face was about 40 seconds, and the time to reach a temperature of 180° C. at the cold face was about 1 minute. Data for the sample composition of this example corresponds to "Control" in the chart of FIG. 1.

Example 2

A glass fiber reinforced silica aerogel composition was produced according to the methods disclosed above. The reinforced silica aerogel composition had a thickness of about 3 mm and included 15.3 wt % of synthetic amorphous silica, 8.6 wt % methylsilylated silica, 37.8 wt % fibrous glass, and 38.3 wt % kaolin. The target silica density was 0.07 g/cc. An 8 inch square sample of this composition was evaluated using a hot surface performance test with the hot surface at 650° C. The temperature at the cold face of the sample composition was measured over a period of time. For the sample composition of this example, the time to reach a temperature of 75° C. at the cold face was about 32 seconds, the time to reach a temperature of 120° C. at the cold face was about 1 minute, the time to reach a temperature of 150° C. at the cold face was about 90 seconds, and the time to reach a temperature of 180° C. at the cold face was about 4 minutes. Data for the sample composition of this example corresponds to "A" in the chart of FIG. 1.

Example 3

A glass fiber reinforced silica aerogel composition was produced according to the methods disclosed above. The reinforced silica aerogel composition had a thickness of about 3 mm and included 15.3 wt % of synthetic amorphous silica, 8.6 wt % methylsilylated silica, 37.8 wt % fibrous glass, and 38.3 wt % kaolin. The target silica density was 0.09 g/cc. An 8 inch square sample of this composition was evaluated using a hot surface performance test with the hot surface at 650° C. The temperature at the cold face of the sample composition was measured over a period of time. For the sample composition of this example, the time to reach a temperature of 75° C. at the cold face was about 38 seconds, the time to reach a temperature of 120° C. at the cold face was about 68 seconds, the time to reach a temperature of 150° C. at the cold face was about 102 seconds, and the time to reach a temperature of 180° C. at the cold face was about 4 minutes. Data for the sample composition of this example corresponds to "C" in the chart of FIG. 1.

Example 4

A glass fiber reinforced silica aerogel composition was produced according to the methods disclosed above. The reinforced silica aerogel composition had a thickness of about 3 mm and included 15.3 wt % of synthetic amorphous silica, 8.6 wt % methylsilylated silica, 37.8 wt % fibrous glass, and 38.3 wt % of a combination of kaolin and ATH. The target silica density was 0.07 g/cc. An 8 inch square sample of this composition was evaluated using a hot surface performance test with the hot surface at 650° C. The temperature at the cold face of the sample composition was measured over a period of time. For the sample composition of this example, the time to reach a temperature of 75° C. at the cold face was about 36 seconds, the time to reach a temperature of 120° C. at the cold face was about 1 minute, the time to reach a temperature of 150° C. at the cold face was about 96 seconds, and the time to reach a temperature of 180° C. at the cold face was about 3 minutes and 21 seconds. Data for the sample composition of this example corresponds to "B" in the chart of FIG. 1.

Example 5

A glass fiber reinforced silica aerogel composition was produced according to the methods disclosed above. The reinforced silica aerogel composition had a thickness of about 3.5 mm and included 21.7 wt % of synthetic amorphous silica, 12.2 wt % methylsilylated silica, 62.27 wt % fibrous glass, and 3.8 wt % iron oxide ($Fe_2O_3$). An 8 inch square sample of this composition was evaluated using a hot surface performance test with the hot surface at 650° C. The temperature at the cold face of the sample composition was measured over a period of time. For the sample composition of this example, the time to reach a temperature of 75° C. at the cold face was about 13 seconds, the time to reach a temperature of 120° C. at the cold face was about 22 seconds, the time to reach a temperature of 150° C. at the cold face was about 29 seconds, and the time to reach a temperature of 180° C. at the cold face was about 36 seconds. Data for the sample composition of this example corresponds to "Control" in the chart of FIG. 2.

Example 6

Sols of both methyltriethoxysilane (MTES) and tetraethoxylsilane (TEOS) or polyethylsilicate (Silbond 40) were individually prepared via hydrolysis under acidic conditions in ethanol. The ratio and concentration of sol materials were adjusted to obtain a hydrophobe content from MTES of about 36 wt % and to obtain aerogels with about 8.0 wt % organic content within the aerogel material. Silicon carbide (SiC) was incorporated into the combined sol at a weight percentage of at least 35 wt % relative to silica content. The combined sol was then stirred for no less than 1 hour.

Guanidine hydroxide (2M) was added to the combined sol at concentration sufficient to target aerogel density of about 0.07-0.085 g/cc. The catalyzed sol containing SiC was cast into a fiber reinforcing phase and allowed to gel. Just prior to and immediately after gelation, the fiber reinforced wet gel was subject to a series of molding steps using a heavy weight stainless steel roller. Repeated rolling of the wet gel was conducted for no greater than four times and at a controlled thickness of 3.0 mm using rigid incompressible gauge blocks positioned at the edges of the wet gel. After curing for no greater than 1 h at room temperature, the aerogel materials were aged for about 12 h at 68° C. in ethanol aging fluid at an approximate fluid:gel ratio of 3:1. The aged gel was subjected to solvent extraction with supercritical $CO_2$, and then dried for 2 h at 110° C.

The fiber reinforcing phase was a homogeneous nonwoven material comprised of textile grade glass fibers (E-glass composition), about 5.6 mm thick with a density of about 250 g/m$^2$. The resulting reinforced silica aerogel composition was about 2.5 mm thick and was about 44% aerogel (comprising about 28% of synthetic amorphous silica and about 16% methylsilylated silica), 41% fibrous glass, and 15% silicon carbide by weight of the reinforced silica aerogel composition, resulting in an expected material density of about 0.20 g/cc (given a 0.085 g/cc aerogel density).

An 8 inch square sample of this composition was evaluated using a hot surface performance test with the hot surface at 650° C. The temperature at the cold face of the sample composition was measured over a period of time. For the sample composition of this example, the time to reach a temperature of 75° C. at the cold face was about 13 seconds, the time to reach a temperature of 120° C. at the cold face was about 24 seconds, the time to reach a temperature of 150° C. at the cold face was about 31 seconds, and the time to reach a temperature of 180° C. at the cold face was about 42 seconds. Data for the sample composition of this example corresponds to "E" in the chart of FIG. 2.

Example 7

Sols of both methyltriethoxysilane (MTES) and tetraethoxylsilane (TEOS) or polyethylsilicate (Silbond 40) were individually prepared via hydrolysis under acidic conditions in ethanol. The ratio and concentration of sol materials were adjusted to obtain a hydrophobe content from MTES of about 36 wt % and to obtain aerogels with about 8.0 wt % organic content within the aerogel material. Silicon carbide (SiC) was incorporated into the combined sol at a weight percentage of at least 35 wt % relative to silica content. The combined sol was then stirred for no less than 1 hour.

Guanidine hydroxide (2M) was added to the combined sol at concentration sufficient to target aerogel density of about 0.07-0.085 g/cc. The catalyzed sol containing SiC was cast into a fiber reinforcing phase and allowed to gel. Just prior to and immediately after gelation, the fiber reinforced wet gel was subject to a series of molding steps using a heavy weight stainless steel roller. Repeated rolling of the wet gel was conducted for no greater than four times and at a controlled thickness of 2.0 mm using rigid incompressible gauge blocks positioned at the edges of the wet gel. After curing for no greater than 1 h at room temperature, the aerogel materials were aged for about 12 h at 68° C. in ethanol aging fluid at an approximate fluid:gel ratio of 3:1. The aged gel was subjected to solvent extraction with supercritical $CO_2$, and then dried for 2 h at 110° C.

The fiber reinforcing phase was a homogeneous non-woven material comprised of textile grade glass fibers (E-glass composition), about 5.6 mm thick with a density of about 250 g/m². The resulting reinforced silica aerogel composition about 2.0 mm thick and was about 36% aerogel (comprising about 23% of synthetic amorphous silica and about 13% methylsilylated silica), 51% fiber and 13% silicon carbide by weight of the reinforced silica aerogel composition, resulting in an expected material density of about 0.20 g/cc (given a 0.085 g/cc aerogel density).

An 8 inch square sample of this composition was evaluated using a hot surface performance test with the hot surface at 650° C. The temperature at the cold face of the sample composition was measured over a period of time. For the sample composition of this example, the time to reach a temperature of 75° C. at the cold face was about 11 seconds, the time to reach a temperature of 120° C. at the cold face was about 21 seconds, the time to reach a temperature of 150° C. at the cold face was about 31 seconds, and the time to reach a temperature of 180° C. at the cold face was about 39 seconds. Data for the sample composition of this example corresponds to "D" in the chart of FIG. 2.

Figure 3:
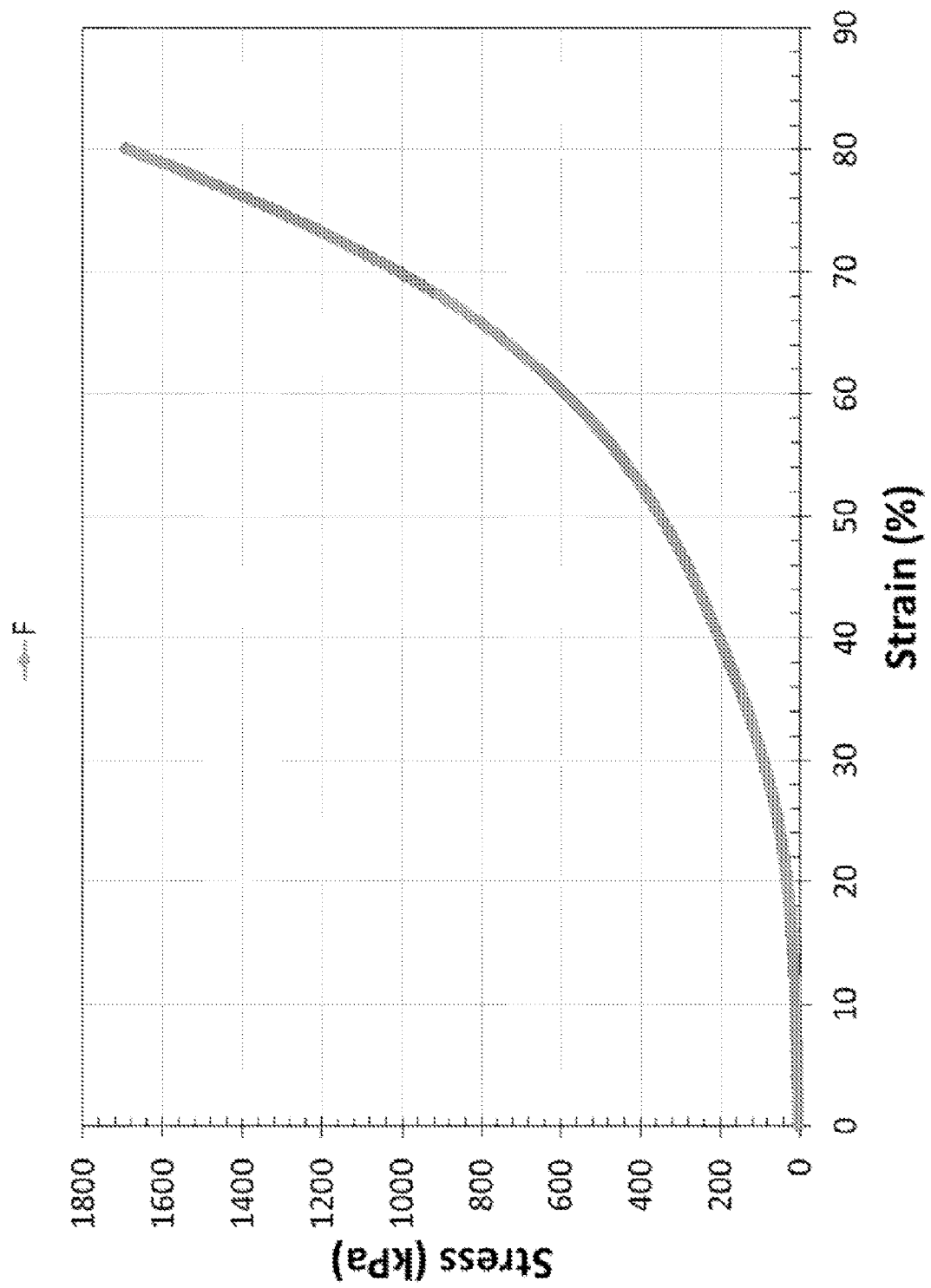
FIG. 3 is a chart showing a relationship between stress and strain for heat control member or battery thermal management members according to certain embodiments disclosed herein.

A sample of this composition was evaluated in compression. Deformation of the sample was measured to provide a stress-strain relationship for the sample. Data for this analysis is shown in FIG. 3.

Example 8

Sols of both methyltriethoxysilane (MTES) and tetra-ethoxylsilane (TEOS) or polyethylsilicate (Silbond 40) were individually prepared via hydrolysis under acidic conditions in ethanol. The ratio and concentration of sol materials were adjusted to obtain a hydrophobe content from MTES of about 36 wt % and to obtain aerogels with about 8.0 wt % organic content within the aerogel material. Silicon carbide (SiC) was incorporated into the combined sol at a weight percentage of at least about 10 wt % relative to silica content. The combined sol was then stirred for no less than 1 hour.

Guanidine hydroxide (2M) was added to the combined sol at concentration sufficient to target aerogel density of about 0.07-0.085 g/cc. The catalyzed sol containing SiC was cast into a fiber reinforcing phase and allowed to gel. Just prior to and immediately after gelation, the fiber reinforced wet gel was subject to a series of molding steps using a heavy weight stainless steel roller. Repeated rolling of the wet gel was conducted for no greater than four times and at a controlled thickness of 3.0 mm using rigid incompressible gauge blocks positioned at the edges of the wet gel. After curing for no greater than 1 h at room temperature, the aerogel materials were aged for about 12 h at 68° C. in ethanol aging fluid at an approximate fluid:gel ratio of 3:1. The aged gel was subjected to solvent extraction with supercritical $CO_2$, and then dried for 2 h at 110° C.

The fiber reinforcing phase was a homogeneous non-woven material comprised of textile grade glass fibers (E-glass composition), about 4 mm thick with a density of about 225 g/m². The resulting reinforced silica aerogel composition was about 2.25 mm thick and was about 39% aerogel (comprising about 25% of synthetic amorphous silica and about 14% methylsilylated silica), 57% fibrous glass, and 4% silicon carbide by weight of the reinforced silica aerogel composition, resulting in an expected material density of about 0.16 g/cc (given a 0.075 g/cc aerogel density).

Figure 4:
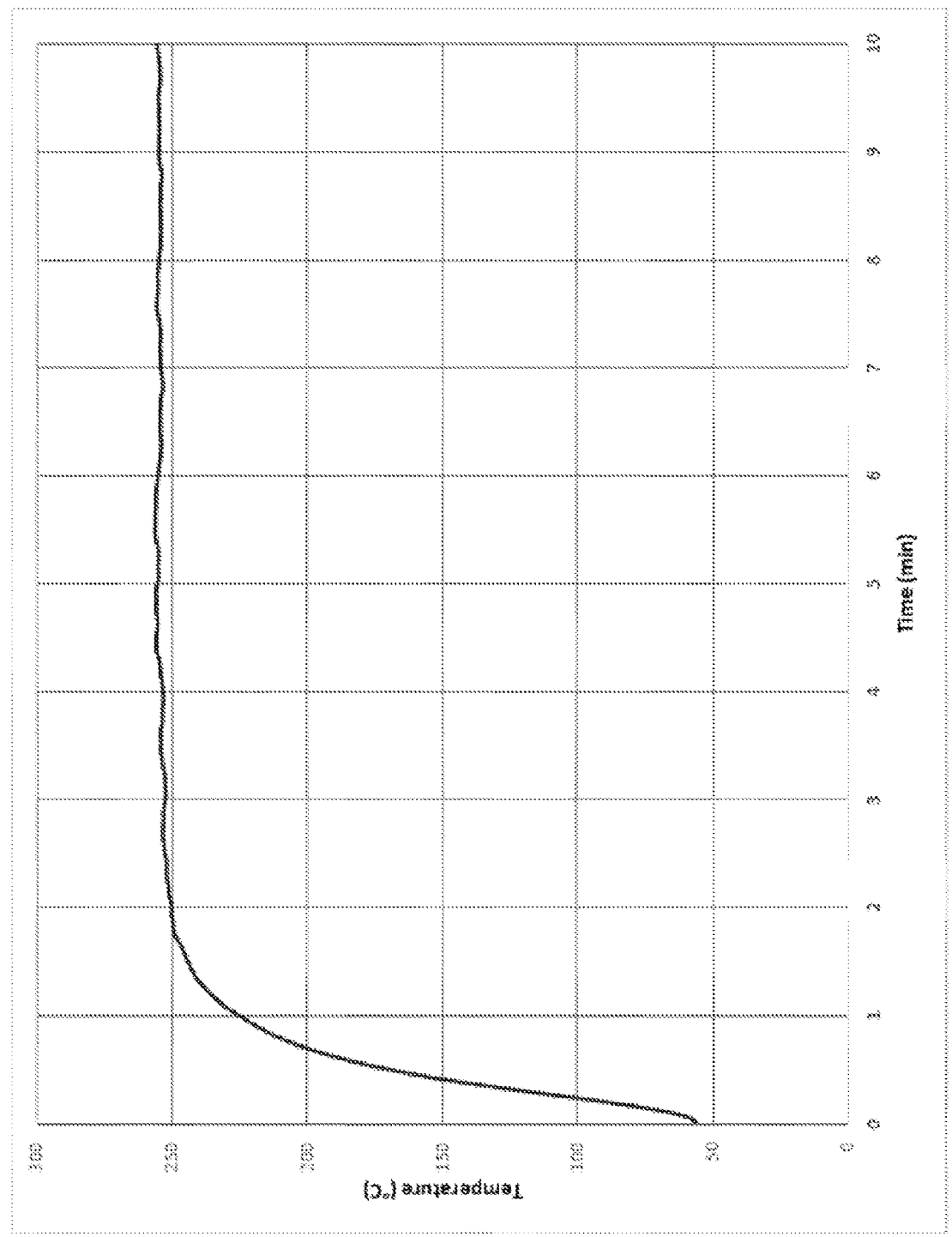
FIG. 4 is a chart showing a heat control member or battery thermal management member controlling time-to-temperature behavior according to certain embodiments disclosed herein.

An 8 inch square sample of this composition was evaluated using a hot surface performance test with the hot surface at 650° C. The temperature at the cold face of the sample composition was measured over a period of time. For the sample composition of this example, the time to reach a temperature of 75° C. at the cold face was about 9 seconds, the time to reach a temperature of 120° C. at the cold face was about 19 seconds, the time to reach a temperature of 150° C. at the cold face was about 25 seconds, and the time to reach a temperature of 180° C. at the cold face was about 34 seconds. Data for the sample composition of this example is shown in the chart of FIG. 4.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A battery thermal management member comprising:
   a first heat protection layer comprising an aerogel composition;
   a second heat protection layer comprising the aerogel composition;
   wherein the aerogel composition includes a fiber reinforcement material,
   wherein each of the first heat protection layer and the second heat protection layer is completely encapsulated with a first encapsulation member and a second encapsulation member, respectively, and
   at least one compressible resilient layer including one or more organic materials with a temperature of chemical decomposition greater than 280° C.,
   wherein each of the first and second heat protection layers has a thermal conductivity less than about 65 mW/mK,
   wherein the first and second heat protection layers maintain at least a surface of the compressible resilient layer below a chemical decomposition temperature of at least one of the one of the more organic materials,
   wherein the first encapsulation member of the first heat protection layer is in direct contact with a first side of the at least one compressible layer and the second encapsulation member of the second heat protection layer is in direct contact with a second side of the least one compressible layer, wherein the first side is opposite the second side, and wherein portions of the first encapsulation member and the second encapsulation member are the outermost layers of the battery thermal management member.

2. The battery thermal management member of claim 1, wherein the temperature of chemical decomposition of the one or more organic materials is greater than about 300° C.

3. The battery thermal management member of claim 1, wherein the temperature of chemical decomposition of the one or more organic materials is greater than about 350° C.

4. The battery thermal management member of claim 1, wherein the temperature of chemical decomposition of the one or more organic materials is in the range of about 300° C. to about 400° C.

5. The battery thermal management member of claim 1, wherein the at least one compressible resilient layer consists of the one or more organic materials, and the one or more organic materials is selected from the group consisting of siloxanes, polyolefins, polyurethanes, phenolics, melamine, cellulose acetate, and polystyrene.

6. The battery thermal management member of claim 1, wherein the fiber is selected from the group consisting of discrete fibers, woven materials, non-woven materials, needled nonwovens, battings, webs, mats, felts, and combinations thereof.

7. The battery thermal management member of claim 1, wherein the aerogel of the aerogel composition comprises inorganic, organic, or inorganic/organic hybrid materials.

8. The battery thermal management member of claim 1, wherein the aerogel composition is a silica aerogel composition.

9. The battery thermal management member of claim 1, wherein the first heat protection layer, the second heat protection layer, or both further includes a material selected from the group consisting of mica, microporous silica, ceramic fiber, mineral wool, and combinations thereof.

10. The battery thermal management member of claim 1, wherein the battery thermal management member exhibits a compressibility of: less than about 25% in a range of about 25 kPa to about 35 kPa, less than about 50% at about 50 kPa, and less than about 80% at about 245 kPa.

* * * * *